US008046376B2

(12) United States Patent
Seitz et al.

(10) Patent No.: US 8,046,376 B2
(45) Date of Patent: *Oct. 25, 2011

(54) METHOD AND SYSTEM TO AUTOMATICALLY GENERATE CLASSES FOR AN OBJECT TO RELATIONAL MAPPING SYSTEM

(75) Inventors: Greg Seitz, Lake Oswego, OR (US); Christopher J. Kasten, Sacramento, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/783,452

(22) Filed: May 19, 2010

(65) Prior Publication Data

US 2010/0268749 A1 Oct. 21, 2010

Related U.S. Application Data

(63) Continuation of application No. 11/009,411, filed on Dec. 8, 2004, now Pat. No. 7,725,460.

(60) Provisional application No. 60/528,053, filed on Dec. 8, 2003, provisional application No. 60/528,237, filed on Dec. 8, 2003, provisional application No. 60/528,238, filed on Dec. 8, 2003.

(51) Int. Cl.
*G06F 7/00* (2006.01)
*G06F 17/30* (2006.01)

(52) U.S. Cl. ........ 707/769; 707/779; 707/803; 715/235; 715/239

(58) Field of Classification Search .......... 707/600–831; 715/234–239, 760, 201; 717/108
See application file for complete search history.

(56) References Cited

U.S. PATENT DOCUMENTS

| 5,226,146 | A | 7/1993 | Milia et al. |
| 5,734,887 | A | 3/1998 | Kingberg et al. |
| 5,778,178 | A | 7/1998 | Arunachalum |
| 5,909,570 | A | 6/1999 | Webber |
| 5,937,402 | A | 8/1999 | Pandit |
| 5,953,716 | A | 9/1999 | Madnick et al. |
| 5,970,490 | A | 10/1999 | Morgenstern |
| 5,978,581 | A | 11/1999 | Sadiq et al. |
| 5,987,500 | A | 11/1999 | Arunachalam |
| 6,047,295 | A | 4/2000 | Endicott et al. |
| 6,134,559 | A | 10/2000 | Brumme et al. |
| 6,212,556 | B1 | 4/2001 | Arunachalam |
| 6,279,008 | B1 | 8/2001 | Tung Ng et al. |

(Continued)

FOREIGN PATENT DOCUMENTS

WO WO-9932996 A1 7/1999

(Continued)

OTHER PUBLICATIONS

Cheng et al., XML and DB2, Aug. 6, 2002, IEEE, 5 pages.*

(Continued)

*Primary Examiner* — Jean B Fleurantin

(74) *Attorney, Agent, or Firm* — Schwegman, Lundberg & Woessner, P.A.

(57) ABSTRACT

There is provided a system to respond to a request for data. The system receives a request for the data, queries at least two data sources for the data based on the request and receives results that include the data that is populated to at least one data object.

19 Claims, 44 Drawing Sheets

U.S. PATENT DOCUMENTS

| | | | |
|---|---|---|---|
| 6,289,358 | B1 | 9/2001 | Mattis et al. |
| 6,427,195 | B1 | 7/2002 | McGowen et al. |
| 6,457,003 | B1 | 9/2002 | Gajda et al. |
| 6,476,833 | B1* | 11/2002 | Moshfeghi .................... 715/854 |
| 6,594,669 | B2 | 7/2003 | Asami et al. |
| 6,611,838 | B1 | 8/2003 | Ignat et al. |
| 6,694,321 | B1 | 2/2004 | Berno |
| 6,701,381 | B2 | 3/2004 | Hearne et al. |
| 6,728,840 | B1 | 4/2004 | Shatil et al. |
| 6,741,997 | B1 | 5/2004 | Liu |
| 6,748,374 | B1 | 6/2004 | Madan et al. |
| 6,789,170 | B1 | 9/2004 | Jacobs et al. |
| 6,825,848 | B1 | 11/2004 | Fu et al. |
| 6,850,950 | B1 | 2/2005 | Clarke et al. |
| 7,020,660 | B2 | 3/2006 | Woodring |
| 7,096,229 | B2 | 8/2006 | Dettinger et al. |
| 7,167,874 | B2* | 1/2007 | Shalabi et al. ........................ 1/1 |
| 7,350,192 | B2 | 3/2008 | Seitz et al. |
| 7,406,464 | B2 | 7/2008 | Kasten et al. |
| 7,725,460 | B2 | 5/2010 | Seitz et al. |
| 7,779,386 | B2 | 8/2010 | Seitz et al. |
| 7,890,537 | B2 | 2/2011 | Kasten et al. |
| 2002/0091702 | A1 | 7/2002 | Mullins |
| 2002/0184612 | A1 | 12/2002 | Hunt et al. |
| 2003/0037076 | A1* | 2/2003 | Bravery et al. ................ 707/517 |
| 2003/0050863 | A1 | 3/2003 | Radwin |
| 2003/0069880 | A1 | 4/2003 | Harrison et al. |
| 2003/0187991 | A1 | 10/2003 | Lin et al. |
| 2004/0193620 | A1 | 9/2004 | Cheng et al. |
| 2004/0210556 | A1* | 10/2004 | Brooke et al. ..................... 707/1 |
| 2004/0254939 | A1 | 12/2004 | Dettinger et al. |
| 2005/0149907 | A1 | 7/2005 | Seitz et al. |
| 2005/0154722 | A1 | 7/2005 | Seitz et al. |
| 2005/0154765 | A1 | 7/2005 | Seitz et al. |
| 2005/0165758 | A1 | 7/2005 | Kasten et al. |
| 2005/0182758 | A1 | 8/2005 | Seitz et al. |
| 2006/0101385 | A1 | 5/2006 | Gerken et al. |
| 2008/0059950 | A1 | 3/2008 | Seitz et al. |
| 2008/0162820 | A1 | 7/2008 | Kasten et al. |
| 2010/0095270 | A1 | 4/2010 | Seitz et al. |
| 2011/0087644 | A1 | 4/2011 | Seitz et al. |

FOREIGN PATENT DOCUMENTS

| | | |
|---|---|---|
| WO | WO-9933006 A1 | 7/1999 |
| WO | WO-2005010650 A2 | 2/2005 |
| WO | WO-2005057364 A2 | 6/2005 |
| WO | WO-2005057364 A3 | 6/2005 |
| WO | WO-2005057365 A2 | 6/2005 |
| WO | WO-2005057365 A3 | 6/2005 |

OTHER PUBLICATIONS

Bourret et al, A generic load/extract utility for data transfer between XML documents and relational databases, Jun. 8-9, 2000, IEEE, 134-143.*

"U.S. Appl. No. 11/007,061, Non Final Office Action mailed Aug. 23, 2007", 13 pgs.

"U.S. Appl. No. 11/007,061, Notice of Allowance mailed Mar. 17, 2008", 9 pgs.

"U.S. Appl. No. 11/007,061, Response filed Nov. 21, 2007 to Non-Final Office Action mailed Aug. 23, 2007", 7 pgs.

"U.S. Appl. No. 11/007,061, Supplemental Notice of Allowability mailed May 2, 2008", 5 pgs.

"U.S. Appl. No. 11/008,775, Advisory Action mailed Jan. 28, 2010", 3 pgs.

"U.S. Appl. No. 11/008,776, Advisory Action mailed Mar. 5, 2008", 3 pgs.

"U.S. Appl. No. 11/008,776, Final Office Action mailed Nov. 2, 2007", 11 pgs.

"U.S. Appl. No. 11/008,776, Final Office Action mailed Nov. 13, 2009", 13 pgs.

"U.S. Appl. No. 11/008,776, Final Office Action mailed Nov. 24, 2008", 15 pgs.

"U.S. Appl. No. 11/008,776, Non Final Office Action mailed May 14, 2007", 13 pgs.

"U.S. Appl. No. 11/008,776, Non-Final Office Action mailed Apr. 8, 2009", 15 pgs.

"U.S. Appl. No. 11/008,776, Non-Final Office Action mailed Jun. 2, 2008", 12 pgs.

"U.S. Appl. No. 11/008,776, Response filed Jan. 12, 2010 to Final Office Action mailed Nov. 13, 2009", 11 pgs.

"U.S. Appl. No. 11/008,776, Response filed Jan. 26, 2009 to Final Office Action mailed Nov. 24, 2008", 12 pgs.

"U.S. Appl. No. 11/008,776, Response filed Feb. 4, 2008 to Final Office Action mailed Nov. 2, 2007", 14 pgs.

"U.S. Appl. No. 11/008,776, Response filed Jul. 8, 2009 to Non Final Office Action mailed Apr. 8, 2009", 12 pgs.

"U.S. Appl. No. 11/008,776, Response filed Aug. 14, 2007 to Non Final Office Action mailed May 14, 2007", 16 pgs.

"U.S. Appl. No. 11/008,776, Response filed Sep. 2, 2008 to Non-Final Office Action mailed Jun. 2, 2008", 11 pgs.

"U.S. Appl. No. 11/009,388, Advisory Action mailed Apr. 6, 2006", 3 pgs.

"U.S. Appl. No. 11/009,388, Advisory Action mailed May 14, 2007", 3 pgs.

"U.S. Appl. No. 11/009,388, Examiner Interview Summary mailed Jul. 6, 2007", 1 pg.

"U.S. Appl. No. 11/009,388, Final Office Action mailed Jan. 13, 2006", 10 pgs.

"U.S. Appl. No. 11/009,388, Final Office Action mailed Jan. 25, 2007", 10 pgs.

"U.S. Appl. No. 11/009,388, Non Final Office Action mailed Jun. 24, 2005", 10 pgs.

"U.S. Appl. No. 11/009,388, Non Final Office Action mailed Jul. 25, 2006", 16 pgs.

"U.S. Appl. No. 11/009,388, Notice of Allowance mailed Jul. 16, 2007", 9 pgs.

"U.S. Appl. No. 11/009,388, Notice of Allowance mailed Nov. 16, 2007", 4 pgs.

"U.S. Appl. No. 11/009,388, Pre-Appeal Brief Request filed May 25, 2007", 5 pgs.

"U.S. Appl. No. 11/009,388, Response filed Mar. 13, 2006 to Final Office Action mailed Jan. 13, 2006", 12 pgs.

"U.S. Appl. No. 11/009,388, Response filed Mar. 26, 2007 to Final Office Action mailed Jan. 25, 2007", 14 pgs.

"U.S. Appl. No. 11/009,388, Response filed Oct. 24, 2005 to Non Final Office Action mailed Jun. 24, 2005", 11 pgs.

"U.S. Appl. No. 11/009,388, Response filed Oct. 25, 2006 to Non Final Office Action mailed Jul. 25, 2006", 15 pgs.

"U.S. Appl. No. 11/009,411, Advisory Action mailed May 9, 2008", 3 pgs.

"U.S. Appl. No. 11/009,411, Final Office Action mailed Feb. 21, 2008", 14 pgs.

"U.S. Appl. No. 11/009,411, Non Final Office Action mailed Feb. 23, 2007", 9 pgs.

"U.S. Appl. No. 11/009,411, Non Final Office Action mailed Aug. 24, 2007", 13 pgs.

"U.S. Appl. No. 11/009,411, Non-Final Office Action mailed Sep. 5, 2008", 12 pgs.

"U.S. Appl. No. 11/009,411, Non-Final Office Action mailed Dec. 24, 2008", 5 pgs.

"U.S. Appl. No. 11/009,411, Notice of Allowance mailed Jan. 12, 2010", 11 pgs.

"U.S. Appl. No. 11/009,411, Pre-Appeal Brief Request filed May 21, 2008", 5 pgs.

"U.S. Appl. No. 11/009,411, Response filed Mar. 24, 2009 to Non Final Office Action mailed Dec. 24, 2008", 8 pgs.

"U.S. Appl. No. 11/009,411, Response filed Apr. 21, 2008 to Final Office Action mailed Feb. 21, 2008", 14 pgs.

"U.S. Appl. No. 11/009,411, Response filed May 23, 2007 to Non Final Office Action mailed Feb. 23, 2007", 9 pgs.

"U.S. Appl. No. 11/009,411, Response filed Nov. 26, 2007 to Non-Final Office Action mailed Aug. 24, 2007", 13 pgs.

"U.S. Appl. No. 11/009,411, Response filed Dec. 5, 2008 to Non-Final Office Action mailed Sep. 5, 2008", 13 pgs.

"U.S. Appl. No. 11/009,412, Advisory Action mailed Apr. 6, 2006", 3 pgs.

"U.S. Appl. No. 11/009,412, Advisory Action mailed Apr. 17, 2007", 3 pgs.

"U.S. Appl. No. 11/009,412, Final Office Action mailed Jan. 13, 2006", 10 pgs.

"U.S. Appl. No. 11/009,412, Final Office Action mailed Jan. 25, 2007", 17 pgs.

"U.S. Appl. No. 11/009,412, Final Office Action mailed Nov. 26, 2008", 10 pgs.

"U.S. Appl. No. 11/009,412, Final Office Action mailed Dec. 3, 2007", 9 pgs.

"U.S. Appl. No. 11/009,412, Non-Final Office Action mailed May 14, 2008", 9 pgs.

"U.S. Appl. No. 11/009,412, Non-Final Office Action mailed Jun. 20, 2007", 11 pgs.

"U.S. Appl. No. 11/009,412, Non-Final Office Action mailed Jun. 24, 2005", 10 pgs.

"U.S. Appl. No. 11/009,412, Non-Final Office Action mailed Jul. 27, 2006", 15 pgs.

"U.S. Appl. No. 11/009,412, Notice of Allowance mailed May 4, 2010", 12 pgs.

"U.S. Appl. No. 11/009,412, Notice of Allowance mailed Sep. 21, 2009", 12 pgs.

"U.S. Appl. No. 11/009,412, Response filed Feb. 4, 2008 to Final Office Action mailed Dec. 3, 2007", 14 pgs.

"U.S. Appl. No. 11/009,412, Response filed Feb. 26, 2009 to Final Office Action mailed Nov. 26, 2008", 30 pgs.

"U.S. Appl. No. 11/009,412, Response filed Mar. 13, 2006 to Final Office Action mailed Jan. 13, 2006", 11 pgs.

"U.S. Appl. No. 11/009,412, Response filed Mar. 26, 2007 to Final Office Action mailed Jan. 25, 2007", 17 pgs.

"U.S. Appl. No. 11/009,412, Response filed Apr. 24, 2007 to Advisory Action mailed Apr. 17, 2007", 17 pgs.

"U.S. Appl. No. 11/009,412, Response filed Aug. 14, 2008 to Non Final Office Action mailed May 14, 2008", 13 pgs.

"U.S. Appl. No. 11/009,412, Response filed Sep. 20, 2007 to Non-Final Office Action mailed Jun. 20, 2007", 13 pgs.

"U.S. Appl. No. 11/009,412, Response filed Oct. 24, 2005 to Non-Final Office Action mailed Jun. 24, 2005", 12 pgs.

"U.S. Appl. No. 11/009,412, Response filed Oct. 27, 2006 to Non-Final Office Action mailed Jul. 27, 2006", 15 pgs.

"U.S. Appl. No. 11/088,776, Final Office Action Mailed Nov. 13, 2009", 15 pgs.

"U.S. Appl. No. 11/965,458 Notice of Allowance mailed Oct. 12, 2010", 6 pgs.

"U.S. Appl. No. 11/965,458, Non-Final Office Action mailed Mar. 23, 2010", 11 pgs.

"U.S. Appl. No. 11/965,458, Notice of Allowance mailed Jul. 22, 2010", 6 pgs.

"U.S. Appl. No. 11/965,458, Notice of Allowance mailed Oct. 6, 2010", 6 pgs.

"U.S. Appl. No. 11/965,458, Response filed Jun. 23, 2010 to Non Final Office Action mailed Mar. 23, 2010", 8 pgs.

"International Application Serial No. PCT/US04/41071, International Search Report and Written Opinion mailed Mar. 23, 2006", 8 pgs.

Aquino, Mario, "A Simple Data Access Layer using Hibernate", Object Computing, Inc., http://www.ociweb.com/jnb/jnbNov2003.html, (Nov. 19, 2003).

Cohn, M., et al., "JAVA Developer's Reference", Sams.net Publishing, (1996), 1, 2, 80, 81.

Santucci, et al., "", A hypertabular visualizer of query results, IEEE, 189-196., (Sep. 1997), 23-26.

Wooguil, P, et al., "", Flexible and fast IP lookup algorithm, IEEE, vol. 7, 2053-2057., (Jun. 2001), 11-14.

"U.S. Appl. No. 12/901,275, Non Final Office Action mailed Apr. 1, 2011", 12 pgs.

* cited by examiner

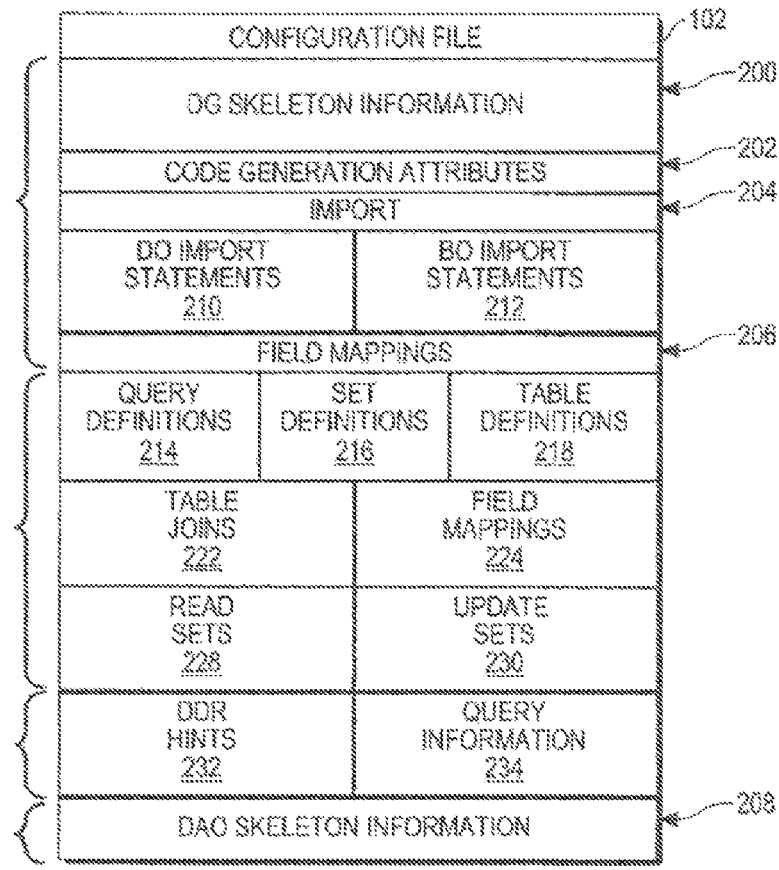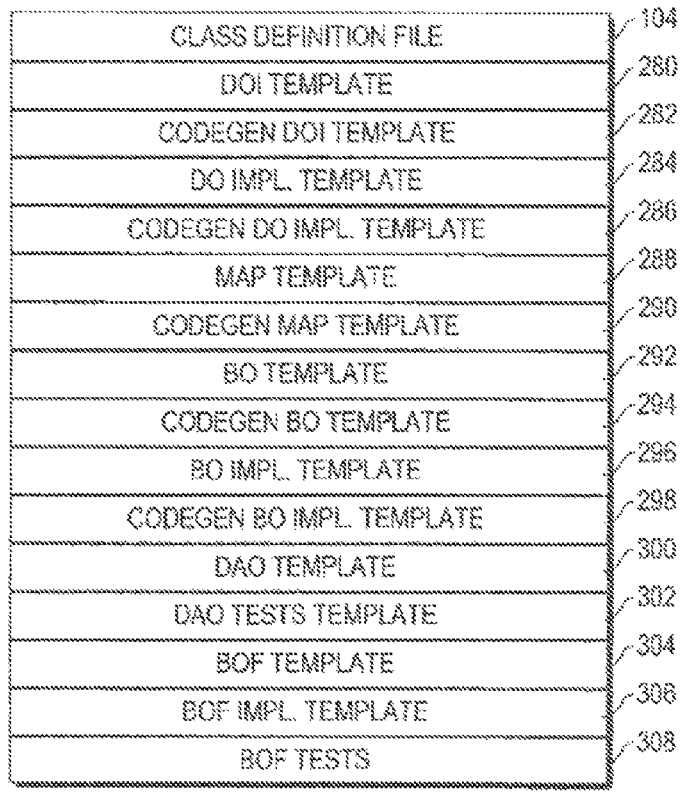
Fig. 9

```
<querydefs>  ←214                                 ←215
        <queryname name="FIND_BY_PK" primary="true"/>
        <queryname name="INSERT_PK"/>
</querydefs>
```

*Fig. 10A*

```
<setdefs>  ←216
        <readsetids>              ←212
                <setid name="MINIMUM"/>
        </readsetids>
        <updatesetids>            ←217
                <setid name="MINIMUM">
        </updatesetids>
</setdefs>
```

*Fig. 10B*

```
                ←218               ←240    ←242
<tabledefs>
        <tabledef name="User" alias="u"/>
        <tabledef name="UserInfo" alias="ui"/>
</tabledefs>
```

*Fig. 10C*

```
                                    244
        ←222              ←242  ←242
<tablejoins>                                      ←240
        <tablejoin sql="u.ID=ui.ID">              ←240
                <tableref name="User"/>
                <tableref name="UserInfo"/>
        </tablejoin>
</tablejoins>
```

*Fig. 10D*

```
<fieldmappings>    246    242    240    52       Fig. 10E
         <full name="id" table="User" field="ID" attrtype="int" getter="true"
setter="true" bogetter="true" bosetter="true"/>
```

```
                            248    249                        Fig. 10F
         <hint name="foo" attrtype="int" getter="true" setter="true"
bogetter="false" bosetter="false">
```

```
                    250    251                               Fig. 10G
         <hashhint name="startTime" attrtype="Date" getter="false"
setter="false" bogetter="false" bosetter="false"/>
```

```
                  252    253          221    229    Fig. 10H
         <contained name="contactInfo"
containedmapinst="ContactInfoMap.getInstance()"
containedclassinst="ContactInfoDoImpl.class" attrtype="ContactInfo"
getter="true" setter="true"/>
```

```
                  254    255              229    Fig. 10I
         <subobj name="billingCurrency" attrtype="Currency" getter="true"
setter="true">
              <fkey name="billingCurrencyID" subattr="currencyId"/>
         </subobj>            225   227
</fieldmappings>
```

```
                    252
                   ↙
         <ddrhints>                                    Fig. 10J
                          260
                         ↙
                <global>
                    <member name="id"/>
                </global>           281    263
                                    ↓    ↙
                <global name="m_specialHintSet">
                    <member name="id"/>
                    <member name="type"/>
                </global>
         </ddrhints>

229
                   ↙                    262   262
         <readsets>                    ↙    ↙          Fig. 10K
                <readset name="FULL" fullset="true"/>
                <readset name="MINIMUM">
                    <member name="userId"/>
                    <member name="loginName"/>
                </readset>
                                        ↑
                                       281
         </readsets>

230
                   ↙                     258    258
         <updatesets>                   ↙      ↙        Fig. 10L
                <updateset name="FULL" fullset="true"/>
                <updateset name="MEDIUM">       258
                    <member name="userId"/>
                    <member name="loginName"/>
                </updateset>
                                        ↑
                                       281
         </updatesets>

234                                 Fig. 10M
                   ↙              215
         <queries>               ↙           262
                <selectquery name="FIND_BY_PK">   ↙
                    <selectstatement set="READSET_FULL">
                        <![CDATA[SELECT
                            <SELECTFIELDS/> "+                ⎫
                        "FROM <TABLES/> "+                    ⎬ 384
                        "WHERE u.ID = :m_userId and (<JOIN/>)"⎭
                        ]]>
                    <selectstatement>
                </selectquery>
```

Specialized Place Holders
(continued)

408 → IN - multiple prototype DO's
Form: <IN/;m_attribute_name, m_attribute_name,...; <IN/>
Example: WHERE User.id = IN <IN/>;m_attrName<IN/>
Result: WHERE User.id = IN (m_attribute_name, m_attribute_name,....)

(compare the table field with the same attribute in each of the prototype dos)

410 → OR - multiple prototype DO's
Form: <ORSET> SQL with substitution fields </ORSET>
Example: <ORSET> (m_id = id AND :m_name = name </ORSET>
Result: SELECT id, name FROM User WHERE (m_id = id AND :m_name = name) OR (m_id = id AND :m_name=name) OR...

Specialized Place Holders
(continued)

Update Fields — 413

- Form: `<UPDATEFIELDS<N/>`
- Example: `UPDATE :_T_User SET<UPDATEFIELDS<N/> WHERE ID = :m_id`
- Result: `UPDATE 1234 SET id name`

Insert Fields — 415

- Form: `<INSERTFIELDS<N/>`
- Example: `INSERT INTO :_T_User <INSERTFIELDS<N/>`
- Result: `INSERT INTO 1234 id name`

Callable Insert Statement — 417

- Form: `:_OUT_m_attrName, :+_OUT_hashHintName`
- Example: `INSERT INTO :_T_User <INSERTFIELDS<N/> returning row id into :+OUT_has_rowid; end;`

QUERY TEMPLATE ⟵420

SELECT <SELECTFIELDS/> ⟵400

FROM <TABLES/> ⟵402

WHERE A.id = :m_id and (<JOIN/>) ⟵394 ⟵404

*Fig. 25A*

QUERY STATEMENT ⟵427

SELECT A. ID, A. TYPE, B. DESC.

FROM items a, itemsdesc b

WHERE A. id = ? and (A. ID = B. ID)

*Fig. 25B*

USER_TABLE

MARKETPLACE number(38)
ID number(38)
USERID varchar2(64) (unique)
USER_STATE number(38)
PASSWORD varchar2(64) (encrypted)
SALT varchar2(64) (encrypt key for passwd)
LAST_MODIFIED date
USERID_LAST_CHANGE date
FLAGS number(38)
EMAIL varchar2(64) (unique)
COUNTRY_ID number(10)
UVDETAIL number(16)
UVRATING number(5)
SCORE number(38)
SITE_ID number(4)
CO_PARTNERID number(4)
BILLING_CURRENCY_ID number(3)

Fig. 39

LISTINGS TABLE

ID
DESCRIPTION
CATEGORY ID
PRICE
CLOSE_DATE
RESERVE_DATE
SELLER_ID
BIDDER_ID (0->N)
LIST_DATE
REMINDER_SENT

Fig. 38

METHOD AND SYSTEM TO AUTOMATICALLY GENERATE CLASSES FOR AN OBJECT TO RELATIONAL MAPPING SYSTEM

RELATED APPLICATIONS

This application is a continuation of U.S. application Ser. No. 11/009,411 (issuing as U.S. Pat. No. 7,725,460 on May 25, 2010) filed Dec. 8, 2004 which claims the benefit of U.S. Provisional Application No. 60/528,053 filed on Dec. 8, 2003, U.S. Provisional Application No. 60/528,237 filed on Dec. 8, 2003, and U.S. Provisional Application No. 60/528,238 filed on Dec. 8, 2003, which are all incorporated herein by reference.

FIELD OF THE INVENTION

The present invention relates generally to the field of electronic data management. More specifically, the invention relates to a method and system for a transparent application of multiple queries across multiple data sources.

BACKGROUND OF THE INVENTION

Technological advancements have led to more sophisticated and powerful data management systems. Data processing in such systems require efficient handling a large number of data transactions (e.g. data reads and writes).

The advent of the Internet and the World Wide Web combined with the development of network-based commerce system applications has enabled companies to transact business globally in real time. Such network-based commerce systems may processes large amounts of data transactions from geographically separated users. The users may enter transactional requests over communications lines that result in the persistent storage of data in a master information source. In several cases, back-end systems (e.g., database servers) support the master information source and interact with other systems to map the data between a persistent or relational form into an object form that is more readily utilized by application software.

SUMMARY OF THE INVENTION

According to one aspect there is provided a method to respond to a request for data. The method includes receiving a request for the data; querying at least two data sources for the data based on the request; and receiving results that include the data that is populated to at least one data object.

BRIEF DESCRIPTION OF THE DRAWINGS

The invention is now described, by way of example, with reference to the accompanying diagrammatic drawings in which like reference numerals are used to indicate the same or similar features, unless otherwise indicated.

FIG. 9 is a block diagram illustrating an exemplary configuration file and class definition file;

FIGS. 10A-10M illustrate exemplary configuration file meta-data;

FIGS. 19-22 are exemplary keys to generalized place holders, according to one embodiment;

FIG. 25A is a diagram illustrating an exemplary query template, according to one embodiment;

FIG. 25B is a diagram illustrating an exemplary query statement, according to one embodiment;

FIGS. 38 and 39 are an exemplary listings and user tables of the database.

DETAILED DESCRIPTION

Figure 1:
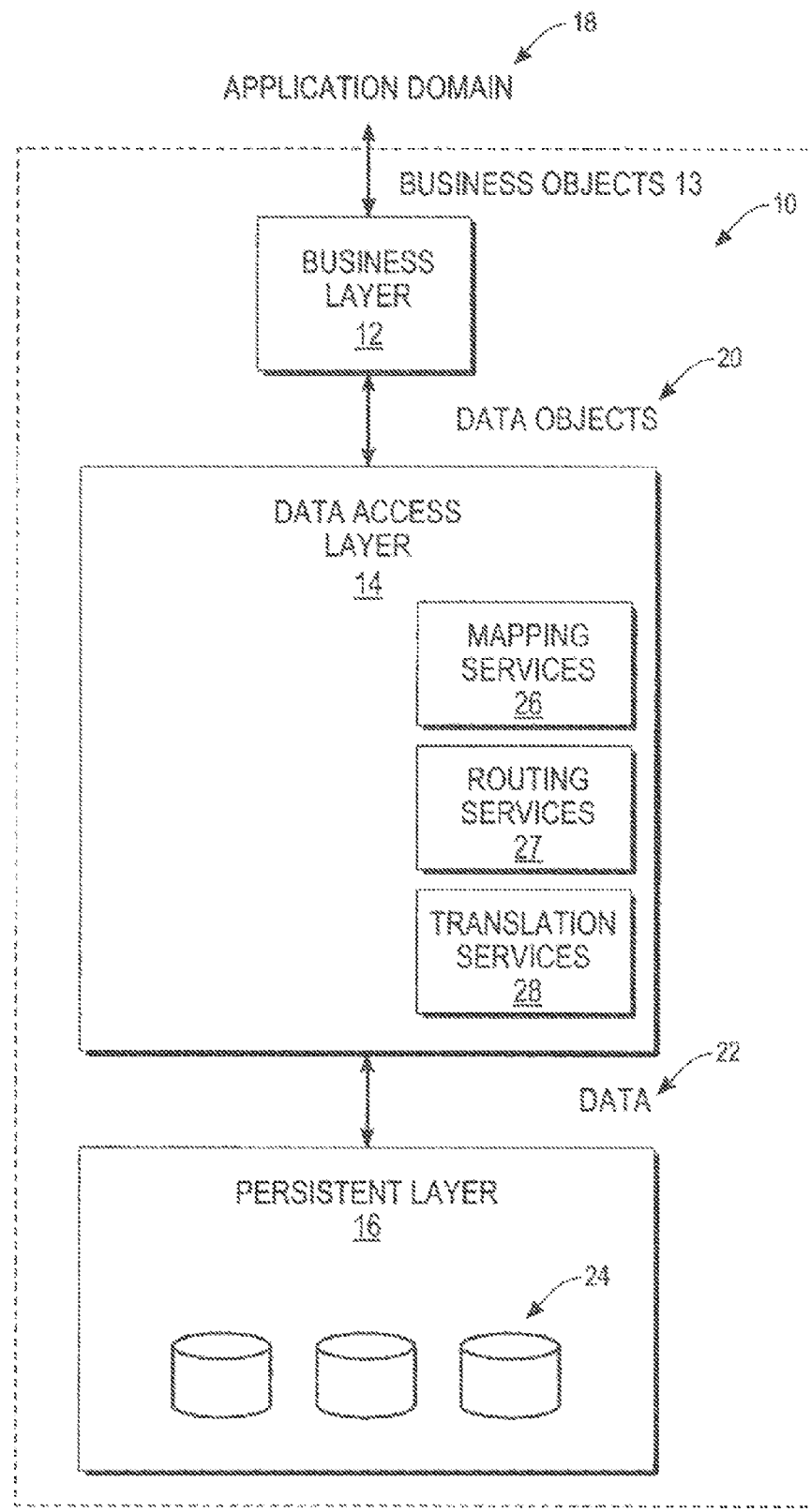
FIG. 1 is block diagram illustrating an exemplary data access system, in accordance with an embodiment of the invention.

A method and system to automatically for transparent application of multiple queries across multiple data sources are described. In the following description, for purposes of explanation, numerous specific details are set forth in order to provide a thorough understanding of the present invention. It will be evident, however, to one skilled in the art that the present invention may be practiced without these specific details.

Although the invention is described merely by way of example with reference to a network-based commerce system, it is to be appreciated that it may apply in any data processing network that processes a plurality of data transactions (e.g., data read, data write, data delete, or the like transactions). When the invention is applied in a network-based commerce system or facility, it may host a plurality of listings or items. The term "listing" or "item" may refer to any description, identifier, representation or information pertaining to a listing, service, offering or request that is stored within a network-based commerce system. As such, a listing may be an auction or fixed-price offering (e.g., products such as goods and/or services), an advertisement, or a request for a listing or service Prior art object to relational mapping systems fail to adequately provide for accessing large quantities of data that may be organized according to a single data base schema. For example, prior art systems may require the application domain to make multiple requests to access data because the data cannot be stored on a single database server. Indeed, the application domain must make a separate request for each database server that stores the desired data even though the data may be logically organized according to a single data base schema. In short, such systems push the burden of managing and maintaining the location of large quantities of similarly organized data into the application domain.

According to a first aspect of the invention there is provided a method and system to automatically generate software for an object to relational mapping system. The system includes a code generator that automatically generates a number of related classes for a particular data object. The classes provide various and complimentary services that facilitate the data object to function in an information system (e.g., provide access to persistently stored data). For example, one class may include methods to create and delete the data object. Another exemplary class may include runtime meta-data that facilitates the population of the data object with data.

According to a second aspect there is provided a method and system to automatically regenerate software for an object to relational mapping system. The system provides for a code regenerator that automatically regenerates a number of base classes without impacting custom code. Thus, the base classes may be modified by adding or removing meta-data (e.g., adding an attribute to a data object, removing an attribute from a data object, adding a new query, etc.) and automatically regenerated to function with custom code without impacting the custom code.

According to a third aspect there is provided a method and system to automatically generate query language in software. The system enables receiving a request for data that is persistently stored in a database. Next, the system selects a predefined query template from a number of query templates based on the type of request and other information. The system utilizes the predefined template at runtime to identify content and mark a position in a query statement to store the content. The content may be received from a number of different sources that perform varied operations and generate a variety of SLQ language and runtime values that may be executed in the SQL statement.

According to a fourth aspect, there is provided a method and system for a transparent application of multiple queries across multiple data sources. The system receives a single request for data from an application program and determines the location of the physical tables and the database servers that store the requested data. Next, the system communicates a query to each database server to read the physical table that includes the desired data. The system then receives and processes results that are returned by the database server that may include the desired data. After receiving the desired data, the system populates the data to one or more data objects and responds to the application program that the data objects have been found and populated.

Exemplary Data Transaction Processing System

FIG. 1 illustrates a data access system 10, according to one exemplary embodiment of the invention. The data access system 10 is shown broadly to include a business layer 12, a data access layer 14 and a persistent layer 16 that may include one or more databases 24. The business layer 12 provides business objects 13 to an application domain 18. These business objects 13 hold references to data objects 20, which are obtained from the data access layer 14. The application domain 18 may request services or data transactions with regard to the business objects 13, which is performed utilizing the data objects 20 and the data access layer 14. In the exemplary embodiment the application domain 18 utilizes data in the form of the data objects 20 which are provided to the application domain 18 either directly in the form of the data object 20 or indirectly via the business layer 12 encapsulated in the business object 13. To this end, the data access layer 14 receives and processes requests for one or more data objects 20 and may interact with the data objects 20 to build complex structures. For example, the data access layer 14 may build object-graphs, multiple data objects 20 that are linked to other related or associated data objects 20. Further, the data access layer 14, or business layer 12, may provide caching services by providing data objects 20 to the application domain 18 upon request without accessing the database 24. Thus, the data access layer 14, manages the data objects 20 and provide access to the data objects 20 in response to requests from the application domain 18 either directly or via the business layer 12. The application domain 18 may generally be the ultimate consumer and/or originator of the data contained in the data objects 20.

The data access layer 14 may provide various data processing services and thus includes various data processing modules. For example, the data access layer may include mapping services 26, routing services 27, and translation services 28. The mapping services 26 may map data between data objects 20 and table(s) in the database(s) 24. For example, the persistent layer 16 may store data 22 that is contained by the data objects 20 in the exemplary form of physical tables in physical databases 24. To this end, the data access layer 14 may maintain meta-data that defines a one-to-one correspondence between each attribute contained in a data object 20 and each field in a logical table or the aggregate response of a function performed in the database. In addition, the mapping services 26 may provide a high degree of flexibility to redirect the location of the data 22 from one logical table to another logical table. The routing services 27 may map a logical host and table to a corresponding physical table and a physical database 24. In one exemplary embodiment, the routing services 27 identify an alternate physical database 24 in the event that a physical database cannot be accessed or may respond to a deliberate relocation of a logical table from one physical database to another. The translation services 28 may translate requests regarding data objects 20 into appropriate database language (e.g., SQL) for communication with the persistent layer 16. The translation services 28 may dynamically determine values and introduce values into the database language based on runtime parameters. In general, the data access layer 14 may provide primitive services to the business layer 12. For example, the data access layer 14 may process a single type of data object 20 in response to a single request from the business layer 12. It will however be appreciated to a person of skill in the art that various other functional modules may be included in the data access later in addition to, or instead of, the exemplary mapping services 26, routing services 27 and translation services 28.

The persistent layer 16 provides data services to the data access layer 14 and is shown to include one or more databases 24 that persistently store physical tables that store the data 22. To this end, the persistent layer 16 receives and responds to database language that is communicated from the data access layer 14 to access the physical tables. Exemplary tables of the database 24 are described in more detail later in this application with reference to a network-based commerce system.

Figure 2:
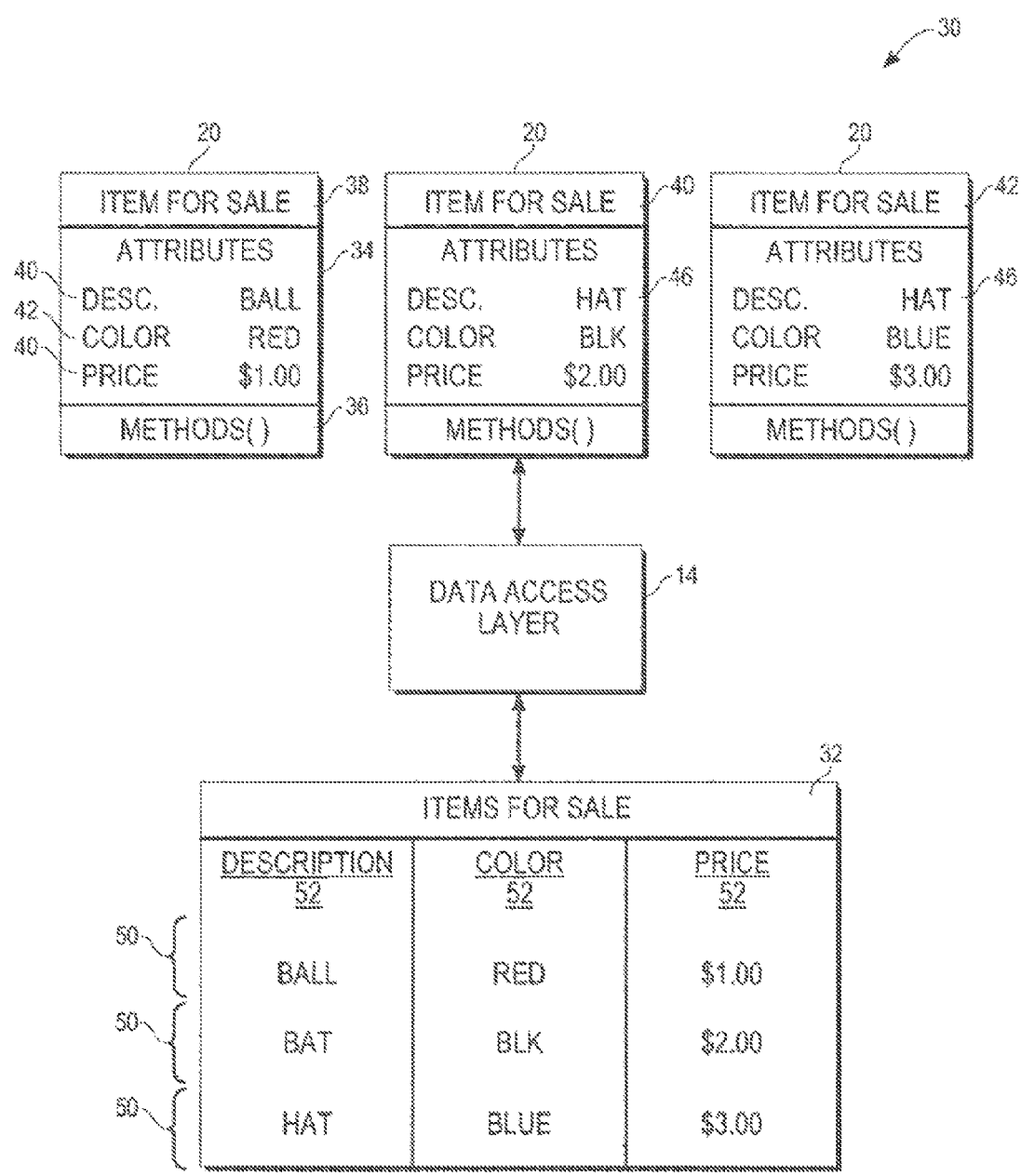
FIG. 2 shows exemplary method, in accordance with an exemplary embodiment, to map data.

FIG. 2 illustrates exemplary object to relational mapping, as practiced in the art. Object to relational mapping operates on data that is shown to be mapped between a data object and a table that is stored in a database (e.g., a relational database). Object to relational mapping may be performed by mapping services 26 (see FIG. 1) in the data access system 10 to map data between exemplary data objects 20 and one or more exemplary tables 32.

By way of example, each data object 20 is shown include attributes 34 and processes or methods 36. The exemplary data objects 20 are described merely by way of example with reference to a network-based commerce system and, accordingly, the attributes 34 are shown to include a description attribute 40, a color attribute 42 and a price attribute 44 that may be utilized to characterize a particular listing (e.g., a listing/item for sale in the network-based commerce system). For example, the data object 20 may be instantiated as an item-for-sale object 38 that includes attributes 34 that include the description attribute set to a value of "BALL", a color attribute 42 set to a value of "RED" and a price attribute 44 set to a value of "$1.00."

The exemplary table 32 is shown to be "an items-for-sale" table and includes rows 50 and columns 53 the intersection of which store attribute values for an item for sale. Each column 53 corresponds to an attribute 34 (e.g., description attribute 40, color attribute 42 and price attribute 44) that is shared by the item for sale objects 38, 41, 43 and stores properties for the respective objects. Further, each row 50 in the table 32 also corresponds to the item for sale objects 38, 41 and 43. It will be appreciated that further tables 32 may be provided to extend the "items-for sale" table and that entries in these tables may include additional attributes 34 and additional items for sale.

Figure 3:
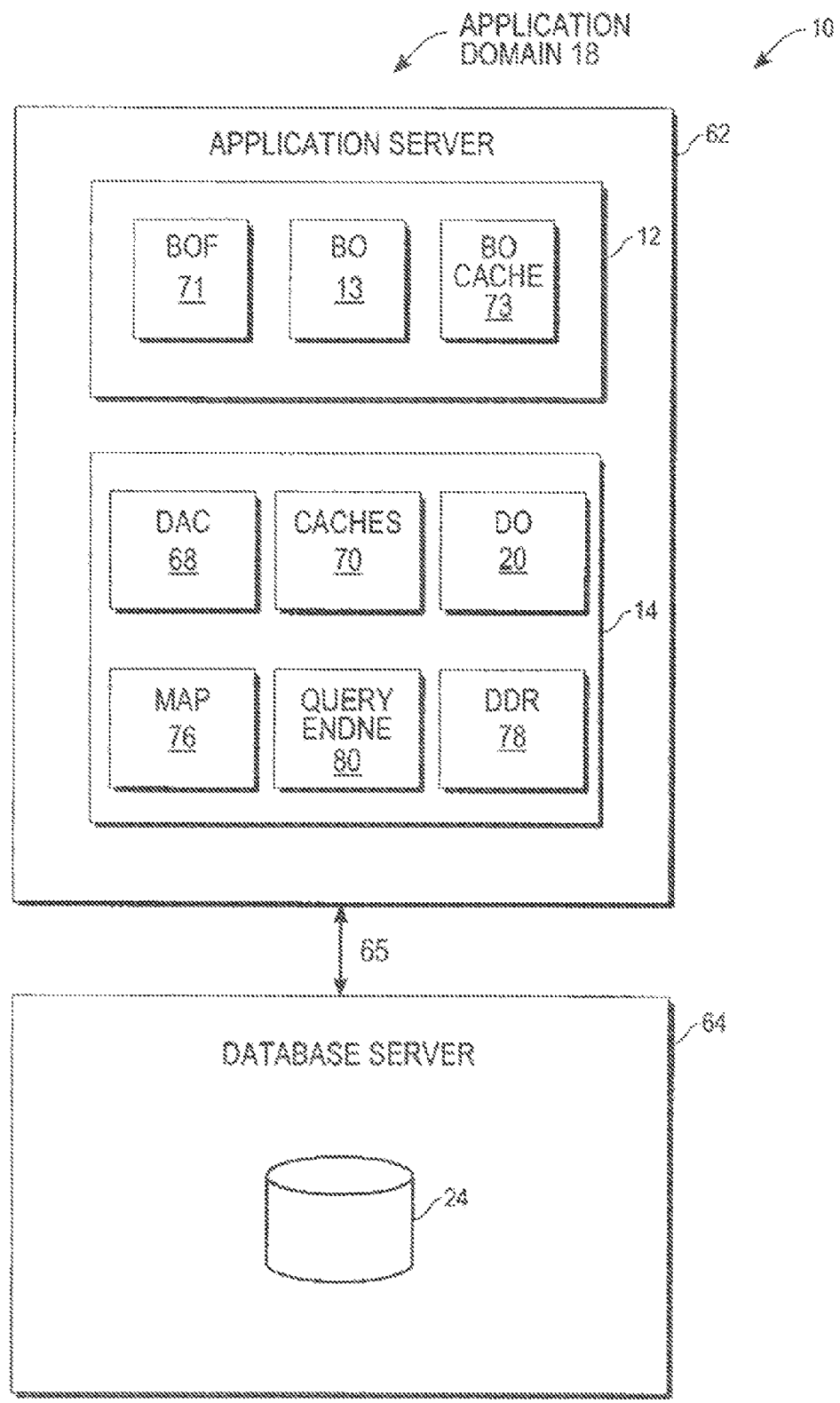
FIG. 3 shows exemplary hardware and software modules of the data access system, according to one embodiment.

FIG. 3 illustrates hardware and software components of the data access system 10, according to one exemplary embodiment. The data access system 10 includes an application server 62 and a database server 64 that communicate over a communication link 65. The application server 62 is shown to include a business layer 12 and a data access layer 14. The business layer 12 includes business object factories 71, business objects 13, and business object caches 73. The data access layer 14 includes data access objects 68, caches 70, data objects 20, map objects 76, a query engine 80, and a dynamic data routing module (DDR) 78. Some of the components may be dedicated to a specific type of object. For example, the data access object 68, the data object 20, the data object map object 76, business object factory 71, and the business object 13 may be identified with the term "item" in their name thereby denoting a group of objects that may be utilized to perform different services with respect to an "item" object. Other components may not be dedicated to a specific type of object; but rather, may provide services for all types of objects. For example, the query engine 80, the DDR module 78 and the cache 70 may be not identified with a prefix.

The data access object 68 may be utilized by the application domain 18, via the business layer 12 or directly, to manipulate data objects 20. For example, the data access object 68 may be utilized to find a data object 20, update data from the data object 20 into the database 24, insert data from the data object 20 into the database (create a row) and delete data in the database 24 that is contained by the data object 20. Further, the data access object 68 may utilize the cache 70 to determine if a particular data object 20 is already resident on the application server 62 or to save a data object 20 in the cache 70. In general, the data access object 68 may be utilized by the application domain and/or business layer 12 to manipulate the data objects 20.

The cache 70 provides the ability to store any type of data object 70 in memory and the business object cache 73 provides the ability to store any type of business object 13 in memory thereby providing mechanisms to reduce load on the database server 64. Accordingly, if an object is already in the cache 70, 73 the database 24 need not be accessed. It will be appreciated that the data objects 20 and business objects 13 stored in the respective caches 70, 73 may be utilized by single threads and/or multiple threads.

The data object 20 holds the data 22 that is read from the database 24. To this end, the data object 20 includes attributes 34 that may be populated by the query engine 80 with the data 22 and accessed by the application domain 18 via the getter and setter methods associated with the data object 20 and/or the corresponding business object 13.

The business object factory 71 may be utilized by the application domain 18 to get a business object 13. The business object factory 71 may invoke the data access object 68 to create the corresponding data object 20 and the business object 13 that encapsulates the data object 20.

The business object 13 may be utilized by the application domain 18 to access the data contained by one or more data objects 20. To this end, the business object 13 may encapsulate one or more data objects 20 and may provide business logic that is appropriate to the data contained by the underlying data object(s) 20. For example, a data object 20 that contains data 22 in the form of sexually explicit material may be associated with a business object 13 that includes business logic that prohibits a minor from viewing the data 22. In addition, the business object 13 may participate in the construction of object-graphs.

The map object 76 includes the processes or methods 36 and meta-data that provide for mapping, query template definitions, set definitions, and transformation rules, also in accordance with an embodiment of the invention. Meta-data is provided for mapping between attributes 34 and physical table columns 53 (see table 32 in FIG. 2) and mapping between physical table names and logical table names. In one exemplary embodiment, meta-data may include query templates that may include SQL statements with embedded tags that may be substituted with SQL parameters at runtime. In addition, the meta-data provides for set definitions that define groups of attributes in the data object 20. Set definitions may include read sets for reading a group of attributes from a table in the database 24 and populating only a sub-set of the attributes on data object 20; update sets for writing only a sub-set of attributes from the data object 20 to an existing row in the database 24; and, insert sets for writing a sub-set of attributes from the data object 20 that results in an insertion of a row in the database 24. The meta-data further includes transformation rules that may be applied to transform data that is read from or written to the database 24. For example, a string may be converted to a desired format when read from the database.

The DDR module 78 may include logic that identifies the physical location that may be accessed to obtain requested data 22. For example, the DDR module 78 may be passed a hint and a logical table from the query engine 80 and may respond by returning a corresponding physical table and physical database. To this end the DDR module 78 may utilize a text file that includes rules to process the logical table and the hint. For example, a logical table for "items-for-sale" may be passed with a hint that specifies an item number. The DDR module 78 may utilize rules to locate the physical table(s) and physical databases 24 that store a specific "item-for-sale" that has an item number that matches the hint. Moreover the rules may be modified during runtime to move a logical table to a different physical table and/or physical database.

The query engine 80 builds queries, acquires connections to the database 24 based on a response from an inquiry to the DDR module, executes SLQ queries (e.g., SELECT, INSERT, UPDATE, DELETE, etc.) and moves data to/from database 24 fields in/out of data objects 20. The query engine may be accessed exclusively by the data access object 68 and utilizes java database connectivity (JDBC) application processing interfaces (API) to read/update the database 24.

Figure 4:
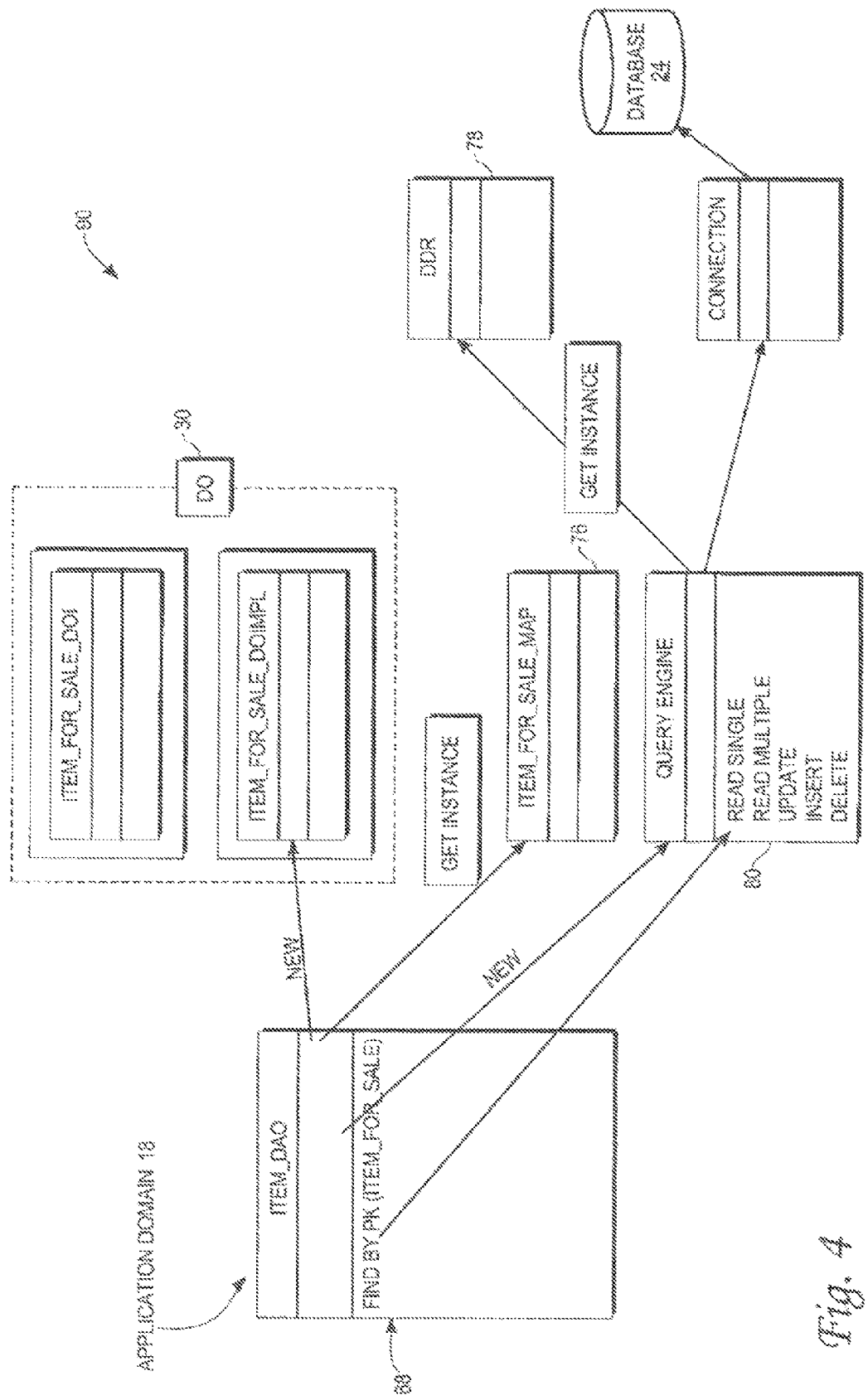
FIG. 4 is a block diagram showing exemplary interactions between hardware and software components of the data access system, according to one embodiment.

FIG. 4 is a block diagram 90 showing exemplary interactions between hardware and software components of the data access system 10. The diagram 90 shows, by way of example, the above components working together to update a data object 20 for an item-for sale. Illustrated on the left is an item-for-sale data access object 68 that receives a request from the application domain 18 for an item-for-sale data object 20, "findByPK" (e.g. find by primary key). Responsive to the request, the data access object 68 may create the item-for-sale data object 20. Next the data access object 68 may direct the query engine 88 to populate the item-for-sale data object 20 by invoking the query engine 88 with a reference to the item-for-sale data object 20, a reference to the item-for-sale map object 76, a query definition that specifies a query template to read from the item-for-sale map object 76 and a read set definition that specifies the columns 53 or field names 52 to return from the database 24. The query engine 88 may utilize mapping between attributes 34 and table fields 52 in the item-for-sale map object 76 to determine the logical table (s) to pass to the DDR module 78. In response, the DDR may return the corresponding physical table and physical database 24 that may be utilized by the query engine 80 to make a connection to the proper database 24 via a connection object. In addition, the query engine 88 may utilize the query definition passed from the item-for-sale data access object 68 to read the proper query template from the item-for-sale map object 76 and substitute runtime values for tags which appear in the query template. Finally, the query engine 88 executes the query and receives results that the query engine 88 may populate to the data object 20.

Figure 5:
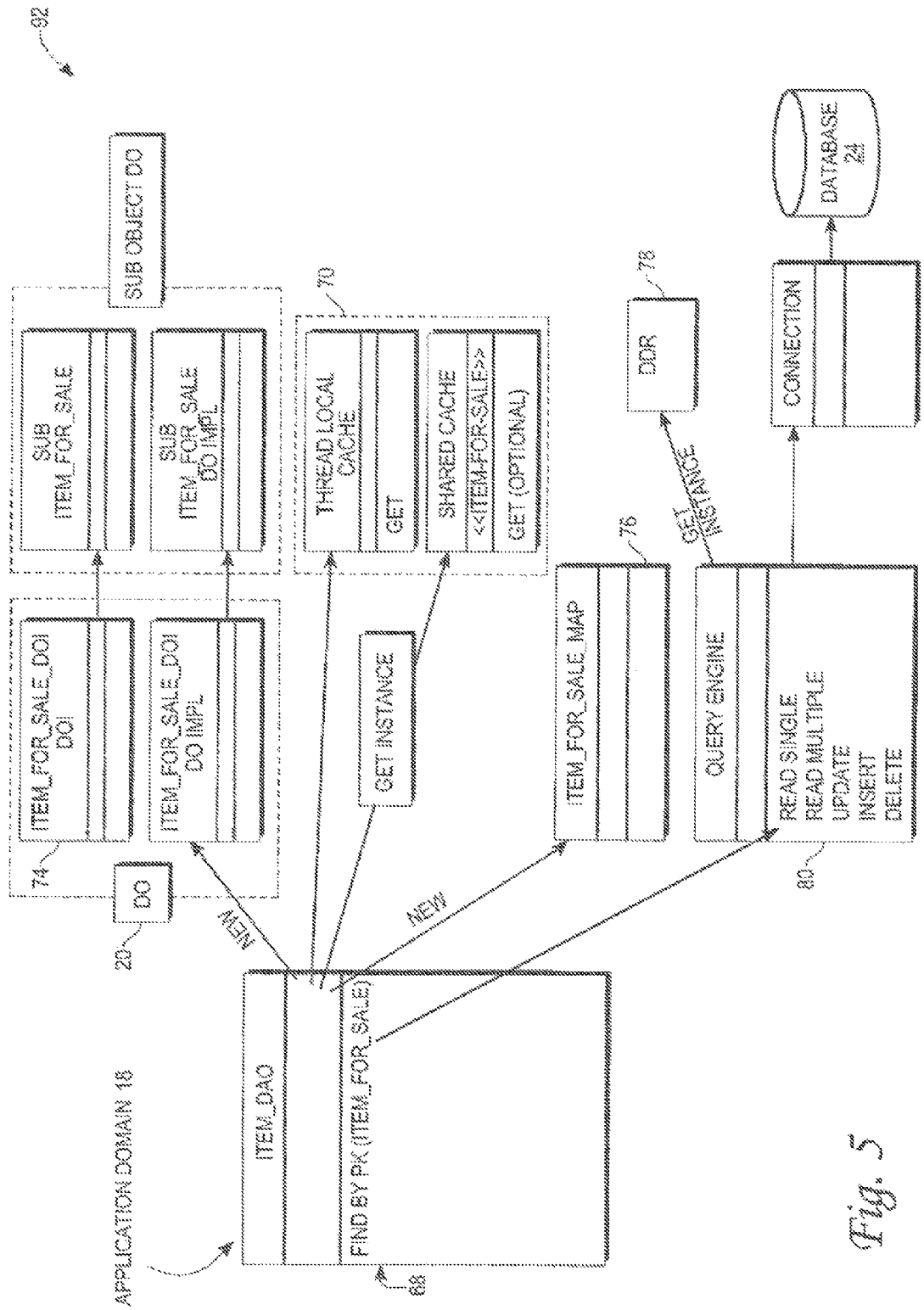
FIG. 5 is a block diagram showing additional exemplary interactions between hardware and software components of the data access system, according to one embodiment.

FIG. 5 is a block diagram 92 showing additional exemplary interactions between hardware and software components of the data access system 10. The data object 20 is shown to include an item-for-sale data object implementation 75 and an item-for-sale data object interface 74. The data object interface 74 is a public interface that may be utilized by the application domain 18. Thus, the data object interface 74 may define a front end to the data object 20 that provides an abstraction layer for different data object implementations 75 that may respectively be utilized to access different persistent storage implementations. For example, one implementation may include getter( ) and setter( )methods that are compatible with one database interface and another implementation may include getter( ) and setter( )methods that are compatible with another database interface or persistent store. The same concept may be utilized with respect to the business object 13. In addition, the application domain 18 may pass additional information that is utilized to identify the requested item-for-sale. For example, the application domain 18 may pass a primary key in the form of an item number to the data access object that, in turn, may pass the item number to the query engine 88 that, in turn, may pass the item number to the DDR module 78 that, in turn, may utilize the item number along with the passed logical table to identify the corresponding physical table and physical database. Such information is referred to as a hint and may be passed by the item-for-sale data access object 68 to the query engine 80 via an attribute in the item-for-sale data object 20 (e.g., referred to as a prototype data object when used in this manner) or via a hint hash table that is defined by meta-data in the item-for-sale map object 76. Finally, the data access object, in some instances, may obtain the item-for-sale data object 20 and the associated item-for-sale from the cache 70 rather than creating the respective objects.

Figure 6:
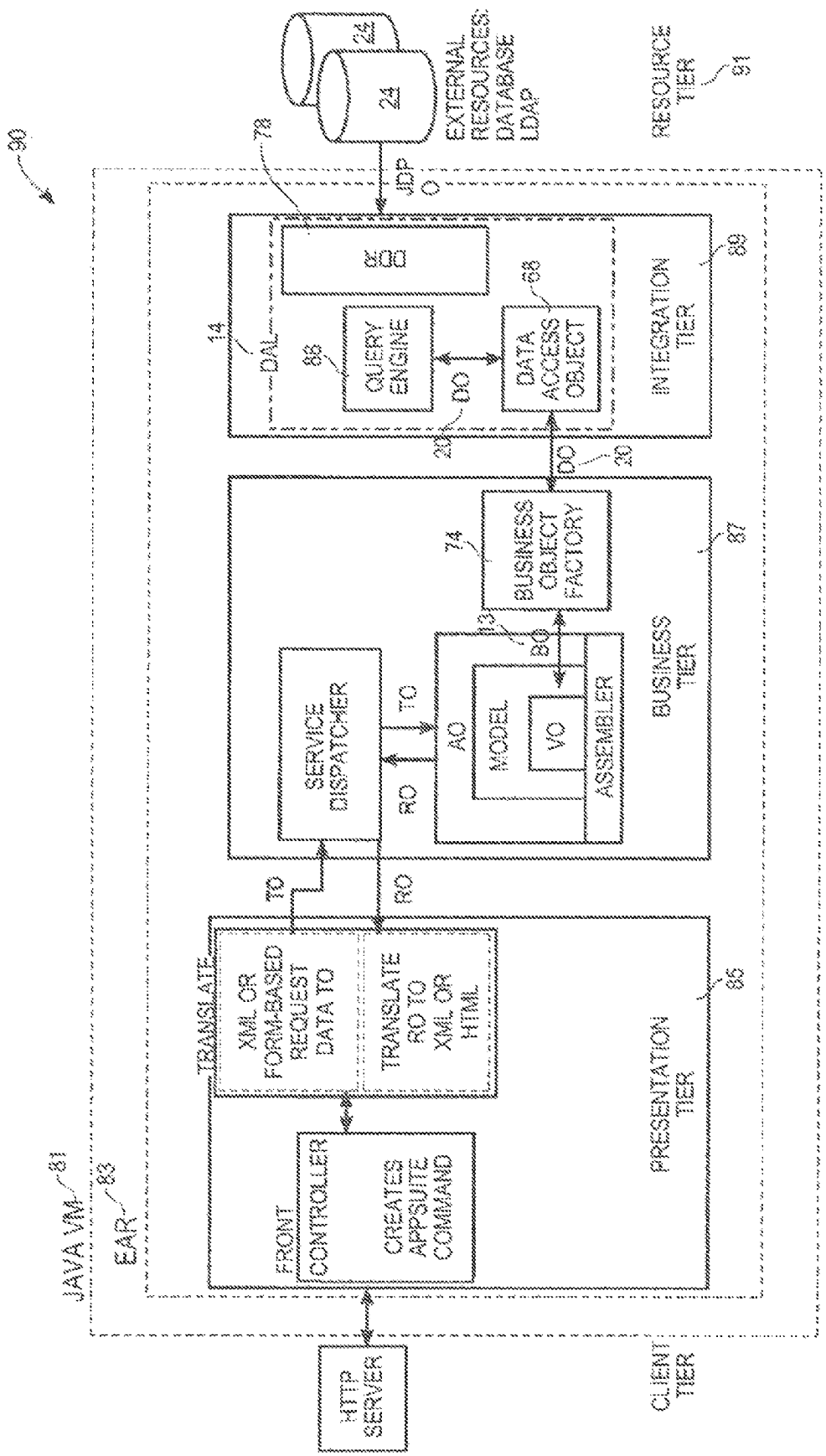
FIG. 6 is a block diagram showing additional exemplary interactions between hardware and software components, according to one embodiment.

FIG. 6 is a block diagram 94 showing another embodiment utilizing the interactions between hardware and software components during execution of the method 90. The method 90 is shown as implemented in a Java Virtual Machine (e.g., process) 81 delivered in an Enterprise Application Archive 83, a standard deployment module based on Java 2 Enterprise Edition. Further, the method 90 is illustrated as implemented in a standardized architecture that is utilized to build enterprise applications. Enterprise applications are typically layered and segmented according to functions that may be characterized according to a presentation tier 85, a business tier 87, an integration tier 89 and a resource tier 91 which respectively correspond to the previously discussed application domain 18, business layer 12, data access layer 14 and persistent layer 16. The presentation tier 85 generates presentations (e.g., HTML, XML, etc.) that are presented to the user and receives responses from the user. The presentation tier 85 is shown to communicate with the business tier 87 that executes business logic and communicate with the integration tier 89 which provides data in encapsulated in data objects 20. The integration tier 89 is shown to communicate with the resource tier 91 which persistently stores the data.

As illustrated, in the above figure and previous figures the data access layer 14 may be an object oriented abstraction for accessing and updating data in a distributed persistence resource (e.g., database 24). All persistence resource CRUD (create, read, update delete) operations may be performed through the data access layer 14 abstraction. Advantages of using the data access layer 14 include decoupling the persistent layer 16 from the other layers, encapsulation and translation of the data 22 from a persistence resource format (e.g., database fields) to objects format (e.g., data objects 20), encapsulation of a failover mechanism. In general, the data access layer 14 provides a consistent, transparent, object oriented application processing interface for accessing and updating the data 22 in distributed persistence resources.

Figure 7:
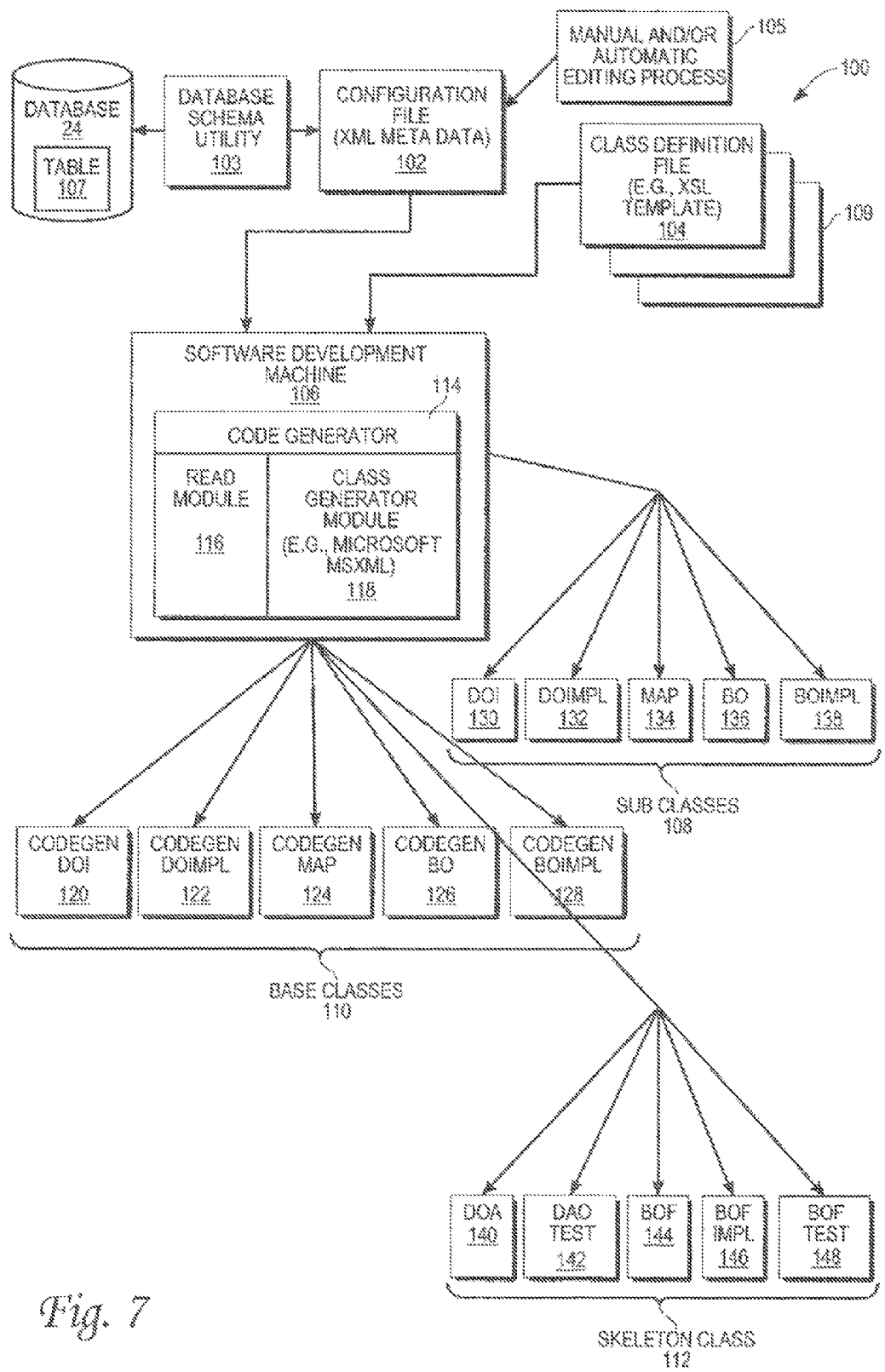
FIG. 7 is a block diagram illustrating a system, according to one embodiment, to automatically generate software.

FIG. 7 is a block diagram illustrating a system 100, according to an exemplary embodiment, to automatically generate software. The system 100 is shown to include a software development computer or machine 106 that reads a configuration file 102 and a class definition file 104 and generates a class that may be categorized as a subclass 108, a base class 110, or a skeleton class 112. A class may be likened to a cookie cutter. For example, a cookie cutter may be used to cut a cookie that resembles the cookie cutter. In a similar manner, a class may be used to instantiate (e.g., generate) a data object 20 at runtime that bears the imprint of the class (e.g., attribute names, attribute types, and other meta-data).

The configuration file 102 may include meta-data in the form of XML meta-data to generate classes for an object to relational mapping system, also in accordance with the invention. The configuration file 102 may include meta-data that is generated by a data base schema utility 103 that automatically generates the meta-data and an editing process 105 that may utilize manual and/or automatic processes to generate the meta-data.

The data base schema utility 103 reads one or more databases 24 that include at least one table 107 and generates XML meta-data in the form skeleton information describing a data object 20. The skeleton information may include one or more attributes that are assigned names based on the names of the fields in the table 107. In addition, each attribute may be assigned an assumed type, and a logical table name.

The class definition file 104 includes one or more templates 109 that include definitions for classes that are generated by the software development machine 106. Specifically, each template defines rules that may be applied to the meta-data in the configuration file to generate a class (e.g., the subclass 108, the base class 110 or the skeleton class 112). The template 109 may include inheritance information that may be applied to the class. For example, a template 109 may take the form of an XSL templates defined in XSL Transformations (XSLT), published by the World Wide Web consortium (2004).

The software development machine 106 includes a code generator 114 that includes a read module 116 and a class generator module 118. The read module 116 may be utilized to read the class definition file 104 and the configuration file 102. The class generator module 118 generates the appropriate class responsive to receiving the corresponding meta-data from the configuration file 102 as directed by the rules and meta-data in the appropriate (e.g., selected) template 109.

The base classes 110 have progeny in the respective subclasses which inherit from the base class 110. The base class 110 includes a codegen (code generator) data object interface class 120, a codegen data object implementation class 122, a codegen map class 124, a codegen business object interface class 126 and a codegen business object implementation class 128. The base classes 110 may include boiler plate and infrastructure code that may automatically be regenerated after the initial generation. The prefix "codegen" may be used to identify a base class 110 that may be regenerated on successive regenerations of the software.

The subclasses 108 may inherit from the base classes 110. For example, a data object interface class 130 may inherit from a codegen data object interface class 120. The subclasses 108 may include the data object interface class 130, a data object implementation class 132, a map class 134, a business object interface class 136, and a business object implementation class 138. The subclasses 108 may be generated once and provide for the addition of custom code that may take the form of a method that abstracts the data in a custom manner or a method that overrides a corresponding method in the base class 110, or a method that augments functionality in the corresponding base class 110 (e.g., adds functionality not provided for by the base class 110).

The skeleton classes 112 may be generated only once and provide for the addition of custom code. The skeleton classes 112 includes a data access object class 140, a data access object test class 142, a business object factory class 144, a business object factory implementation class 146, and a business object factory test class 148. The data access object test class 142 and the business object factory test class 148 may be utilized to add custom code to unit test all of the related classes (e.g., a subclass 108, a base class 110, and a skeleton class 112). The term "factory" as included in the above mentioned classes denotes, but is not limited to, an object that encapsulates the creation of objects inside a single interface. The data access object class 140 is also a factory, but it has significant additional responsibilities in carrying out CRUD operations on the data objects 20.

Figure 8:
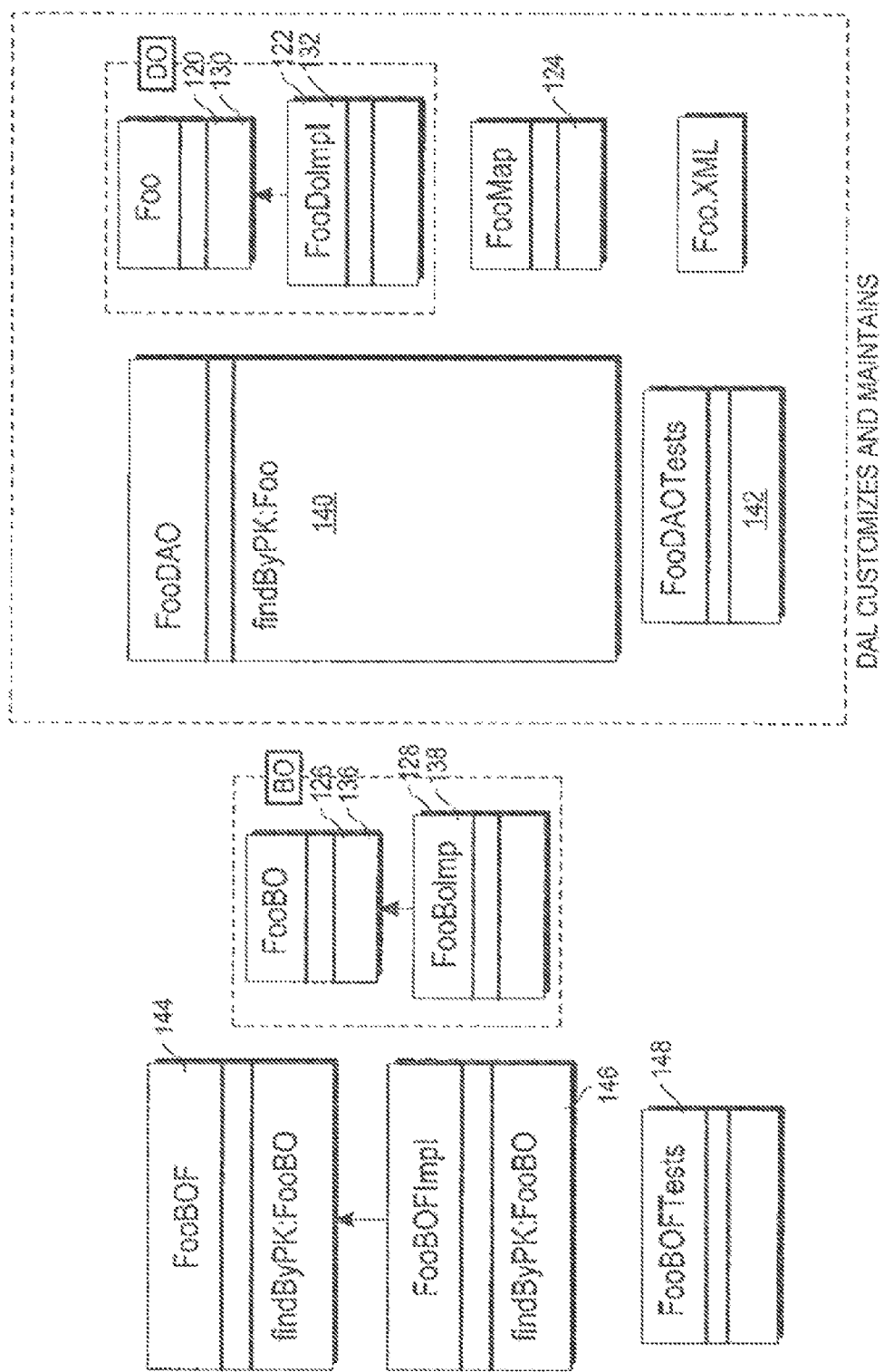
FIG. 8 is a block diagram illustrating classes that may be generated for a new exemplary object, Foo.

FIG. 8 is a block diagram illustrating classes, according to one embodiment, that may be generated for a new exemplary object Foo. The same reference numerals identify the same or similar classes previously described.

FIG. 9 shows an exemplary configuration file 102 and a class definition file 104 that are utilized to automatically generate and regenerate software for accessing data, according to one embodiment. The configuration file 102 includes meta-data for describing a data object and related software that may be required to facilitate the data object to function in an information system. Other embodiments may include meta-data for describing multiple data objects and their corresponding related software.

The configuration file 102 includes data object skeleton information 200, code generation attributes 202, imports 204, field mappings 206, DDR hint definitions 232, query information 234 and data access object skeleton information 208. The data object skeleton information 200 may be generated by the database schema utility 103 and has been described above. The code generation attributes 202 may include attributes relating to the class name, package names for the generated code, top level controls of generated classes and tracking information.

The imports 204 may include statements that may be added to the generated classes and include data object import statements 210 and business object import statements 212. The imports 204 may only be required for custom sub-object types.

The field mappings 206 may include the meta-data for mapping data. The field mappings 206 are shown to include query definitions 214, set definitions 216, table definitions 218, table joins 222, and field mappings 224.

FIG. 10A illustrates an exemplary query definition 214. Each query definition 214 includes a query name 215 that may be used to reference the queries that are defined in the map object 76. For example, the query name 215 for the "find by primary key" query and the "insert primary key" query are illustrated.

FIG. 10B illustrates exemplary set definitions 216. The set definitions 216 define constants 217 that may be used to reference the reads sets and update sets that are defined in the map object 76. For example, definitions for the "minimum" read set and the "minimum" update set are illustrated.

FIG. 10C illustrates an exemplary table definition 218. The table definition 218 defines a logical table name 240 and a logical table alias 242 for the logical table name 240. For example, table definitions 218 for the "User" logical table and the "UserInfo" logical table are defined with respective aliases "u" and "ui".

FIG. 10D illustrates an exemplary table join 222. The table join 222 includes an SQL join snippet 244 (e.g., a fragment of an SQL statement) and two logical table names 240. The SQL join snippet 244 includes two logical table alias' 242 that appear connected by a period (".") to the respective field names 52 (e.g., u.ID).

Returning to FIG. 9, the field mappings 224 include definitions for attributes 34 in the data object 20. Each attribute 34 may be defined as utilizing full field mapping 246, hint field mapping 248, hashhint field mapping 250, contained field mapping 252, or subobject field mapping 254.

FIG. 10E illustrates an exemplary full field mapping 246. The full field mapping 246 may be used to map data between a data object attribute and a table column 53. The full field mapping 246 is shown by way of example to include a full name 247, a logical table name 240, a field name 52 (e.g., column 53), an attribute type, and indicators for getter( ) and setter( )methods. The full name 247 may be utilized to generate an attribute name 256 (not shown) that may be used on getter( ) and setter( )methods included in the data object implementation 75 and the data object interface 74. In addition, the attribute name 256 may be prefixed with "m_" (e.g., m_id) to create a variable name for the attribute 34 on the data object implementation 75 and prefixed with ":m" (e.g., :m_id) for SQL reference. The logical table name 240 and the field name 52 may be utilized to persistently store the attribute 34 in the database 24. The indicators may be used for creating getter( ) and setter( )methods for the data object 20 and the business object 13 with the asserted value (e.g., TRUE) indicating to create the methods. Transformation functions can also be associated with the mapping to transform the data either being read from the database and/or being written to the database (e.g. transforming a boolean attribute to and from a value of 0 or 1 in the database).

FIG. 10F illustrates an exemplary hint field mapping 248. The hint field mapping 246 includes a hint name 249 and other attributes that that may be utilized to generate an attribute name 256 (not shown) as previously described. The hint field mapping 248 may identify an attribute in a data object 20 that may be utilized to pass a hint to the DDR module 78 or as additional selection criteria in the WHERE clause for a query (e.g. range values for a start and end date) and therefore it need not be associated with a field name 52 (e.g., column 53) or a logical table name 240 to persistently store data.

FIG. 10G illustrate an exemplary hash hint field mapping 250. The hash hint field mapping 250 includes a hash hint name 251 that may be utilized to generate an attribute name 256 (not shown) as previously described. The hash hint value may be stored in an internal hash table in a codegen data object implementation class 122. The hash hint value may be utilized to pass a hint to the DDR module 78 or as additional selection criteria in the WHERE clause for a query and therefore it need not be associated with a field name 52 (e.g., column 53) or a logical table name 240 to persistently store data. The attribute name 256 may be used for SQL reference, (e.g. :+startTime).

FIG. 10H illustrates an exemplary contained field mapping 252. The contained field mapping 252 includes attributes for a contained subobject. The contained field mapping 252 includes a contained name 253 that may be utilized to generate an attribute name 256 (not shown) as previously described. The contained field mapping 252 includes a map class name 221 of the map (e.g., ContactInfoMap) for the contained subobject with .getInstance( ) appended, an object class name 223 of the contained subobject (e.g., ContactInforDoImpl) with ".class" appended, an attribute type 229 (e.g., Currency) which is the external type for the contained subobject (e.g. DOI) and other attributes that have previously been described. A contained field mapping allows for the data for a contained sub-object to be retrieved in the same query as the query for the parent object.

FIG. 10I illustrates an exemplary subobject field mapping 254. The subobject field mapping 254 includes a subobject name 255 that may be utilized to generate an attribute name 256 (not shown) as previously described. The subobject field mapping 254 includes attributes for a non-contained subobject. The subobject field mapping 254 includes a foreign key attribute name 227 from the subobject (e.g., currencyID) that may be used to set a foreign key value onto a containing parent's foreign key attribute (e.g. billing currency) for the subobject, when a subobject is assembled onto a parent object (e.g. setting a currency object onto a user object as its billing currency, the value of the currency ID of the currency object is copied to the user object's billing currency ID attribute).

FIG. 10J illustrates an exemplary ddr hint definition 232, according to one embodiment. The ddr hint definition 232 defines a default global hint definition 260 and named specialized hint definitions 263. The default global hint definition 260 and the named specialized hint definitions 263 include one or more member names 261. The member name 261 corresponds to a full name 247, or a hint name 249 or a hash hint name 251 (e.g., the definitions for the full name 247, hint name 249 and/or hash hint name 251 are associated with the member name 261).

FIG. 10K illustrates an exemplary read set 228. Each read set 228 defines a set of attributes 34 that the application domain 18 may request to be read from the database 24 and populated to the data object 20. Each read set 228 may include a read set name 262, one or more member names 261 and an optional full set flag that may be asserted TRUE (e.g., read all attributes of the data object 20). The member name 261 corresponds to a full name 247 (e.g., the definitions for the full name 247 are associated with the member name 261).

FIG. 10L illustrates an exemplary update set 230. Each update set 230 defines a set of attributes 34 that may be updated from the data object 20 to the database 24. Each update set 230 may include an update set name 258, one or more member names 261. The member name 261 corresponds to a full name 247 (e.g., the definitions for the full name 247 are associated with the member name 261).

FIG. 10M illustrates the query information 234, according to one embodiment, for a SELECT SQL query template. The query information 234 includes a query name 215, as defined in the query definitions 214, a read set name 262, and a query template 384. The query name 215 and the read set name 262 may be utilized to identify the corresponding query template 384. The query template 384 includes static query fields that may include standard SQL language (e.g., SELECT, FROM, WERE, etc.) and dynamic query fields that may include place holders (e.g., <SELECTFIELDS/>, <TABLES/>, :m_userId, <JOIN/, etc.> that may be substituted for specific content at run time. Although a single SELECT SQL query template 384 is illustrated it will be appreciated that other types of query templates 384 may be defined (e.g., INSERT, UPDATE, DELETE, etc.).

Returning to FIG. 9, the data access object skeleton information 208 includes method skeleton definitions. The method skeleton definitions include a method name, a return type, a method type (i.e. finder, update, insert, delete, etc.), a list of argument definitions containing argument name and type, etc. This information is used to generate a skeleton method in the data access object classes that has all of this information incorporated into it and some initial basic code in it for performing the indicated method type operation, as well as having the proper associated exception declarations on the method signature.

The class definition file 104 includes a template 109 (see FIG. 7) for each class that is generated by the code generator 114. For example, the class definition file 104 may include a data object interface template 280, a codegen data object interface template 282, a data object implementation template 284, a codegen data object implementation template 286, a map template 288, a codegen map template 290, a business object interface template 292, a codegen business object interface template 294, a business object implementation template 296, a codegen business object implementation template 298, a data access object template 300, a data access object test template 302, a business object factory template 304, a business object factory implementation template 306, and a business object factory test template 308. Each template may specify meta-data to extract from the configuration file 102 and definitions to generate the corresponding class. It will be appreciated that other templates may be provided, in addition to or instead of, the exemplary templates shown in the class definition file 104.

Figure 11:
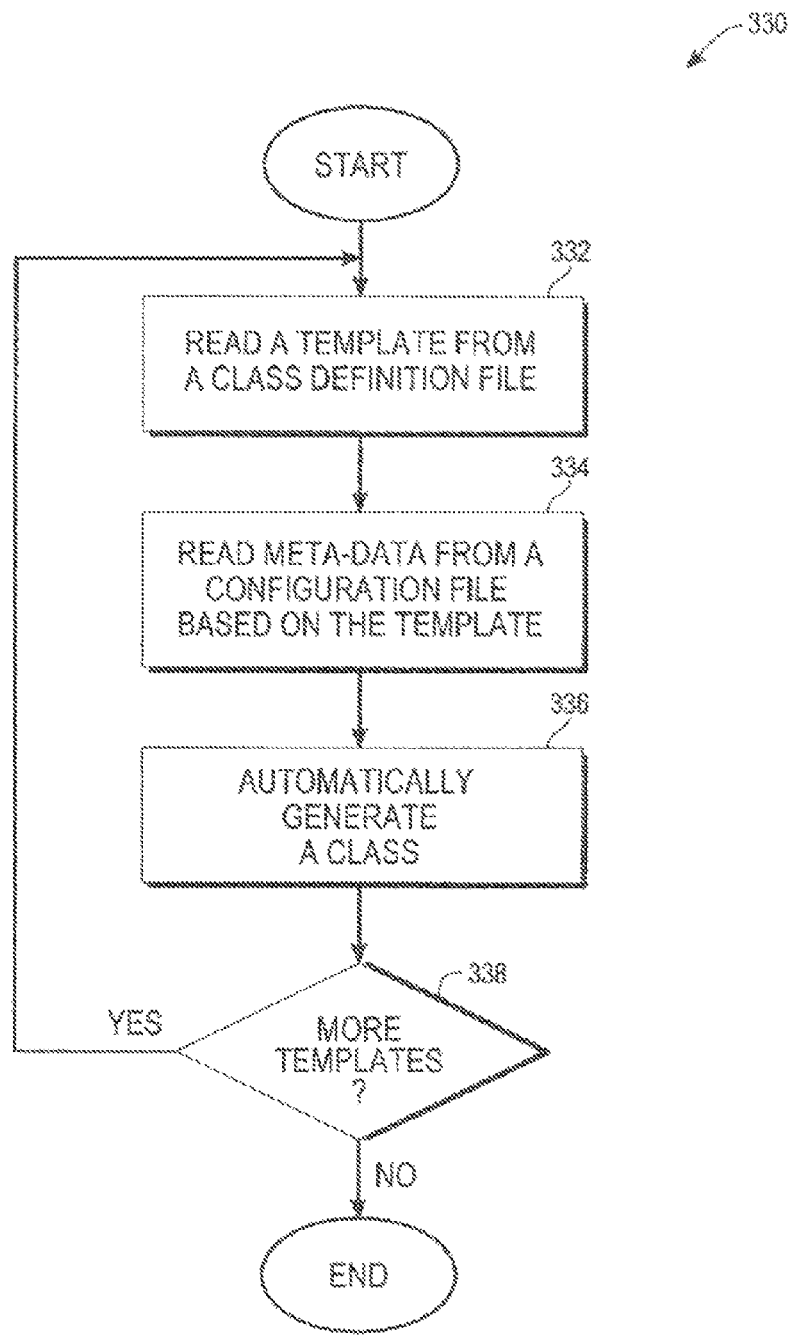
FIG. 11 is a flow chart illustrating a method, according to one embodiment, to automatically generate software for accessing data.

FIG. 11 is a flow chart illustrating a method 330, in accordance with the invention, to automatically generate software for accessing data. The method 330 is described by way of example with reference to the system described above and commences at operation 332 with the read module 116 reading an XSL template 109 from a class definition file 104. At operation 334, the read module 116 utilizes the XSL template 109 to read the appropriate XML meta-data from the configuration file 102. Thereafter, at operation 336, the class generator module 118 utilizes the XML meta-data to automatically generate the class as defined by the XSL template 109.

At decision operation 338, the read module 116 determines if there are more templates 109 in the class definition file 104. If there are more templates 109 in the class definition file 104 the read module 116 branches to operation 332. Otherwise the method 330 ends.

Thus, broadly, a method and system to generate software code for an object to relational mapping system have been described. This approach includes the automatic generation of multiple and related classes that are utilized to instantiate objects and provide meta-data that facilitate object to relational mapping for a specific class as described herein. This approach may allow increased productivity by eliminating hand coding of software code in the related classes leading to consistent, maintainable, and robust software code by reducing mistakes and variations created by hand coding of the related classes.

Figure 12:
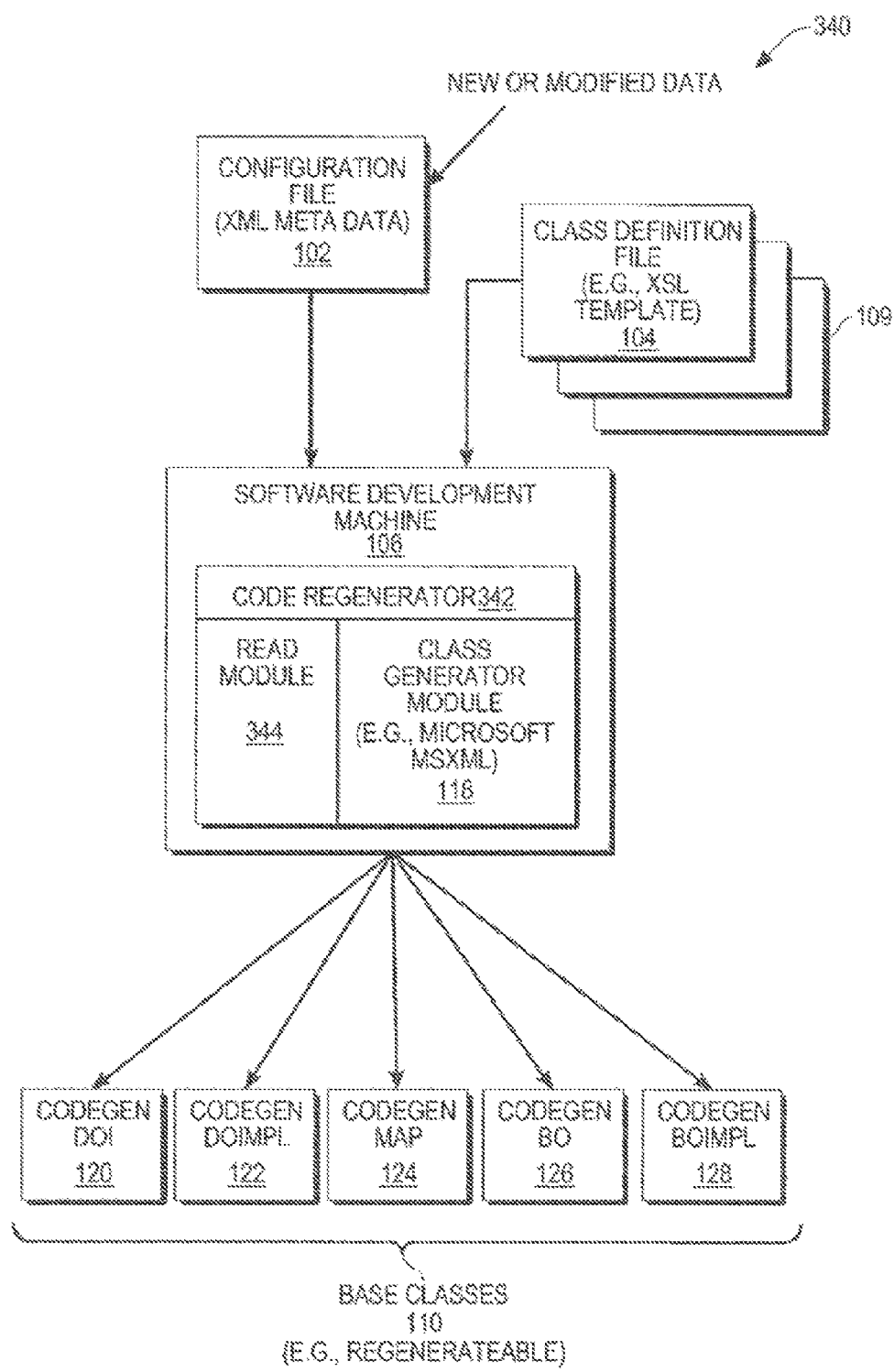
FIG. 12 is a block diagram illustrating a system, according to one embodiment, to automatically regenerate software for accessing data.

FIG. 12 is a block diagram illustrating a system 340, in accordance with an embodiment of the invention to automatically regenerate software for accessing data. The system 340 is shown to include a software development computer or machine 106 that reads a configuration file 102 and a class definition file 104 and regenerates classes for a base class 110.

The configuration file 102 may include meta-data in the form of XML meta-data that has been modified. For example, the configuration file 102 may include additions, modifications, or deletions of meta-data in the configuration file 102 that were originally utilized to generate the base classes 110. In this manner, the base classes 110 may be regenerated without impacting custom code included in the originally generated subclasses 108 and/or the skeleton classes 112. For example, an attribute may be added or removed from a base class 110, an attribute may be relocated to a different logical table, or an SQL statement may be modified that is utilized by one of the classes in the base class 110. Each of these exemplary changes may be included in the bases classes 110 through code regeneration without impacting on custom code that is associated with a class in the subclass 108 and/or the skeleton class 112.

The class definition file 104 (see FIG. 9) is shown to include the codegen data object interface template 282, the codegen data object implementation template 286, the codegen map template 290, the codegen business object template 298, and the codegen business object implementation template 306.

The software development machine 106 may include a code regenerator 342 that includes a read module 344 and a class generator module 118. The read module 344 may be utilized to read the class definition file and the configuration file 102. The class generator module 118 generates the appropriate class responsive to receiving the appropriate meta-data from the configuration file 102 as directed by rules and meta-data in the corresponding template 109.

Figure 13:
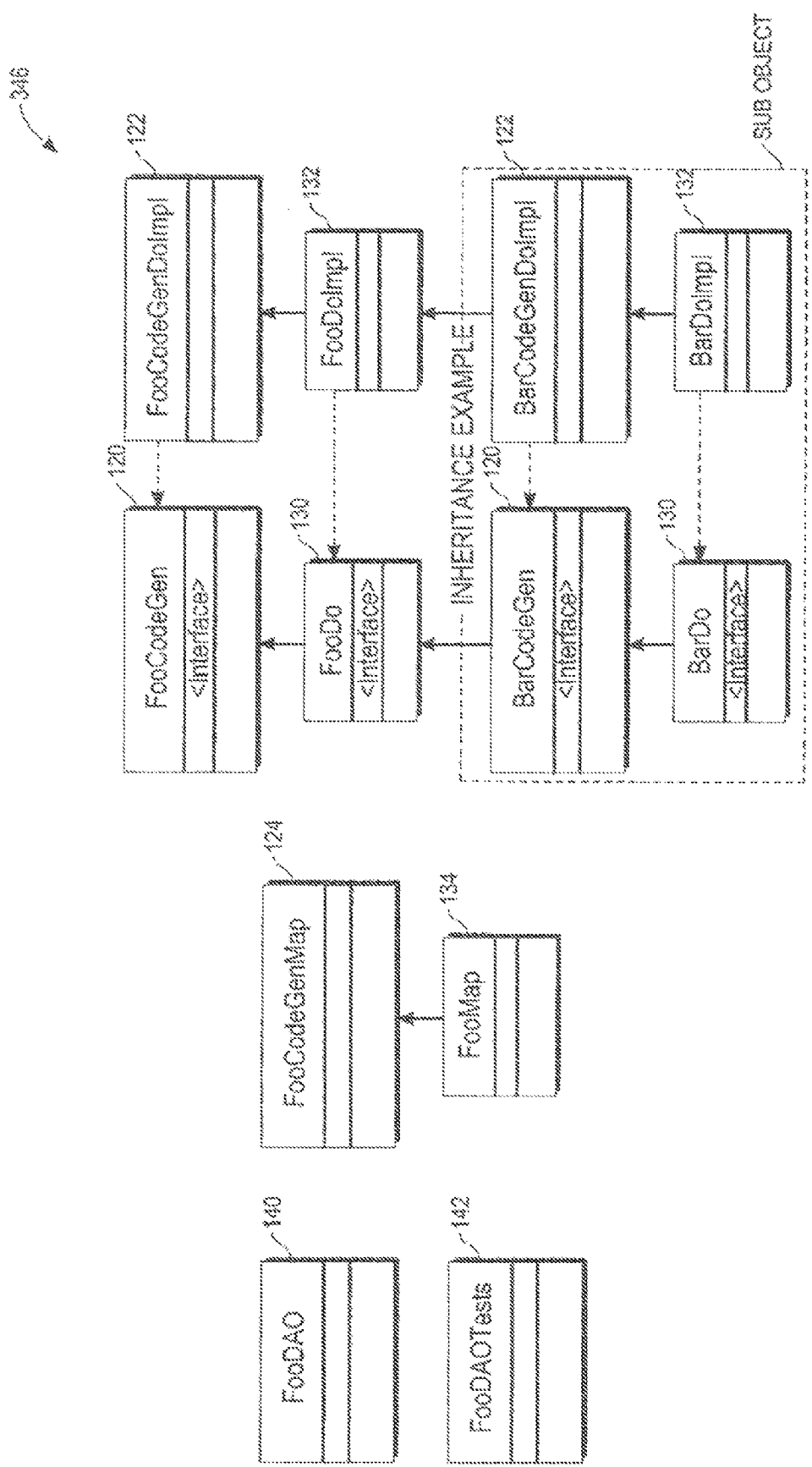
FIG. 13 is a block diagram illustrating exemplary classes that may be generated for a data access layer.

FIG. 13 is a class diagram illustrating exemplary data access layer classes 346 that may be generated for an exemplary object Foo and an exemplary sub-object Bar. The same reference numerals identify the classes previously discussed. The arrows indicate inheritance relationships. Horizontal arrows indicate an interface inheritance and vertical arrows indicate extension of an object inheritance. For example, as illustrated, a bar data object interface class 130 inherits from a BarCodeGen data object interface class 120 that, in turn, inherits from a Foo data object interface class 130 that, in turn, inherits from a FooCodeGen data object interface class 120. Another example may include a bar data object implementation 132 that inherits from the bar data object interface class 130.

Figure 14:
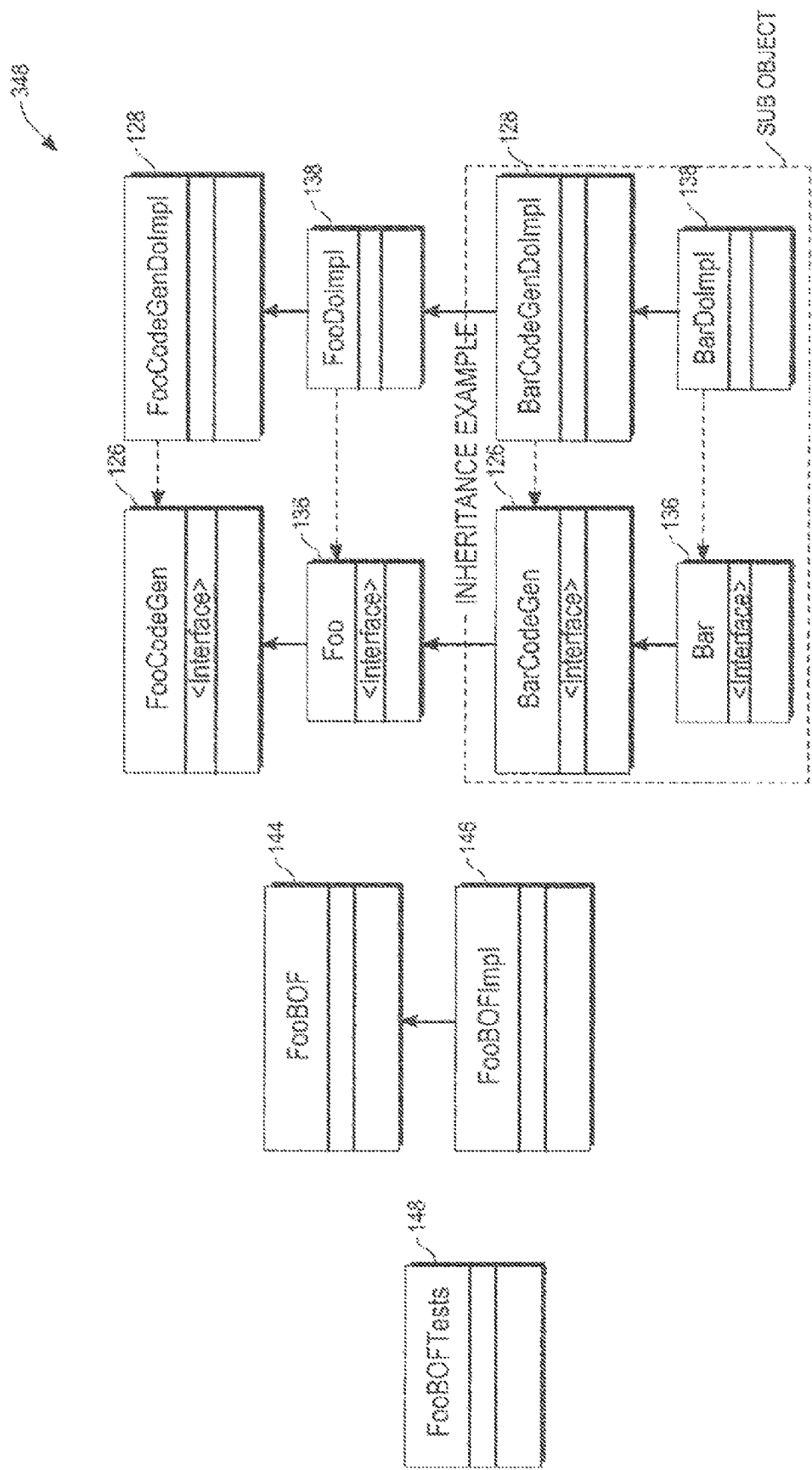
FIG. 14 is a block diagram illustrating exemplary classes that may be generated for a business object layer.

FIG. 14 is a block diagram illustrating exemplary business object layer classes 348 that may be generated for an exemplary object Foo. The same reference numerals identify the classes previously discussed.

Figure 15:
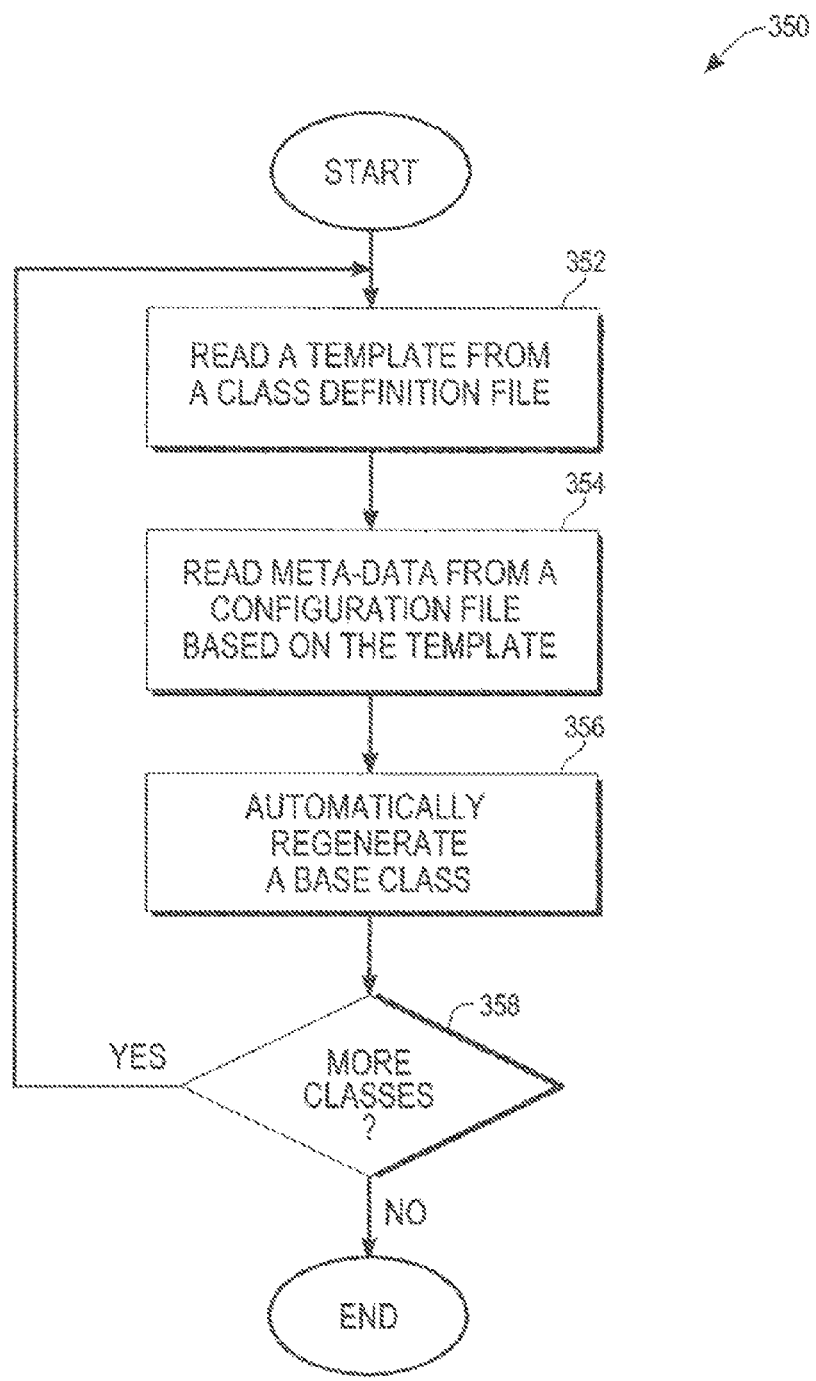
FIG. 15 is a flow chart illustrating a method, in accordance with an embodiment, to automatically regenerate software for accessing data.

FIG. 15 is a flow chart illustrating a method 350, in accordance with an aspect of the invention, to automatically regenerate software for accessing data. The method 350 is described by way of example to the system described above and commences at operation 352 with the read module 344 reading an XSL template 109 from a class definition file 104. Thereafter, at operation 354, the read module 344 utilizes the XSL template 109 to read the appropriate XML meta-data from the configuration file 102. At operation 356 the class generator module 118 utilizes the XML meta-data to automatically generate a base class 110 as defined by the XSL template 109. For example, the class generator module 118 may regenerate a codegen data object interface class 120, a codegen data object implementation class 122, a codegen map class 124, a codegen business object interface class 126 or a codegen business object implementation class 128 (see FIG. 12).

At decision operation 358, the read module 344 determines if there are more templates 109 in the class definition file 104. If there are more templates 109 in the class definition file 104 the read module 344 branches to operation 332. Otherwise the method 340 ends.

In one embodiment the method and system to regenerate software code may include base classes 110 (e.g., the codegen map class 124, the codegen business object interface class 126 and the codegen business object implementation class 128 shown by way of example in FIG. 7)) that may include meta-data and code that are sufficient for partial population of a data object 20. For example, the codegen map class 124 may include code embodying the meta-data for a read set 228 that includes field mappings 206 that do not name all of the attributes 34 in the data object 20, and a query information 234 (see FIG. 9) that may include a query template that references the read set 228. In addition, the codegen business object interface class 126 and the codegen business object implementation class 128 may include methods to invoke the data access object 68 to utilize the query information 234 with the read set 228 that specifies the partial fill.

Thus, a method and system to automatically regenerate software has been described. Although the invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

Figure 16:
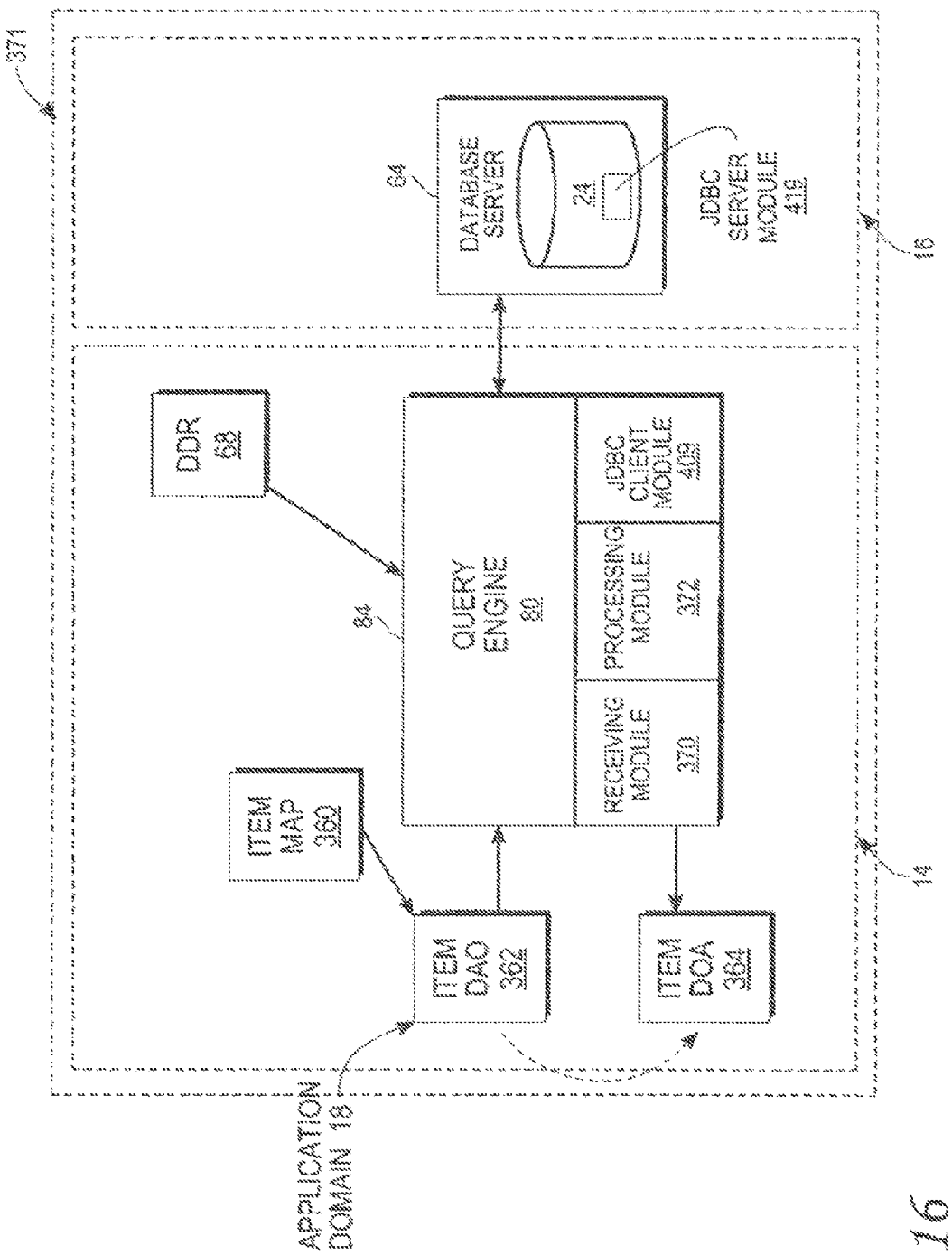
FIG. 16 is a block diagram illustrating exemplary interactions between hardware and software components of a data access system, according to one embodiment.

FIG. 16 is a block diagram illustrating exemplary interactions between hardware and software components of a data access system 371, according to one embodiment. The data access system 371 corresponds to the data access system 10 and, accordingly, the same or similar references have been used to indicate the same or similar features unless otherwise indicated. Broadly, the data access system 371 dynamically constructs and executes query language statements and is shown to include, an item map 360, an item data access object 362, an item data object 364, a query engine 80, a data dependent routing (DDR) module 78, a database server 64, and a database 24. The item data access object 362 is shown to receive a request for an item data object 364 from the application domain 18. The request may include a primary key to locate the item data object 364 in the database 24 and an indication of attributes 34 in the item data object 364 that should be populated. For example, the item data access object 362 may receive an item number (e.g., primary key) that may be used to locate a cereal box (e.g., item) in the database 24 and an indication that only the description of the cereal box is requested (e.g., the column 53 corresponding to the description attribute 34 should be the only column 53 requested in the query to the database and should be the only attribute 34, besides the provided item id, populated onto the item data object 364 returned). In response, the item data access object 362 gets a new item data object 364, initializes the item data object 364 with the item number (e.g., prototype item data object), gets a reference to the item map 360 and requests the query engine 80 to populate the attribute for description in the item data object 364.

The query engine 80 is shown to include a receiving module 370, a processing module 372, and a JDBC client module 409. The receiving module 370 may receive the request from the item data access object 362 including the reference to the new item data object 364, the reference to the item map 360, the request to find the item data object 364 by the primary key and the request to populate only the description in the item data object 364. The processing module 372 may utilize the request to find the appropriate query template that may be utilized to generate query statement 427 with appropriate content (i.e. the combination of columns 53 to be selected or updated, appropriate driver bind position markers within the statement, appropriate query language constructs like IN, JOIN, etc., and other content) that may include runtime information or values from a number of different sources. In addition, the processing module 372 may utilize the DDR module 78 to identify the specific physical table name to be stored into the query statement based on the query template and the physical database for the query to be executed against. In certain embodiments, the processing module 372 may execute the final composed query statement 427 by communicating through a JDBC client module 409 (e.g., JDBC driver) that, in turn, communicates with a JDBC server module 419 on the database server 64. Finally the processing module receives the results from the database server 64, and populates the item data object 364 with the results.

Figure 17:
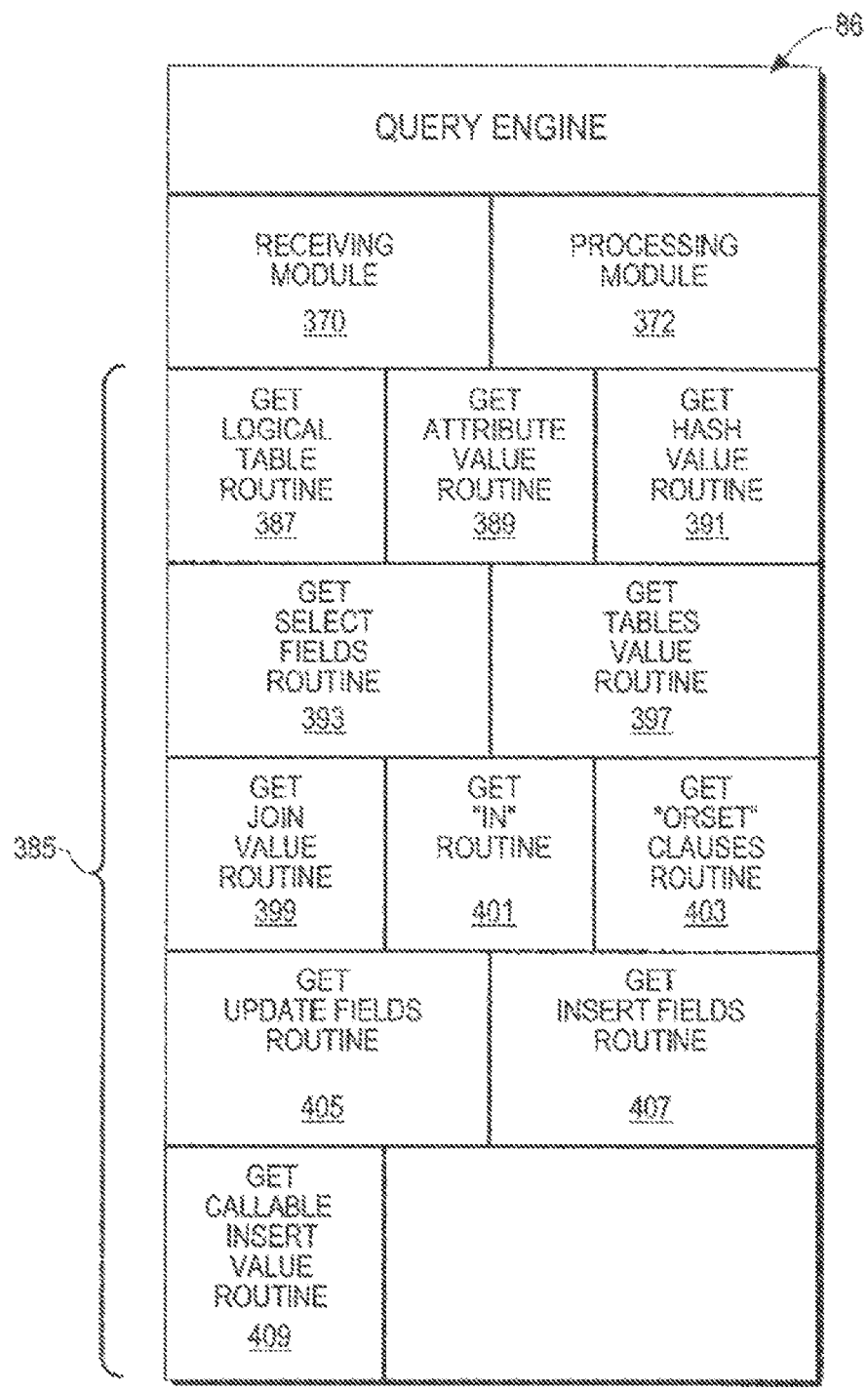
FIG. 17 is a block diagram illustrating exemplary software components in a query engine, according to one embodiment.

FIG. 17 is a block diagram illustrating exemplary software components in the query engine 80, according to one embodiment. The software components include a receiving module 370, a processing module 372, get value routines 385 including a get logical table routine 387, a get select fields routine 393, a get update fields routine 405, a get insert fields routine 407, a get attribute value routine 389, a get hash value routine 391, a get tables value routine 397, a get join value routine 399, a get "IN clause" routine 401, and a get "ORSET clauses" routine 403. The receiving module 370 may be utilized to receive a request from the item data access object 362 that, in turn, is servicing the request from the application domain 18. The request may implicitly specify the type of query operation (e.g., SELECT, UPDATE, INSERT, DELETE, PL/SQL, etc.). The request for a SELECT query operation may also include selection criteria to find a specific object (e.g., primary key or secondary key) or selection criteria to find all objects matching selection criteria (e.g., all items that are listed for sale by John Doe). The processing module 372 may select a predefined query template based on the request, parse the query template for place holders, and/or use a cache version of the parsed query template, invoke the get value routines 385 listed above and/or the DDR module 78 based on the place holders in the query template, generate a query statement 427 based on the query template, query the data base based on the generated query statement 427, receive the results and, populate the results to the data object(s) 20.

Figure 18A:
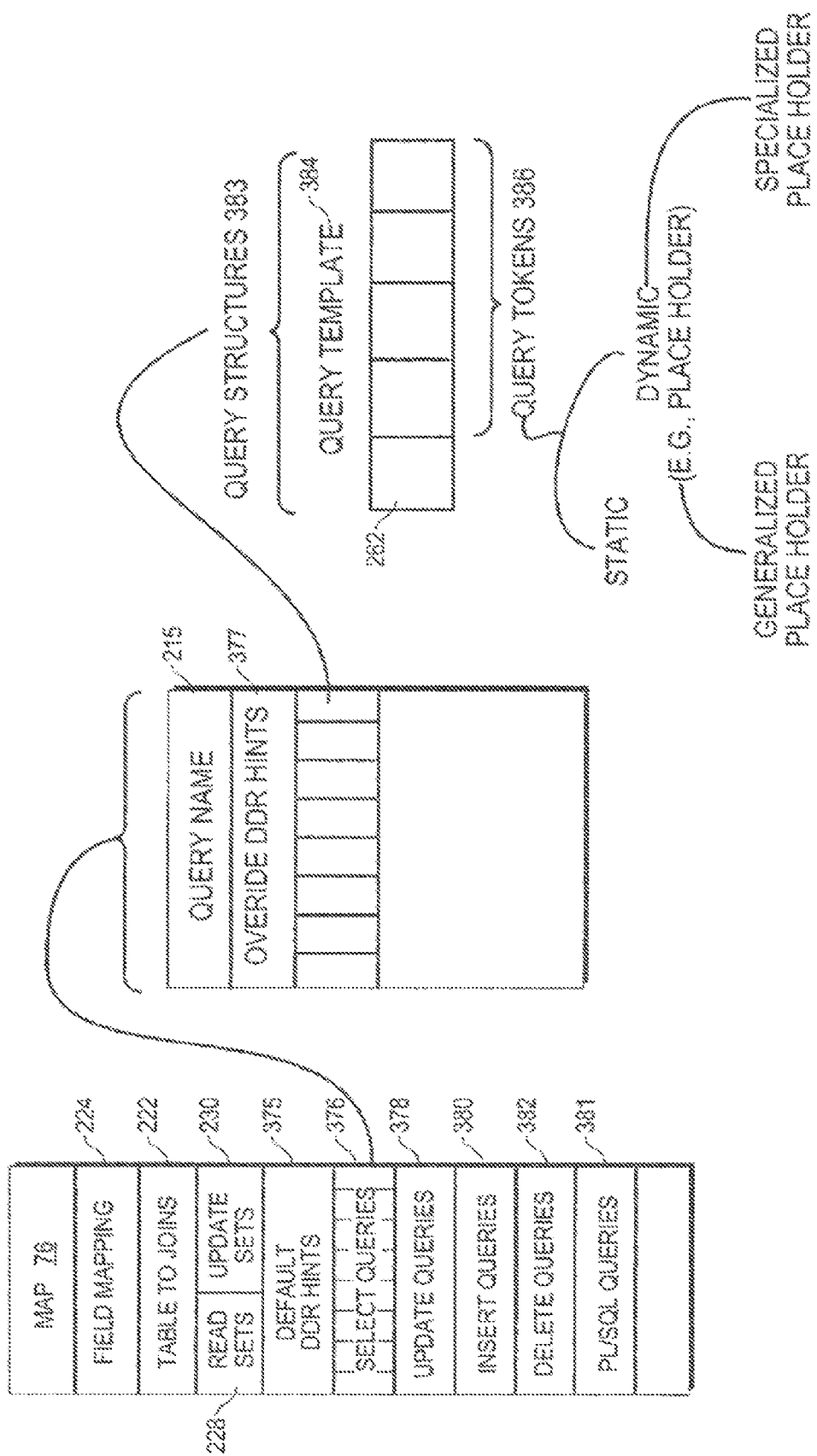
FIG. 18A is a block diagram illustrating various components of a map, according to one embodiment.

FIG. 18A is a block diagram illustrating various components of an exemplary map object 76, according to one embodiment. The map object 76 is illustrated as including field mapping 224, table joins 222, read sets 228, update sets 230, default DDR hints 375, select queries 376, update queries 378, insert queries 380, delete queries 382, PL/SQL queries 381 and other meta-data. The methods and meta-data included in the map object 76 may be dedicated to providing services for a specific type of data object 20 (e.g., an exemplary item data object).

Figure 18B:
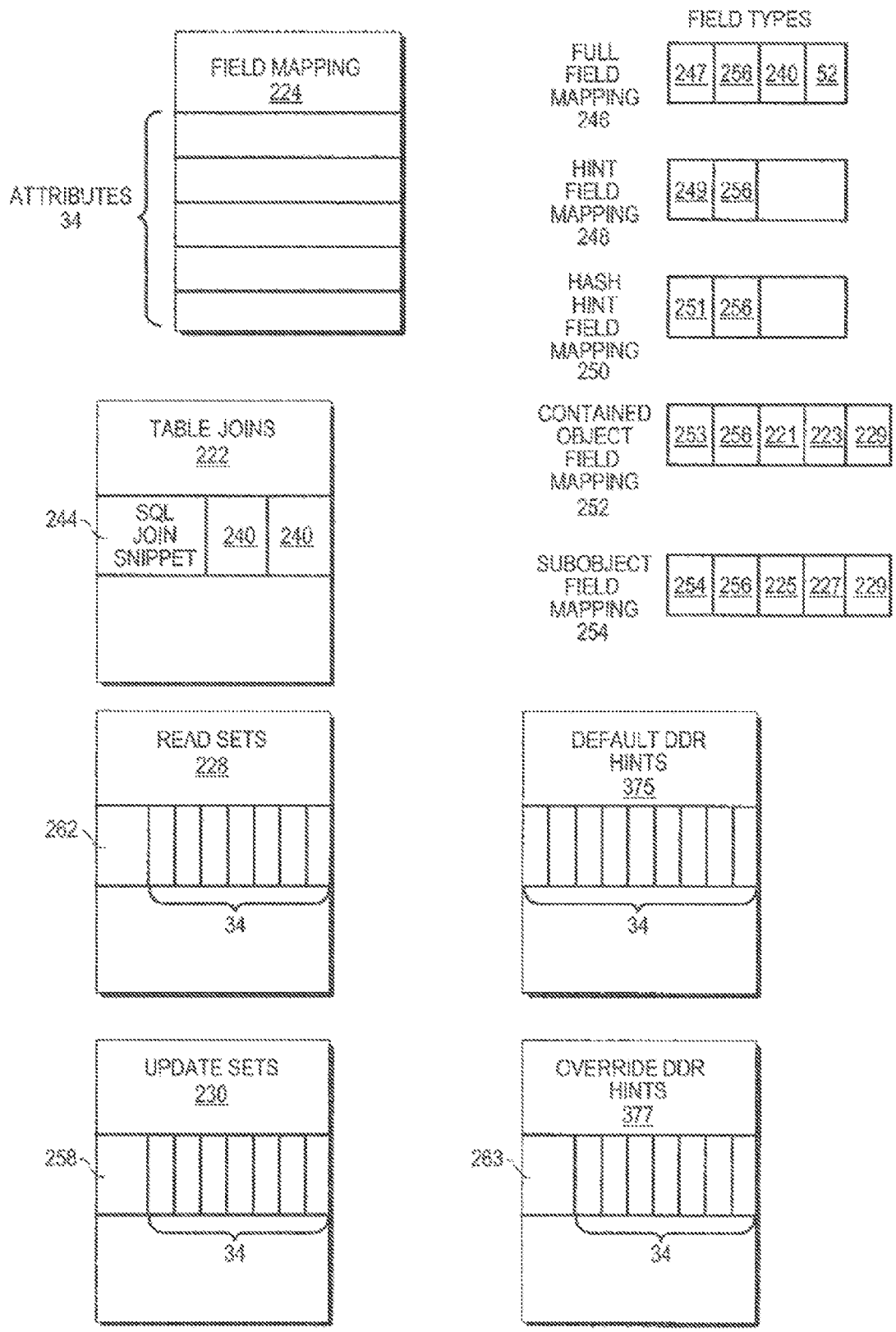
FIG. 18B is a block diagram illustrating various further exemplary components of the a map.

FIG. 18B is a block diagram illustrating various further exemplary components of the map object 76, according to one embodiment. The field mappings 224 include a definition for each attribute 34 in the corresponding data object 20. Each attribute may be defined as utilizing full field mapping 246, hint field mapping 248, hashhint field mapping 250, contained object field mapping 252, and subobject field mapping 254. The full field mapping 246 may be used to associate an attribute on a data object with a corresponding column 53 in a database table for use by the query template system. To this end the full field mapping 246 is associated with a full field name 247, an attribute name 256, a logical table name 240, and a field name 52 (e.g., a column 53 in a table). Further, the attribute name 256 may appear in a query template as prefixed with ":" (e.g., :m_attribute name) and when used in this manner may function as a place holder for the corresponding value from the data object 20. It will however be appreciated that different prefixes can be used in different embodiments.

The hint field mapping 248 may be used to identify an attribute that that may be used to pass a hint to the DDR module 78 and/or to be included in a generated query statement. The hint field mapping 246 includes, for example, a hint name 249 and an attribute name 256. Further the attribute name 256 may appear in a query template as described above and function as described above.

The hashhint field mapping 250 may be used to identify an attribute 34 that is associated with a data object 20 through a general hash table of name/value pairs. The hashhint may be used to pass a hint to the DDR module 78 and/or to be included in a generated query statement based on the query template. Hashhint field mapping 250 includes, for example, a hashhint name 251 and an attribute name 256. Further, the attribute name 256 may appear in a query template as prefixed with ":+" (e.g., :+m_attribute name) and when used in this manner may function as a place holder for the corresponding value in the data object 20 hash table. It will however be appreciated that different prefixes can be used in different embodiments.

The contain field mapping 252 may be used to identify an attribute that is a reference to a data object 20 that is contained by the parent object and can be have its data retrieved in the same SQL as the parent object. The contain field mapping 252 includes, for example, a contained name 253, an attribute name 256, a map class name 221, an object class name 223 of the contained subobject, and an attribute type 229 which is the external type for the contained subobject (e.g. DOI). Further, the attribute name 256 of the contained sub-data object may appear in a query template as prefixed with ":", followed by the attribute name of the contained sub-object in the parent object, followed by a ".", and then the attribute name inside the contained sub-data object (e.g., :m_containedSubObject .m_attribute name) and when used in this manner may function as a place holder for the corresponding value in the contained sub-data object 20.

The subobject field mapping 254 includes a subobject name 255 that may be utilized to generate an attribute name 256. The subobject field mapping 254 includes attributes for a non-contained subobject. The subobject field mapping 254 includes a foreign key attribute name 227 from the subobject (e.g., currencyID) that may be used to set a foreign key value onto a containing parent's foreign key attribute (e.g. billing currency) for the subobject, when a subobject is assembled onto a parent object (e.g. setting a currency object onto a user object as its billing currency, the value of the currency ID of the currency object is copied to the user object's billing currency ID attribute).

The table joins 222 may be utilized to associate a pair of logical tables with a snippet of SQL that may be utilized in an SQL join (reading two physical tables with a single SQL statement by identifying a column 53 that is shared by both tables). One or more table joins 222 may be defined and each table join 222 includes an SQL join snippet 244 (e.g., a fragment of an SQL statement) and two logical table names 240. The SQL join snippet 244 may be included in a query statement 427 based on a query template and the logical table names 240 that are determined to be involved in the particular instance of the query statement 427 being composed.

The read sets 228 may be used to identify a group of attributes 34 in the data object 20 that may be requested by the application domain 18 to be substituted into a query statement based on a query template that includes a place holder (e.g. <SELECTFIELDS>). In addition, the group of attributes 34 may subsequently be populated onto the data object from the resulting result set. Each read set 228 may include a read set name 262 and may identify one or more attributes 34. For example, the read set name 262 "READ SET_FULL" may be associated with all attribute 34 in the data object 20 and the read set name "READ SET_MINIUM" may be associated with a few attributes 34 in the data object 20.

The update sets 230 may be used to identify a group of attributes in the data object 20 that may be requested by the application domain 18 to be updated to the database 24. The set of fields in the chosen update set will be included in a query statement 427 based on the placement of a place holder (e.g. <UPDATEFIELDS>), with the appropriate query language syntax (ex. set a.userId=?, a.email=?) in the query statement 427. Each update set 230 may include an update set name 258 that identifies one or more member attributes 34. For example, the update set name "UPDATE SET_FULL" may be associated with all of the attributes 34 of the data object 20 and the update set name "UPDATE SET _MINIUM" may be associated with only a few attributes 34 of the data object 20.

The DDR hint sets 375 may identify the attributes 34 that may be utilized as hints in the absence of hints being overridden with override hints 377. Each DDR hint set 375 identifies a number of attributes 34 that utilize the full field mapping 246, hashhint field mapping 250 or hint field mapping 248. The results of utilizing these hints to determine the physical table name involved in the query will be included in the query statement 427 based on the place holders for these table names that appear in the query template.

Returning to FIG. 18A, the query name 215 in the map object 76 may be utilized to identify a set of query template structures 383. For example, the query name 215 "FindBYPK" may be utilized by the query engine 80 to identify a set of query template structures 383 that may be utilized to select data with a primary key (PK). As another example, the query name 215 "FindAllBYAltKey may be utilized by the query engine 80 to identify a set of query template structures 383 that may be utilized to select data with an alternate key (AltKey).

The select query template structure 383 includes a read set name 262 and a query template 384. The read set name 262 in the query template structure 383 may be utilized by the query engine 80 to identify a specific query template or set of query templates to be performed in order as a group. The query template 384 includes query tokens 386 that may be characterized as static or dynamic. A static query token 386 may include SQL language that may not change (e.g., executed as it appears in the query template 384). The dynamic query token 386 may include a place holder (e.g., generalized or specialized) that may be used to identify and mark the position where content is to be included in the query statement 427 (e.g. column names, column values, driver bind markers for binding parameters, etc.) based on the read set and other information provided in the request.

The update queries 378, insert queries 380, delete queries 382, and PL/SQL queries 381 have structures that are substantially similar to the select queries 376. Special note may be made with regard to the update query 378. The query engine 80 may automatically select the query template 384 or set of query templates for an update query 378 based on identifying an update set 230 that most closely matches the modified (e.g., dirty) and/or loaded attributes 34 of the data object 20 without excluding any of the modified attributes 34. For example, a data object 20 with dirty attributes 34 A and B may most closely match an update set 230 that includes attributes 34 A, B and C and not an update set 230 that includes an attribute 34 A. Accordingly, the query engine 80 may select a matching update set 230 and the associated query template 384 to update the database (e.g., including A, B, and C). In this manner the database 24 may be updated consistently according to any one of a number of predefined update sets 230.

Figure 19:
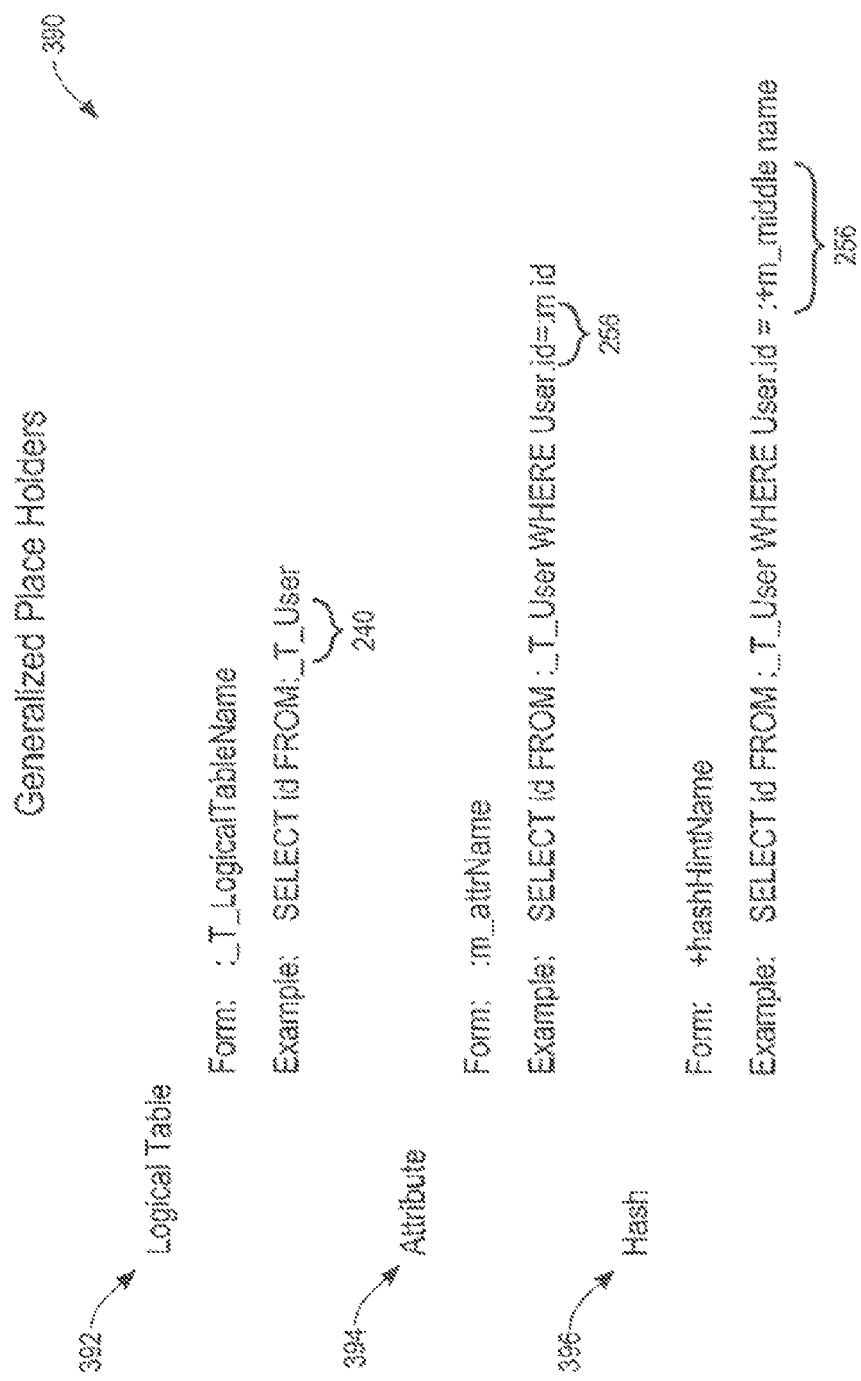

FIG. 19 contains examples of generalized place holders 390 that may be used throughout different types of queries, according to one embodiment. The generalized place holders 390 include a logical table place holder 392, an attribute place holder 394, and a hash place holder 396. The logical table place holder 392 may be utilized as a place holder in a query template 384 that may be utilized to generate a query statement 427 that includes a runtime determined physical table name. The logical table place holder 392 includes the logical table name 240 prefixed by ":_T_". The DDR module 78 may be utilized to resolve a logical table name into a physical table name.

The attribute place holder 394 may be utilized as a place holder in a query template 384 for an attribute 34 value from a prototype data object 20. The attribute place holder 394 identifies the attribute 34 value in the prototype data object 20. The attribute place holder 394 may be included in the query template that may be utilized to generate a query statement 427 with the attribute 34 value. The attribute place holder 394 includes the attribute name 256 prefixed by ":m_". The get attribute value routine 389 may be utilized to execute the proper logic to obtain the attribute 34 value from the prototype data object 20.

The hashhint place holder 396 may be utilized as a place holder in a query template 384 for a hint value that is passed via a hash table that is associated with the prototype data object 20. The hashhint place holder 396 includes the attribute name 256 prefixed by ":+m_". The get hash value routine 391 may be utilized to execute the appropriate logic to obtain the hint value from the prototype data object 20.

Figure 20:

FIG. 20 contains examples of potential select query template specialized place holders 398, according to one embodiment. The specialized select query template place holders 398 may include a select fields place holder 400, a tables place holder 402, and a join place holder 404. The select fields place holder 400 may be utilized as a place holder in a select query template 384 for field names 52 based on the chosen read set (e.g., a column 53 in an exemplary table 32—see FIG. 2). The get select fields routine 393 may utilize a read set 228 that was specified to the query engine 80 to determine the field names 52 that should be included in the query statement that is generated based on the query template 384.

The tables place holder 402 may be utilized as a place holder in a select query template 384 for the substitution of physical table names. The get tables value routine 397 may utilize a read set 228 that was specified to the query engine 80 to determine logical table names 240 that are involved in the query, based on the columns 53 specified in the read set. The DDR module 78 may utilize the logical table names 240 and hints to determine the corresponding physical table names that may be included in the query statement 427 that is generated based on the query template 384. The example illustrates two physical table names (e.g. User and Group).

The join place holder 404 may be utilized as a place holder in a select query template 384 for an SQL join snippet 244. The get join value routine 399 determines if more than one logical table name 240 is required based on the read set 228 that is specified to the query engine 80. If more than one logical table name 240 is required, the get join value routine 399 determines the proper SQL join snippet 244 by matching the logical table names associated to the read set 228 with the logical table names 240 in the table joins 222 in the map object 76. The matched table join 222 includes the proper SQL join snippet 244.

FIG. 21 contains examples of specialized selection criteria place holders 406, according to one embodiment. The specialized selection criteria place holders 406 include an "IN" place holder 408 and an "ORSET" place holder 410. The "IN" place holder 408 may be utilized as a place holder in a query template 384 to generate a query statement 427 the includes an SQL IN clause that utilizes a common column name and a set of bound values retrieved from a set of prototype data objects 20. For example, the data access object 68 may pass multiple prototype data objects (e.g., users) 20 to the query engine 80. The prototype data objects 20 may include an attribute 34 (e.g., users name) that may be utilized in the query template 384 as criteria to select a row from a table in the database 24. The IN place holder may be utilized during runtime to generate a query statement 427 with SQL that uses an IN clause that is utilized to bind the selection value from each prototype data object into the IN clause set (e.g., where "User.name" in the table "user" matches the value in the attribute name 256 for the respective prototype data objects 20, the SQL would be WHERE User.name IN (?,?,?), where the values from three prototype data objects would be bound to these three driver bind positions). The get value routine 389 is utilized to execute the proper getter for the attribute 34 for the multiple data objects 20.

The "ORSET" place holder 410 may be utilized as a place holder to identify where multiple columns 53 are used in the selection criteria and a set of values for these columns 53 is provided through multiple prototype data objects containing the corresponding attributes for these columns 53 (example SQL would be: WHERE (User.city=? AND User.zip=?) OR (User.city=? AND User.zip=?) OR . . . ) Otherwise the "ORSET" place holder 410 may operate in substantially the same manner as the "IN" place holder 408. The get attribute value routine 389 is utilized to execute the proper logic for obtaining attribute 34 values.

FIG. 22 contains examples of specialized place holders 411 for update query templates, insert query templates, and callable statement or PL/SQL query templates, according to one embodiment. The specialized place holders 411 include an update fields place holder 413, an insert fields place holder 415, and callable statement output parameter place holder 417. The update fields place holder 413 may be utilized as a place holder in an update query template 384 that may be utilized to generate a query statement 427 that includes the appropriate field names 52 (e.g., columns 53 in table) and driver bind positions (or the actual direct values) in the proper SQL syntax based on the update set chosen. The get update fields routine 405 may utilize an update set 230 that was specified to the query engine 80 or automatically selected by the query engine 80 to determine the field names 52 that are included in the query statement 427 and their associated prototype data object attribute values that are bound to the query statement 427.

The insert fields place holder 415 may be utilized as a place holder in an insert query template 384 that may be used to generate a query statement 427 that includes the appropriate field names 52 (e.g., columns in table) and driver bind positions (or the actual direct values) in the proper SQL syntax. The get insert fields routine 407 utilizes an update set 230, or if specified an insert set, that was specified to the query engine 80 to determine the field names 52 that are included in the query statement 427 and their associated prototype data object attribute values that are bound to the statement.

The callable statement return variable place holder 417 may be utilized as a place holder in callable statement query template 384 to identify a return variable in the PL/SQL and associate it with an attribute or hashhint attribute on the prototype data object that the response value will be assigned to. In one embodiment a prefix of ":_OUT_" is used to identify this type of place holder. This may be used to obtain an id assigned to a record automatically in the database during an insert operation, so that it can be assigned to the object for identity. PL/SQL query templates can utilize a mix of query template types with their associated place holders.

Figure 23A:
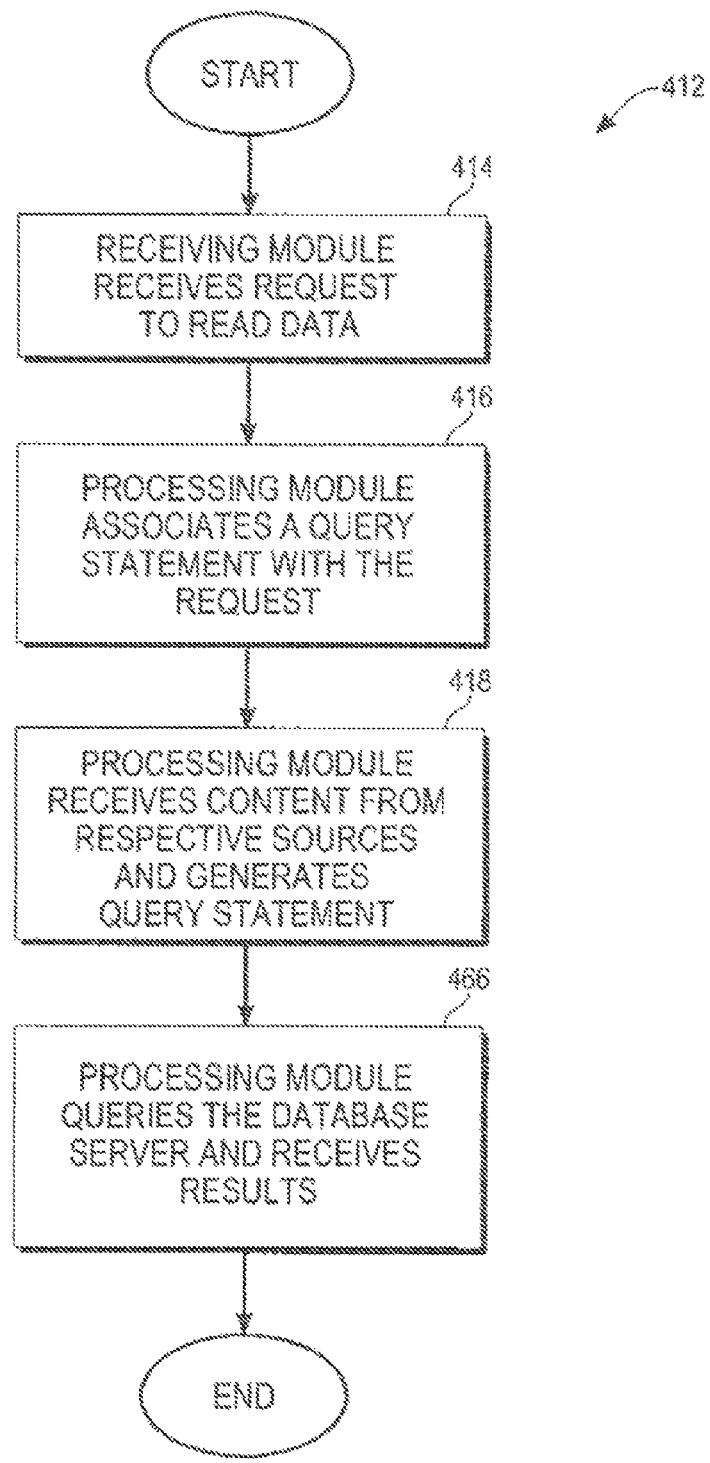
FIG. 23A is a flow chart illustrating a method, in accordance with an embodiment, to automatically generate query language in software.

FIG. 23A is flow a chart illustrating a method 412, according to one exemplary embodiment, to automatically generate query language in software. The method 412 commences at operation 414 with a client in the application domain 18 communicating a request to a data access object 68 for a data object 20 for an item. The client passes a primary key for the data object 20 (e.g., id) and requests the data access object 68 to populate all the attributes 34 in the data object 20 (e.g., id, type, and description attributes). In response, the data access object 68 gets a new data object 20, calls a setter method to initialize the id attribute on the data object 20 (e.g., prototype data object) with the primary key value and communicates the request to the receiving module 370 in the query engine 80. The calling arguments 374 further include a reference to the map object 76 for the item, a reference to the data object 20 for the item, a query name 215, and a read set name 262 to fully populate the data object 20.

At operation 416, the processing module 372 associates a query template 384 for a select query with the request by indexing into the select queries 376 in the map object 76 based on the query name 215 and indexing into the query structures 383 based on the read set 228. Thereafter, at operation 418, the processing module 372 parses the place holders in the query template 384, receives content from various sources (e.g., get value routines and/or a DDR module 78) and generates a query statement with the content based on the query template 384.

Figure 24:
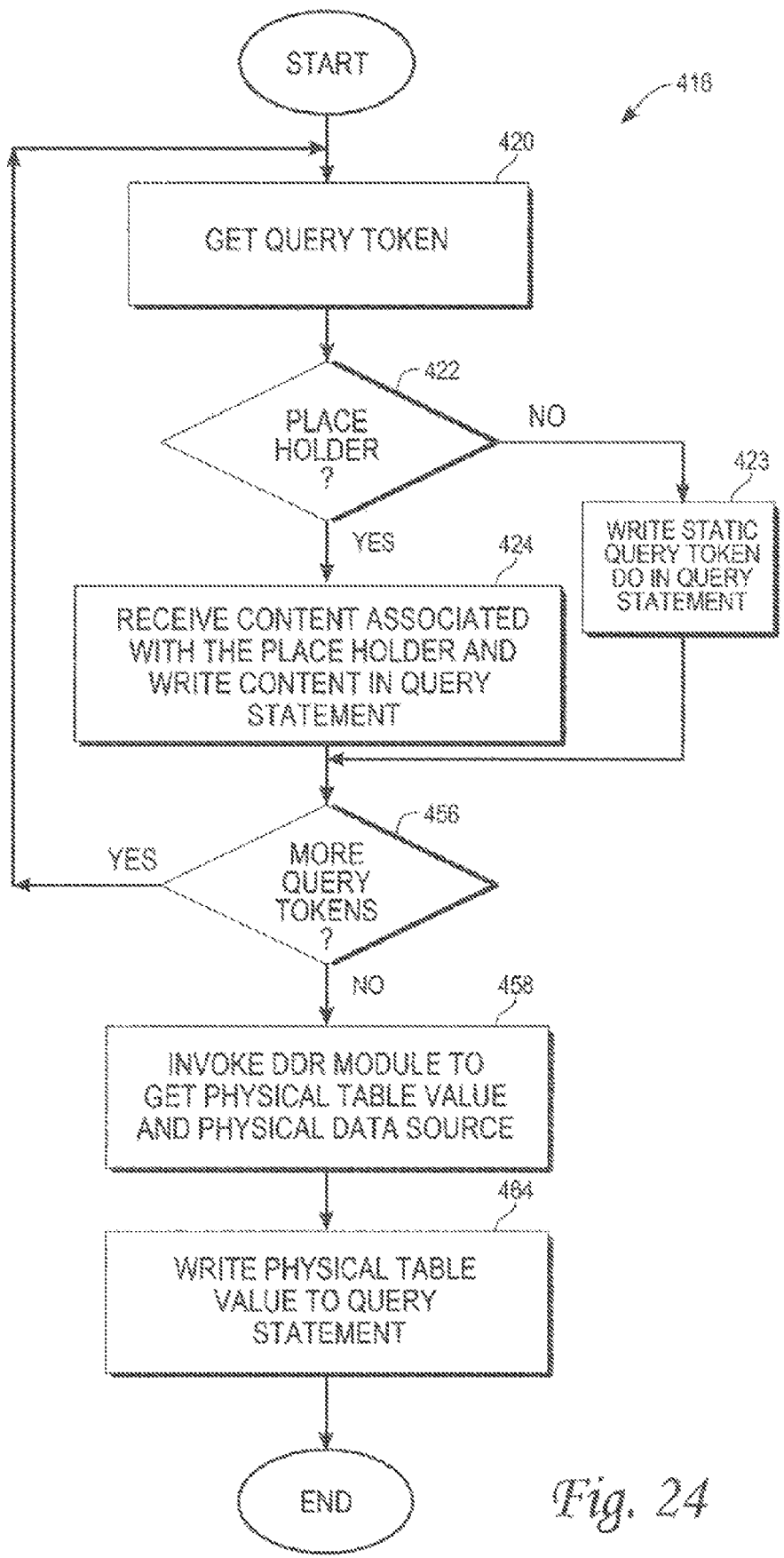
FIG. 24 is a flow chart illustrating an exemplary method, in accordance with one embodiment, to receive content and generate a query statement.

FIG. 24 is flow chart illustrating exemplary detail of the operation 418, according to one embodiment. At operation 420, the processing module 372 gets a query token 386 from the query template 384 and, at decision operation 422, the processing module 372 determines if the query token 386 is a place holder. If the query token 386 is a place holder, processing continues at operation 424. Otherwise processing continues at operation 423.

At operation 423, the processing module writes the static query token 386 into the query statement.

At operation 424, the processing module 372 receives content from a source (e.g., get value routines 385, etc.) and writes the content into the query statement. The source may be identified with the place holder and passed the necessary information (e.g. read set field mappings, query type, etc.) for the source to emit its portion of the query statement 427.

FIG. 25A illustrates an exemplary query template 426, according to an embodiment and FIG. 25B illustrates and an exemplary query statement 427, according to one embodiment. The query template 426 includes place holders 425 and the exemplary query statement 427 shows the resulting SQL with the content. The query template 384 and the query statement 427 may be presented to provide an overview of query generation which also includes the appropriate binding of actual values to the driver specified bind positions (e.g. "?") after the query statement 427 is generated.

Figure 26A:
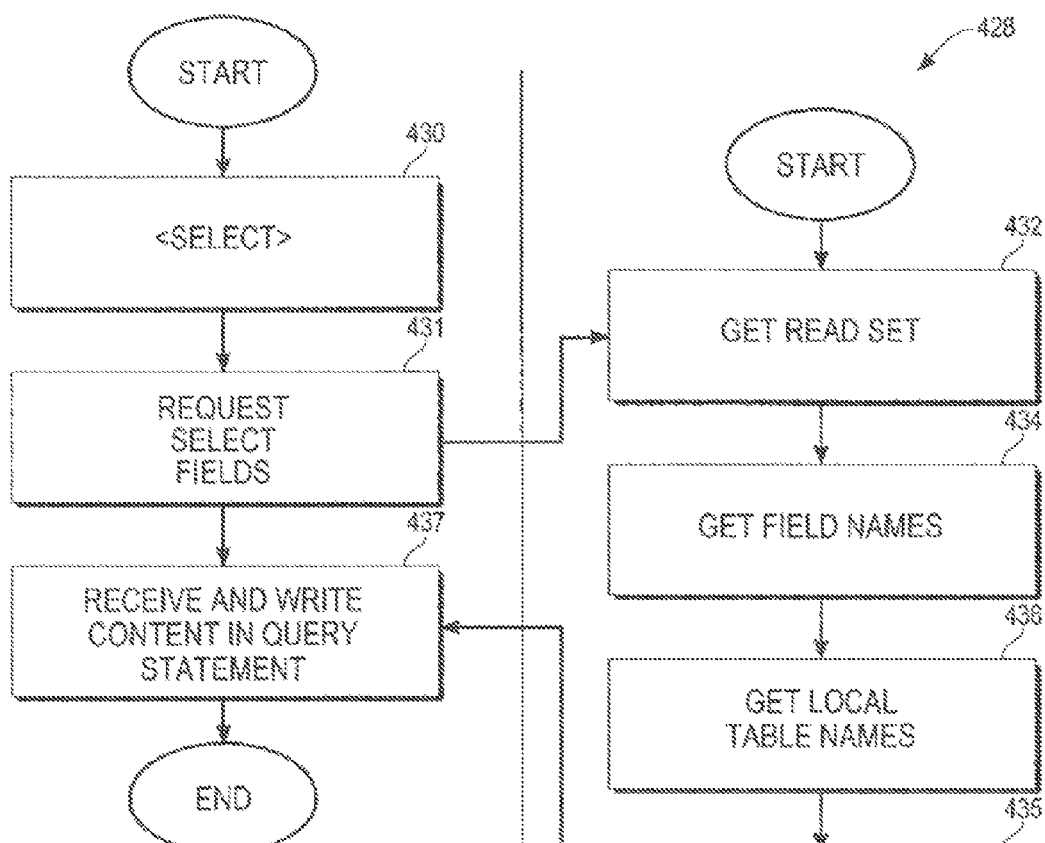
FIG. 26A-D are flow charts illustrating exemplary methods to process place holders, according one embodiment.
Figure 26B:
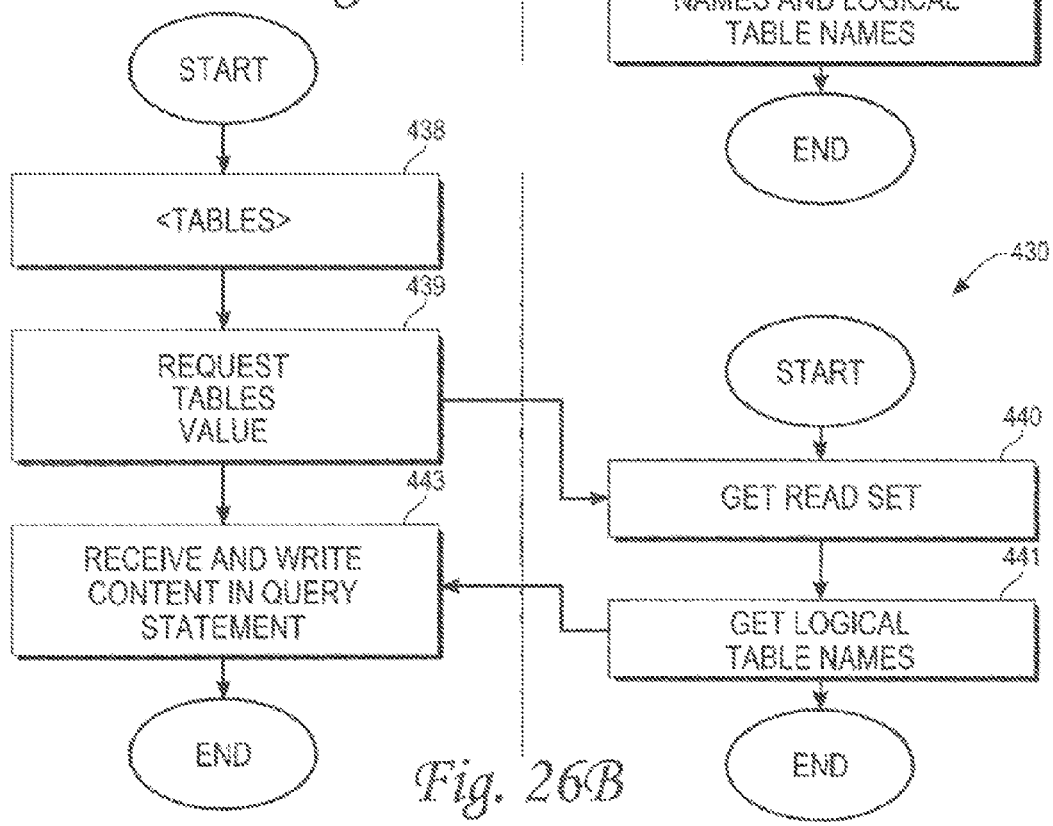

FIG. 26A illustrates an exemplary method 428, in accordance with the invention, to process a select fields place holder 400 and FIG. 26B shows an exemplary method 430, also in accordance with the invention, to process a table place holder 402. The method 428 commences at operation 430 with the processing module 372 parsing the select fields place holder 400 in the query template 384. At operation 431 the processing module 372 requests a get read set select fields routine 393 to get content for the select fields place holder 400.

At operation 432 the get read set select fields routine 393 gets the read set 228 that was passed to the query engine 80 and at operation 434 utilizes the read set 228 to find the corresponding field names 52 (e.g., column names) for each of attributes 34 in the read set 228.

At operation 436 the get select fields routine 393 utilizes the read set 228 that was passed to the query engine 80. The get select fields routine 393 utilizes the read set 228 to find the corresponding logical table names 240 for each of the attributes 34 in the read set 228. At operation 435, the get select fields routine 393 communicates the field names 52 and logical table names 240 to the processing module 372.

At operation 437 the processing module 372 receives and writes the logical table names 240 and the field name 52 pairs (e.g., "logical table name.field name" into the query statement 427 based on the position of the select fields place holder 400 in the query template 384.

The method 430 commences at operation 438 with the processing module 372 parsing the tables place holder 402 in the query template 384. At operation 439 the processing module 372 requests a get tables value routine 397 to get a value for the tables place holder 402.

At operation 440 the get tables value routine 397 gets the read set 228 that was passed to the query engine 80 and at operation 441 utilizes the read set 228 to find the corresponding logical table names 240 for each of the attributes 34 in the read set 228. At operation 441, the get tables value routine 397 communicates the logical table names 240 to the processing module 372 (e.g., a logical table name 240 is communicated once regardless of the number of appearances identified via the read set 228).

At operation 443 the processing module 372 receives and writes the logical table names 240 into the query statement 427 based on the position of the tables place holder 402 in the query template 384.

Figure 26C:
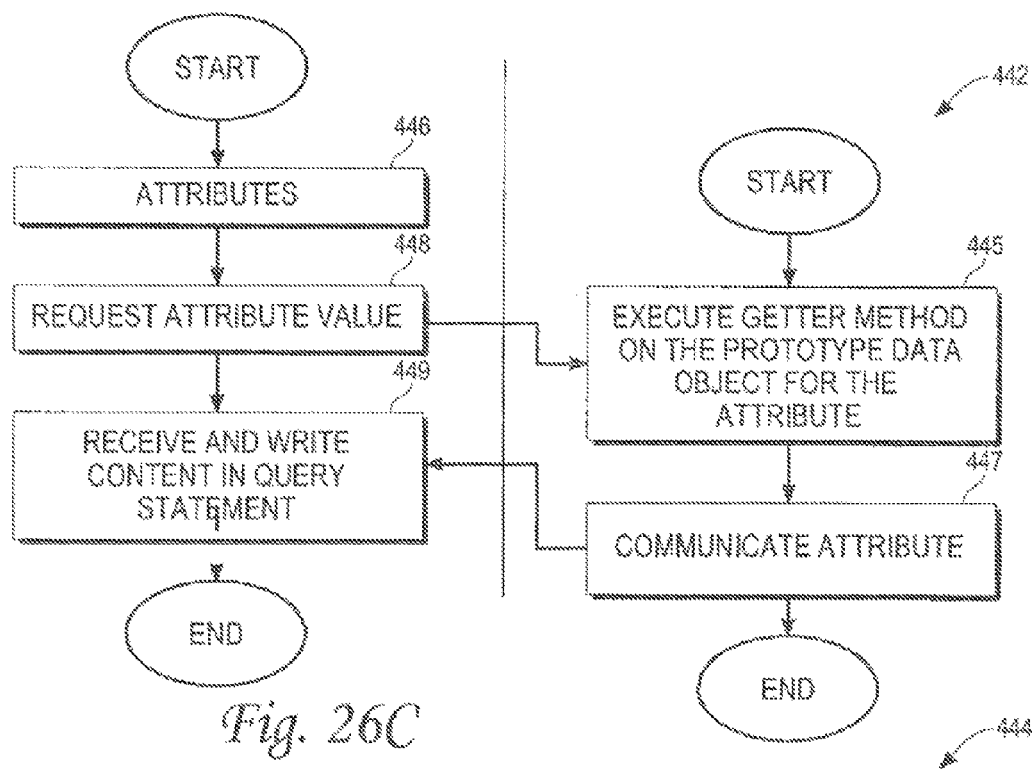
Figure 26D:
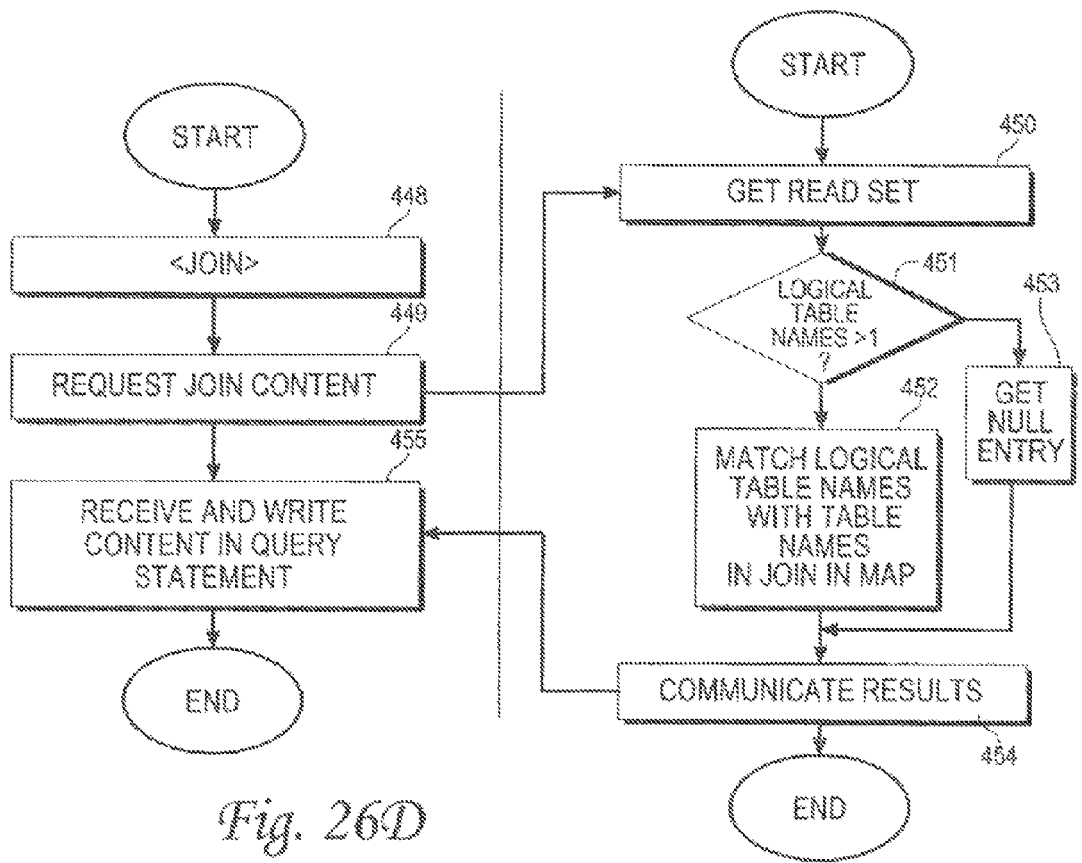

FIG. 26C illustrates a method 442, in accordance with the invention, to process an attribute place holder 394 and FIG. 26D illustrates an exemplary method 444, also in accordance with the invention, to process a join place holder 404. The method 442 commences at operation 446 with the processing module 372 parsing the attribute place holder 394 in the query template 384. At operation 448 the processing module 372 communicates a request to a get attribute value routine 389 to get a value for the attribute place holder 394.

At operation 445 the get attribute value routine 389 executes the getter method on the prototype data object 20 for the attribute 34. At operation 447, the get attribute value routine 389 communicates the attribute 34 value to the processing module 372.

At operation 449 the processing module 372 receives and writes the attribute value into the query statement 427 or writes a driver bind marker into the query statement based on the position of the attribute place holder 394 in the query template 384.

The method 444 commences at operation 448 with the processing module 372 parsing the join place holder 404 in the query template 384. At operation 448, the processing module 372 communicates a request to a get join value routine 399 to get values for the join place holder 404.

At operation 450 the get join value routine 399 gets the read set 228 that was passed to the query engine 80 and at operation 451 utilizes the read set 228 to find the corresponding logical table names 240 for each of the attributes 34 in the read set 228.

At decision operation 451 the get join value routine 399 determines if more than one logical table name 240 appears in the read set 228. If more than one logical table name 240 appears in the read set 228 then processing continues at operation 452. Otherwise processing continues at operation at operation 453.

At operation 452, the get join value routine 399 utilizes the map object 76 for the data object 20 to read table joins 222. The get join value routine 399 attempts to match the logical table names 240 identified with the read set 228 with logical table names 240 in a particular table join 222. If a match is found the get join value routine 399 gets the corresponding SQL join snippet 244 (e.g., SQL join language) from the table join 222.

At operation 453, the get join value routine 399 gets a null entry.

At operation 454, the get join value routine 399 communicates the results to the processing module 372.

At operation 455 the processing module 372 receives and writes the results (e.g., SQL join snippet 244 or null entry) into the query statement 384 based on the position of the tables place holder 402 in the query template 384.

Returning to FIG. 24, at decision operation 456, the processing module 372 determines if additional query tokens 386 needs to be processed. If an additional query tokens 386 needs to be processed then processing continues at operation 420. Otherwise processing continues at operation 458.

At operation 458 the processing module 372 invokes the DDR module 78 with the logical table names 240 that have been previously written into the query statement 427 and the appropriate hint(s). In response, the DDR module 78 may return a physical table 502 and a database server 64 (e.g., database server 64).

At operation 464, the processing module 372 writes the physical table 502 in place of corresponding the logical table name(s) 240 in the query statement 427.

Returning to FIG. 23A, at operation 466, the processing module 372 queries the database server 64 and receives results.

Figure 23B:
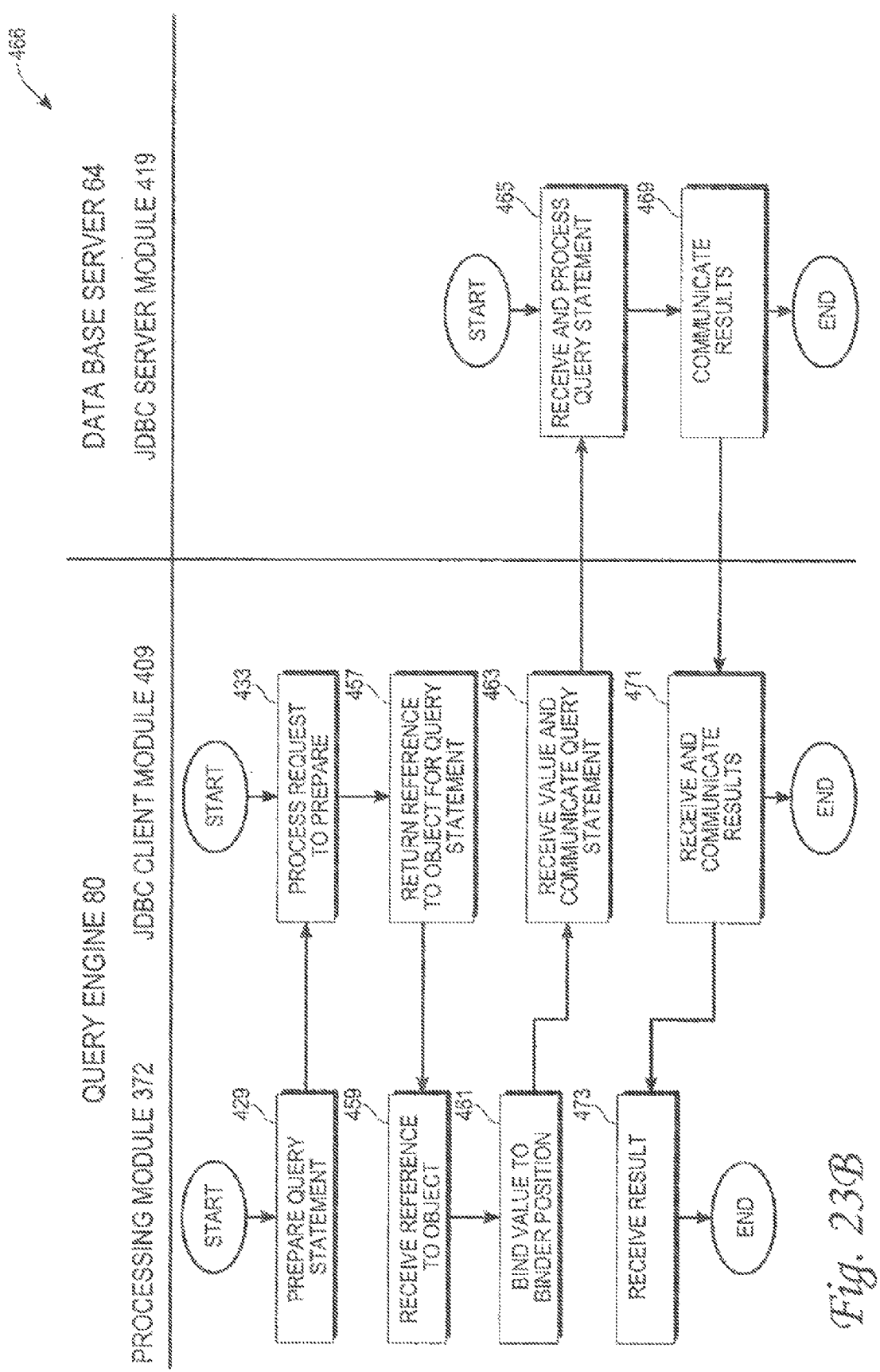
FIG. 23B is an interactive flow chart illustrating a method, according to one embodiment, to query a database and receive results.

FIG. 23B is an interactive flow chart illustrating a method 466, according to one embodiment, to query a database and receive results. Illustrated on the left may be the query engine 80 which is shown to include the processing module 372 and a JDBC client module 409 (e.g., JDBC driver). Illustrated on the right may be the database server 64 which is shown to include a JDBC server module 419. The method 466 commences at operation 429 with the processing module 372 communicating the query statement to the JDBC client module 409 and requesting the JDBC client module 409 to prepare the query statement 422.

At operation 433, the JDBC client module 409 parses the query statement 422, caches the query statement 422 and creates a statement object for subsequent execution of the query statement 422. For example, the statement object may include setter routines to set the values for bind positions or bind markers that appear in the query statement 422. Illustrated below is the query statement 422 that includes content in the form of a binder marker, "?", that corresponds to an attribute 34 (e.g., A.id) that may be associated with a value (e.g., 123) that may be set with the above described setter routine.

SELECT A.id, A.type, B.Desc
FROM items a, itemdesc b
WHERE A.id=? and (A.ID=B.ID)

At operation 457, the JDBC client module 457 communications a reference to the statement object to the processing module 372.

At operation 459, the processing module 372 receives the reference to the statement object and at operation 461 the processing module 372 binds a value to the binder maker by invoking the setter routine that sets the value of the attribute 34 (e.g., A.id). It will be appreciated that other embodiments may include multiple binder markers in a single query statement 422.

At operation 463 the JDBC client module 409 receives the value and communicates the bound query statement 422 to the JDBC server module 419 at the database server 64.

At operation 465, the JDBC server module 419, at the database server 64 receives and processes the query statement 422. At operation 469, the JDBC server module responds by communicating results to the JDBC client module (e.g., operation 471) that, in turn, communicates the results to processing module 372 that, in turn, populates the results (e.g., A.id, A.type, B.Desc) to the item data object 20. Finally, the processing module 372 returns control to the item data access object 362 that, in turn, responds to the application domain 18.

Thus, a method and system for dynamic templatized query language in software has been described. Although the invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

Figure 27:
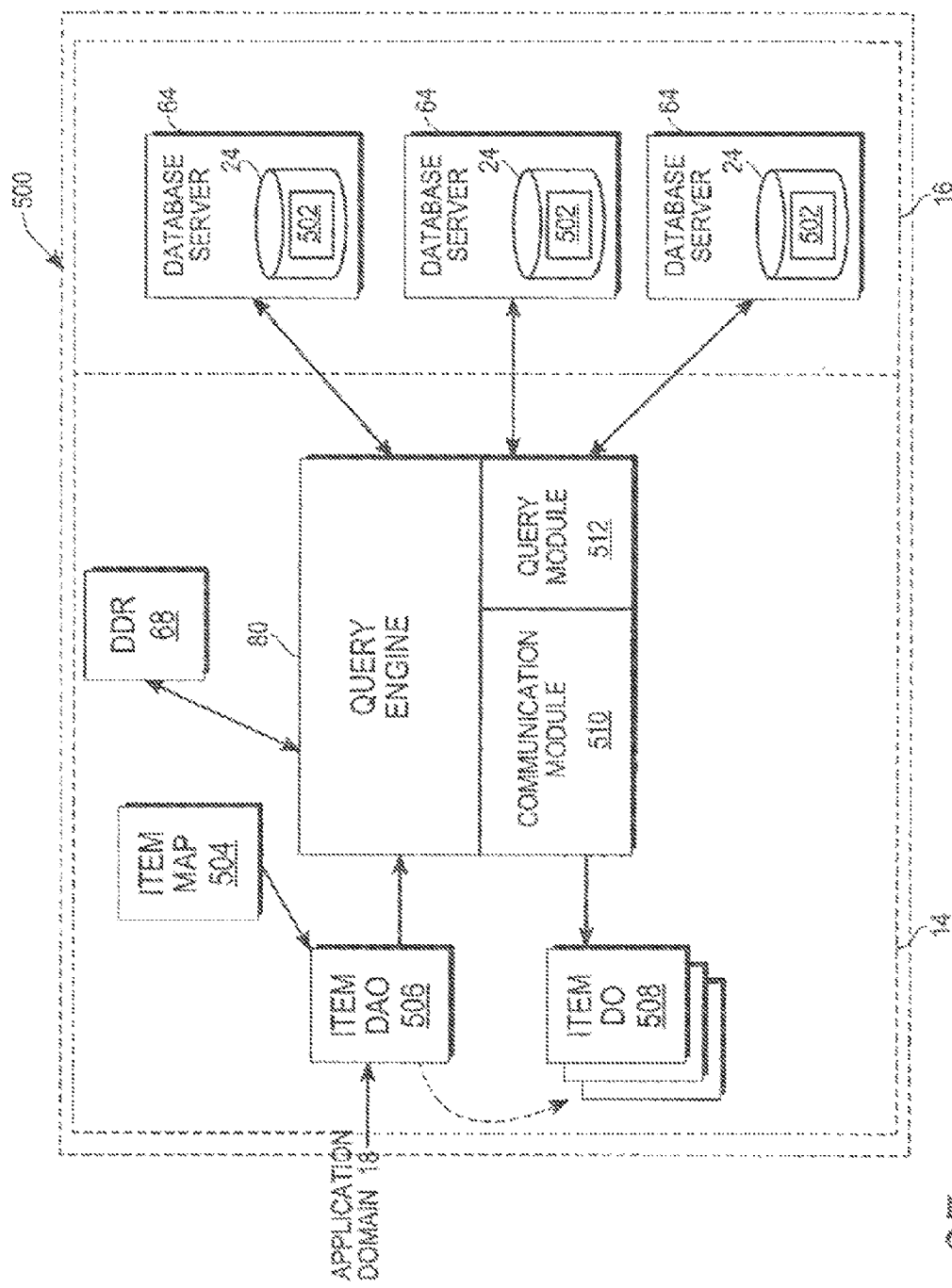
FIG. 27 is a block diagram illustrating exemplary interactions; between hardware and software components of a data access system, according to one embodiment.

FIG. 27 is a block diagram illustrating exemplary interactions between hardware and software components of a data access system 500, according to one embodiment. The system 500 corresponds to the data access system 10 and, accordingly, the same or similar references have been used to indicate the same or similar features unless otherwise indicated. Broadly, the data access system 500 includes a data access layer 14 that includes software components that receive a single request for data from an application domain 18, queries multiple data sources in the exemplary form of database servers 64 in a persistent layer 16, and responds to the application domain 18 with the requested data. The data access layer 14 includes an item map 504, an item data access object 506, an item data object 508, a query engine 80, and a DDR module 68. The query engine 80 is shown to include a communication module 510 and a query module 512. Other embodiments of the system 500 may include a business layer between the application domain 18 and the data access layer 14. The persistent layer 16 is shown to include three database servers 64 that each of which include a physical table 502 that persistently stores data of the same schema, but not necessarily the same actual records.

The item data access object 506 is shown to receive a request for an item data object 508 from the application domain 18. The request may include search criteria to locate one or more item data objects 508 and an indication of attributes in the item data objects 508 that should be populated. For example, the item data access object 506 may receive a seller's name, e.g., Joe, which may be used to locate items in the databases 24 that are sold by Joe and an indication that the "item description" should be populated for the items found. In response, the item data access object 506 gets a new item data object 508, initializes the item data object 508 with the name "Joe" (e.g., prototype item data object), gets a reference to the item map 504, and requests the query engine 80 to perform the query that finds items by seller name to all possible sources of item data for the seller name "Joe".

The query engine 80 is shown to include a communication module 510 and a query module 512. The communication module 510 may receive the request from the item data access object 508. The query module 512 may utilize the map object 76 to associate the "item description" attribute with a logical table name that identifies a logical table associated with the requested data. In addition, the query module 512 may pass the logical table name to the DDR module 68, and a hint indicating to find all sources of item data. The DDR module 68 responds by returning an array of physical tables and database server pairs (e.g., touples) that correspond to the logical table name. The query module 512 is shown to query three database servers 64 that respectively return results. The query module 512 then processes the results by creating an item data object 508 for each item returned (e.g., items sold by Joe) and populating an "item description" to the respective item data objects 508 before returning control to the item data access object 506. Thereafter, the item data access object 506 responds to the application domain 18 that the request for data has been serviced.

It will be appreciated that the system 500 utilizes the item map 504, the item data access object 506 and the item data object 508 to process a specific type of object (e.g., an item); however, in other embodiments other types of objects (e.g., user, buildings, cars, etc.) may be utilized, and other embodiments of data access layer constructs may be used.

Figure 28:
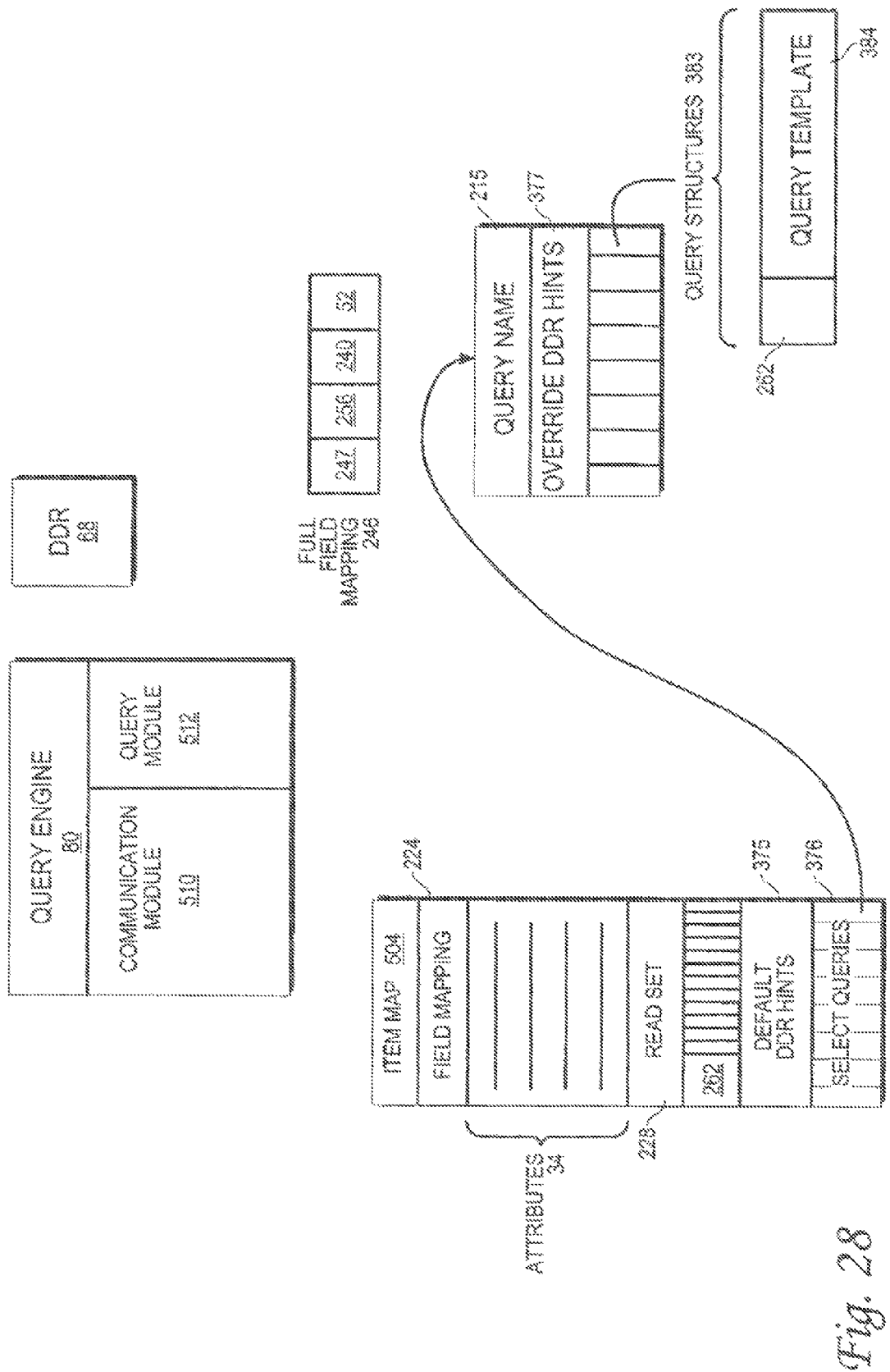
FIG. 28 is a block diagram illustrating exemplary software components, according to one embodiment.

FIG. 28 is a block diagram illustrating software components including an exemplary query engine 80, an exemplary DDR module 68, and an exemplary map object 76, according to one embodiment. The query engine 80 includes a communication module 510 and a query module 512. The communication module 510 may be utilized to receive a request from the data access object 68 that is servicing the application domain 18. The request may specify a selection criteria to find a specific object (e.g., primary key or secondary key) or selection criteria to find all objects matching selection criteria (e.g., all items that are listed for sale by Joe). In addition, the request may specify a query name and a set of attributes (e.g., read set) to be populated to the data object 20. The query module 510 may select a query template based on the request, utilize the read set to identify logical table names, utilize the DDR module 68 to get arrays of touples, communicate queries to the data base servers 64, receive results from the data base servers 64, create data objects 20, populate data objects 20, and build and execute fetch levels.

The item map 504 is illustrated as including field mapping 224, read sets 228, default DDR hints 375, select queries 376, and other meta-data. The methods and meta-data included in the item map object 76 may be dedicated to provide services with regard to a specific type of object (e.g., an item object). The field mappings 224 include a definition for each attribute 34 in the corresponding item data object 508, some of which may be defined as utilizing a full field mapping 246. The full field mapping 246 may be used to identify an attribute 34 that is utilized to store data persistently in a table column 53. To this end, the full field mapping 246 may be associated with a full field name 247, an attribute name 256, a logical table name 240, and a field name 52 (e.g., a column 53 in a table—see FIG. 2).

The read sets 228 may be used to identify a group of attributes 34 in the item data object 508 that may be requested by the application domain 18 to be populated. Each read set 228 may include a read set name 262 and may identify one or more attributes 34.

The default DDR hints 375 may identify the attributes 34 that may be utilized to pass hints to the DDR module 68 in the absence being overridden with override hints 377 that may be associated with a specific set of queries. Each default DDR hint 375 may identify a number of attributes 34 that may be utilized to pass a hint.

The select queries 376 may be utilized to read or SELECT (e.g., utilizing SQL) data from the database 24. Each select query 376 may include a query name 215, override DDR hints 377, and an array of query structures 383.

The query name 215 in the map object 76 may be utilized to identify a set of query structures 383. The override DDR hints 377 may be utilized to override the default DDR hints 375 with regard to a specific set of query structures 383.

The query structure 383 includes a read set name 262 and a query template 384. The read set name 262 in the query structure 383 may be utilized by the query engine 80 to identify a specific query template 384.

The DDR module 68 may be utilized to resolve the physical location of data on the database servers 64 based on a logical table name and one or more hints. For example, the DDR module 68 may receive a hint and a logical table name 270 and respond by returning an array of physical tables and database server 64 pairs (e.g., touples).

Figure 29:
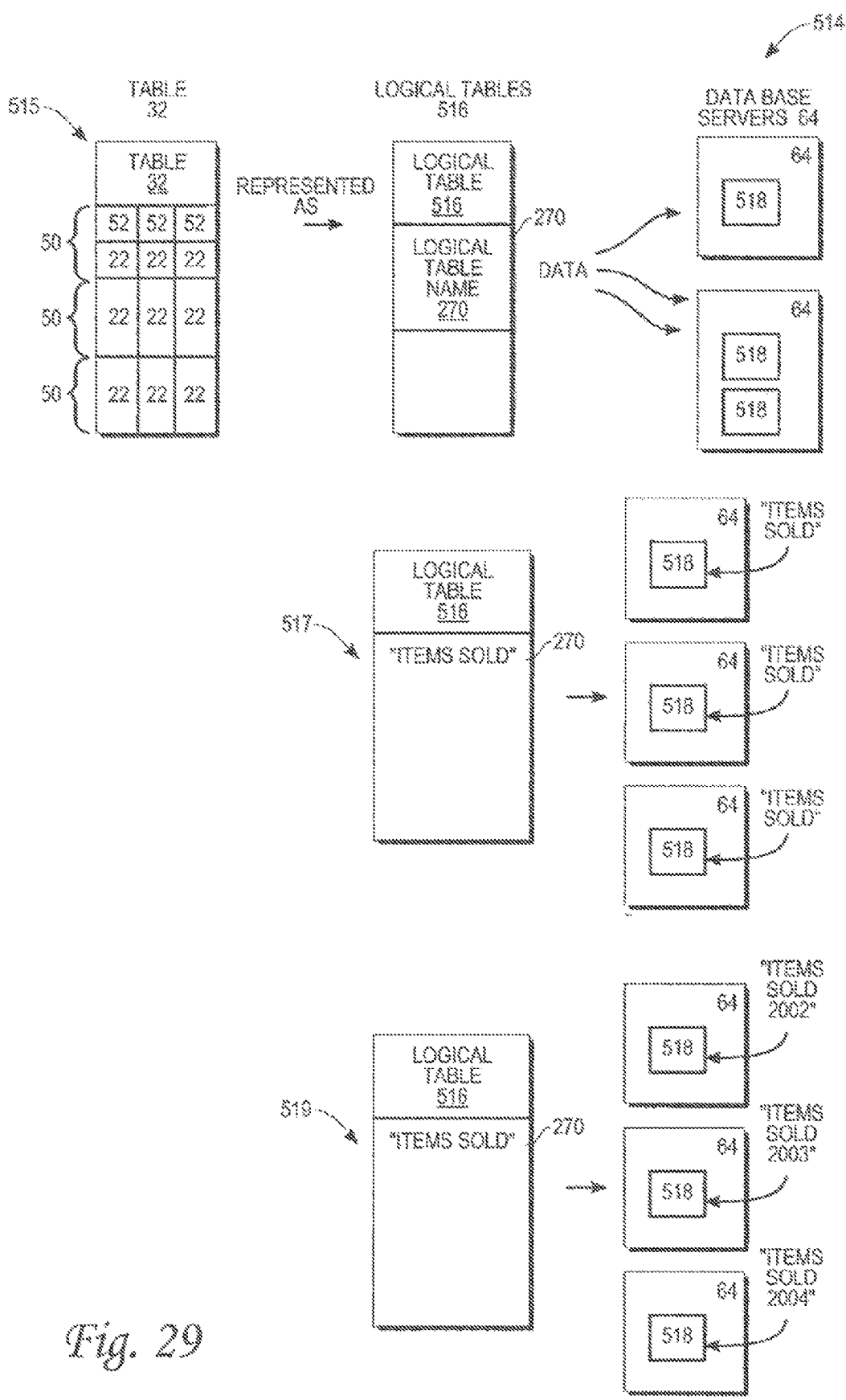
FIG. 29 is a block diagram illustrating exemplary representations of data, according to one embodiment.

FIG. 29 is a block diagram illustrating exemplary representations of data 514, according to one embodiment. The exemplary representations of data 514 may include a table representation 515, an archive representation, and an alternate archive representation 519. The table representation 517 includes a table 32 that includes rows 50 (e.g., corresponding to data objects 20) and columns 53 (e.g., corresponding to attributes 34) the intersection of which may be utilized to store attribute 34 values (e.g. data 22). The table 32 may be represented within the data access layer 14 as a logical table 516. The logical table 516 may be identified with a logical table name 270 and mapped by the DDR module 68 to one or more physical tables 518 that are utilized to store the data 22 on one or more database servers 64. The data access layer 14 may utilize the logical table name 240 as a mechanism to decouple and abstract the physical location of the data 22. For example, the logical table name 270 associated with the logical table 516 the may be utilized to abstracts or hide the physical location of the data 22 which is illustrated as stored in three physical tables 518 that are located on two database servers 64.

The archive representation 517 includes a logical table 516 which may be associated with a logical table name 270, "Items Sold", which may be associated with three physical tables 518 that are respectively named, "Items Sold".

The alternate archive representation 519 includes a logical table 516 which may be associated with the same logical table name 270, "Items Sold", which may be associated with three physical tables 518 that are respectively named, "Items Sold 2002", "Items Sold 2003, and "Items Sold 2004."

Figure 30:
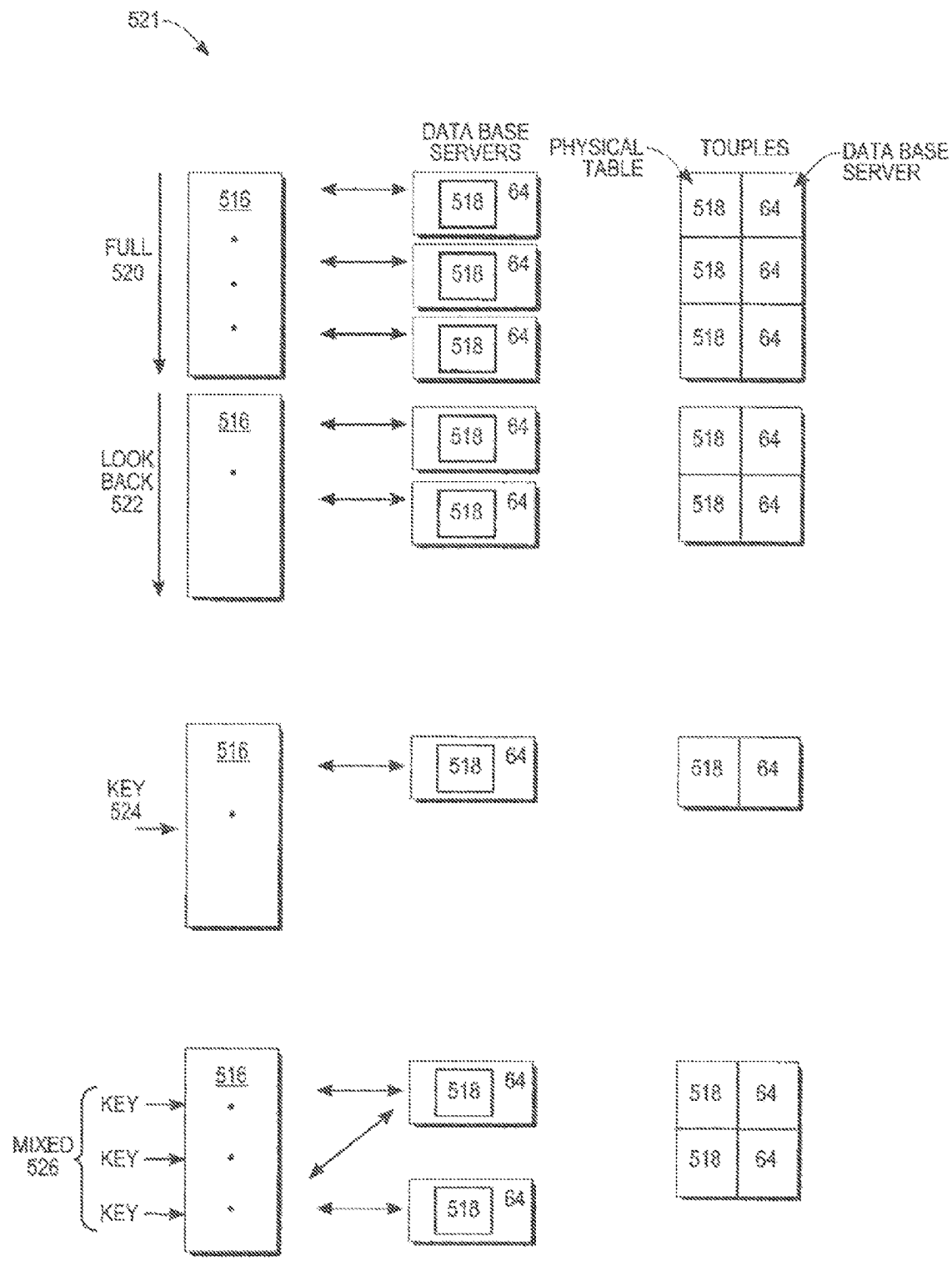
FIG. 30 is a block diagram exemplary request types, according to one embodiment.

FIG. 30 is a block diagram illustrating exemplary request types 516, according to one embodiment, for requesting data. The request types 521 include a full scan 520, a look back scan 522, a key scan 524 and a mixed scan 526. The full scan 520 may be utilized to find all rows 50 in a logical table 516 with data in a column 53 that matches a criterion. Accordingly, the DDR module 68 may return an array of one or more touples 528 that provide the physical location of the data for the entire logical table 516. For example, the application domain 18 may request all items that are for sale by "Joe".

The look back scan 522 may be utilized to find the first row 50 within a specific range of a logical table 516 that matches a criterion. Accordingly, the DDR module 68 may return an array of one or more touples 528 that correspond to a range of the logical table 516 based on hints provided indicating a desired range. For example, the application domain 18 may request to look back five years from the present time for a row for a seller "Joe" in a logical table (e.g., an archive) that maps to physical tables 518 that correspond to years. Another example may include looking back over a specific range of years (e.g., 1999 to 2001).

The key scan 524 may be utilized to find a singe row 50 in the logical table 516 based on a matching key value. The key value may uniquely identify the row 50 in the logical table 516.

The mixed scan 526 may be utilized to find multiple rows 50 in the logical table 516 based on matching key values. For example, the application domain 18 may request the rows for the ID's "Larry", "Moe" and "Curly" in a single request. Accordingly, the DDR module 68 may be invoked for each ID 50 to determine the associated touple. Keys with the same touple may be combined into IN clause statements to reduce the number of requests to a particular database for a set of keys provided to the QueryEngine for a query.

The above described request types 521 may also be considered with respect to the replication of data. For example, the persistent layer 16 may be utilized to store the same data on multiple data base servers 64. Accordingly, the DDR module 68 may return multiple touples 528 for the same data thereby providing for the retrieval of data from alternative data base servers 64 in the event that a data base server 64 may be unavailable (e.g., marked down by operations or malfunctioning). With regard to the full scan 520, look back scan 522, or key scan 524 the method for searching backup data base servers 64 may be straight forward. For example, if the query module 512 cannot read the data at one touple 528 then the query module 512 may request the same data from touples that identify backup database servers 64 until the data is found. In the case of the mixed scan 526 the method for searching need not be straight forward because the rows 50 may be clustered on the same touples 528. For example, consider the following:

| Row/Object | Touples |
|---|---|
| Larry | DDR modules returns Touple A, Touple B |
| Moe | DDR module returns Touple B, Touple C |
| Curly | DDR module returns Touple A, Touple B |

In the above example, "Larry" and "Curly" are both on Touple A. Executing a query to retrieve "Larry" from Touple A without retrieving "Curly" from touple A may be considered inefficient because SQL provides for retrieving multiple rows with a single query. For example:
SELECT id FROM User WHERE User.id IN ('Larry', 'Curly')

In view of the above, optimizing a search for the mixed scan 526 may require invoking the DDR module 68 for each row 50 and utilizing the returned touples 528 to build fetch levels as follows:

| Fetch Level | Touple | SQL Statement |
|---|---|---|
| 1 | 1 | SELECT id FROM Touple A WHERE User.id IN (Larry, Curly) |
|   | 2 | SELECT id FROM Touple B WHERE User.id IN (Moe) |
| 2 | 2 | SELECT id FROM Touple B WHERE User.id IN (Larry, Curly) |
|   | 3 | SELECT id FROM Touple C WHERE User.id IN (Moe) |

The above fetch levels may be executed in ascending order. After the first query is executed (e.g., Fetch Level 1, Touple A) the result data may be matched against data values (e.g., "Larry," "Curly") that may be stored in appropriate attributes 34 in respective data objects 20. If a match is found, the data object 20 may be marked as found and the name removed from subsequent queries. If all the queries in a fetch level are executed and data objects 20 remain unfound, the next fetch level may be executed to find the remaining data objects 20.

Figure 31:
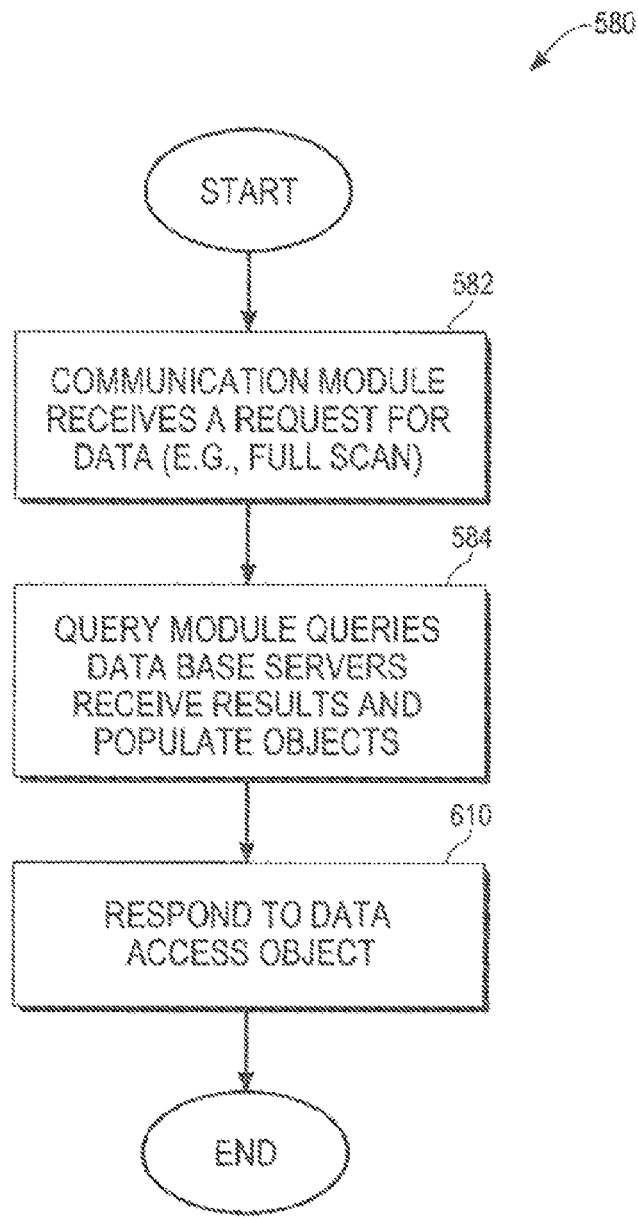
FIG. 31 is a flow chart illustrating an exemplary method, in accordance with an embodiment, to respond to a request for data.

FIG. 31 is a flow chart illustrating an exemplary method 580, in accordance with an embodiment, to respond to a request for data. At operation 582, the communication module 510 receives a request from an item data access object 506. The request may be for all items offered for sale by the seller, "Joe", and may indicate that all attributes 34 in the item data objects 508 may be populated (e.g., full read set 228). Further, the request may indicate a query name 215, a reference to the item map 504 and a reference to the item data object 508 that includes an attribute set to "Joe".

At operation 584, the query module 512 queries database servers 64, receives results and populates item data objects 508.

Figure 32:
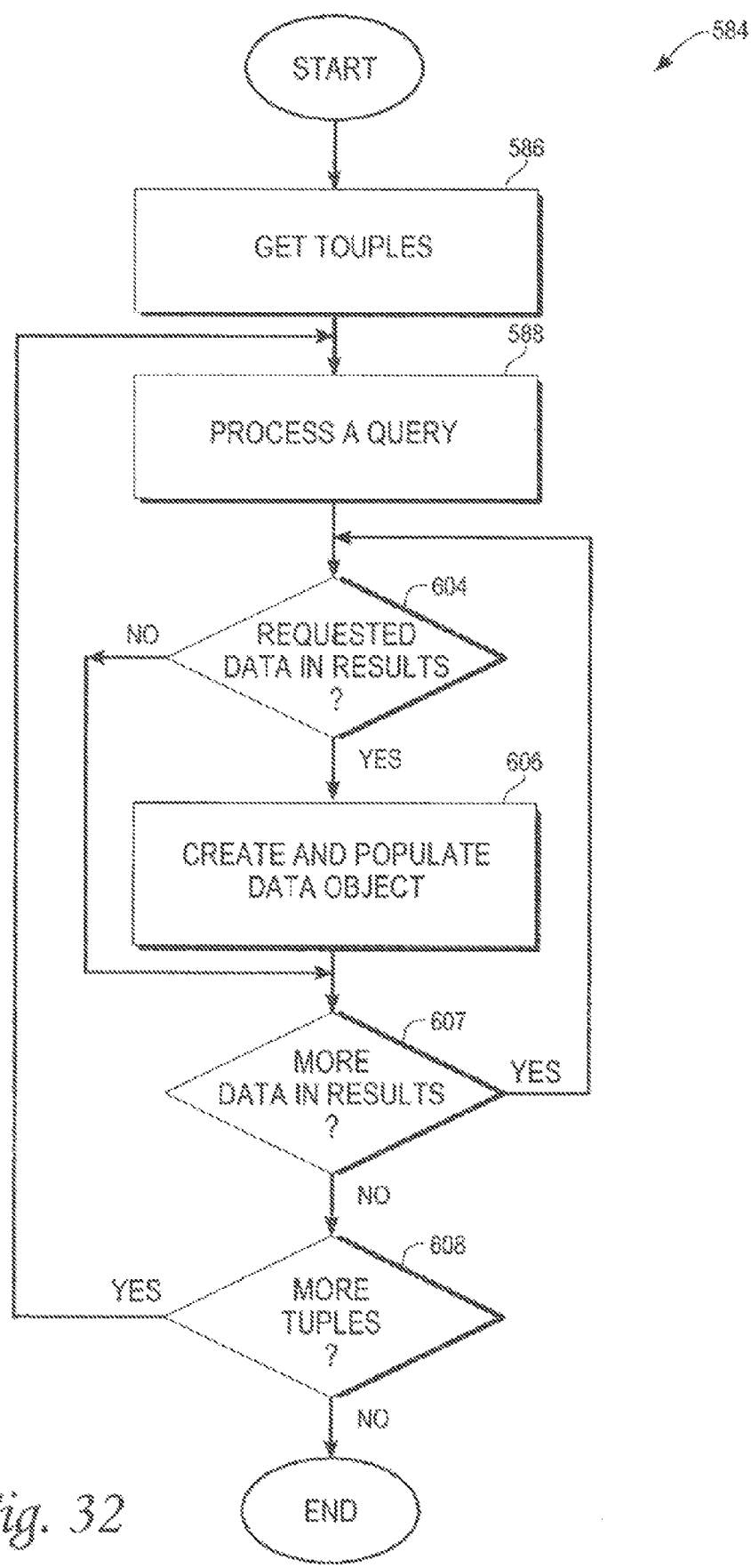
FIG. 32 is a flow chart illustrating an exemplary method, in accordance with an embodiment, to query data sources, receive results and populate objects.

FIG. 32 is a flow chart illustrating an exemplary method 584, in accordance with an embodiment, to query data sources, receive results, and populate objects. At operation 586, the query module 512 gets touples 528 from the DDR module 68.

Figure 33A:
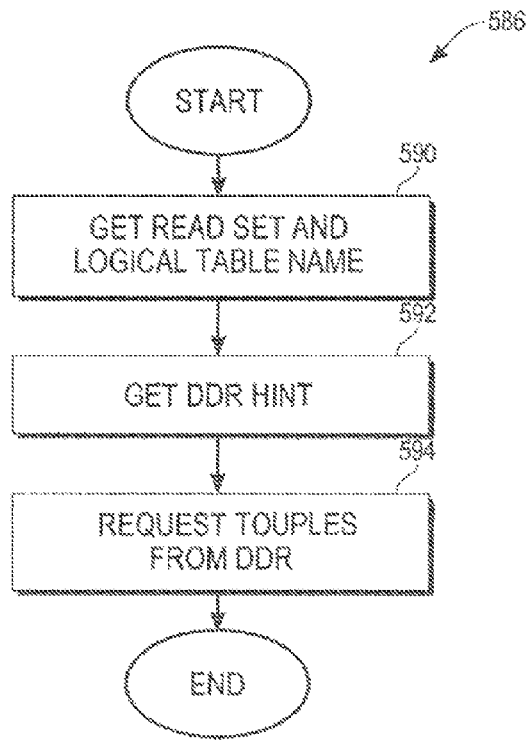
FIG. 33A is a flow chart illustrating an exemplary method, in accordance with an embodiment, to get touples.

FIG. 33A is a flow chart illustrating an exemplary method 586, in accordance with an embodiment, to get touples. The method 586 commences at operation 590 with the query module 512 utilizing the full read set that was passed to the query engine 80 to identify the logical table name 270 associated with the item data object 508. It will be appreciated that different logical table names 270 may be specified for each attribute 34 in the item data object 508; however, the present embodiment illustrates a single logical table name 270 for all attributes 34 in the item data object 508.

At operation 592 the query module 512 gets the default ddr hints 375 from the map object 76; however, other embodiments may utilize override ddr hints 377. The ddr hints 375 may indicate a full scan 520 or a specific hint may be added by the query engine to the hints passed to the DDR based on the method called on the query engine or a flag set on the query engine.

At operation 594 the query module 512 invokes the DDR 68 with the logical table name 270 and the default ddr hints 375. The DDR module 68 responds with an array of touples 528 for the entire logical table 516.

Returning to FIG. 32, at operation 588, the query module 512 processes a query by utilizing the query name 215 and the full read set 228 to identify a query template 384.

Figure 33B:
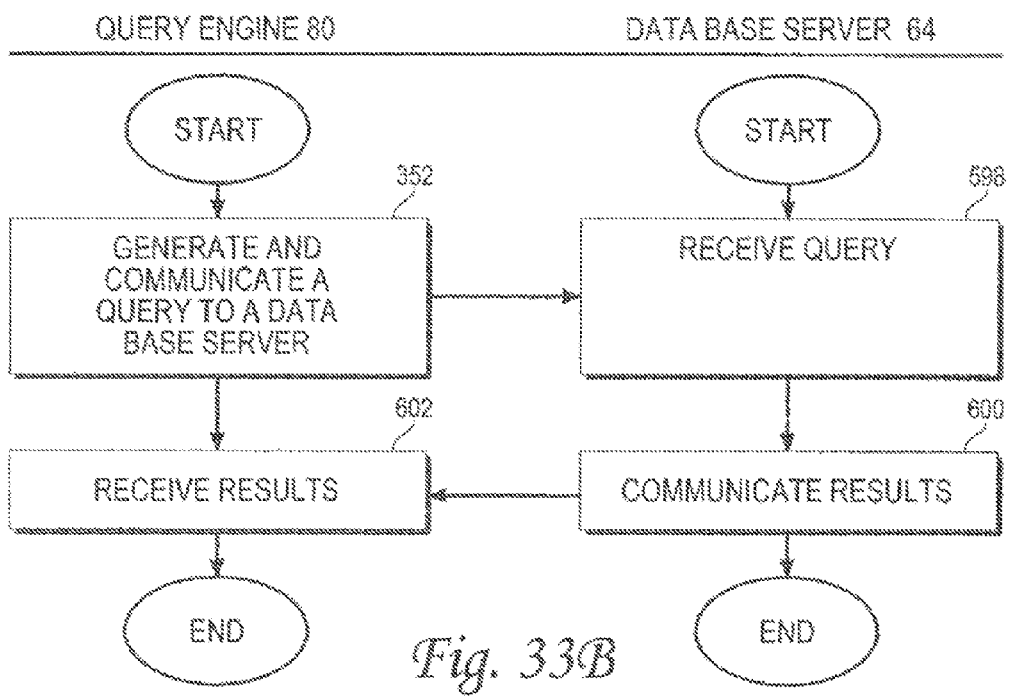
FIG. 33B is a flow chart illustrating an exemplary method, in accordance with an embodiment, to process a query.

FIG. 33B is an exemplary interactive flow chart illustrating an exemplary method 588, in accordance with an embodiment, to process a query. Illustrated on the left of the operation 588 may be the query engine 80 and illustrated on the right of the operation 588 may be the database server. The method 588 commences, at operation 596 with the query module 512 generating a query based on the query template and communicating the query to a database server 64.

At operation 598, the database server 64 receives the query and at operation 600 communicates the results to the query engine 80.

At operation 602, the query module 512, in the query engine 80, receives the results.

Returning to FIG. 32, at decision operation 604 the query module 512 determines if the results include the requested data (e.g., items offered for sale by "Joe"). If the results include the requested data, processing continues at operation 606. Otherwise processing continues at decision operation 607.

At operation 606, the query module 512 creates an item data object 508 and populates the attributes 34 of the item data object 508 with the results.

At operation 607, the query module 512 determines if the results include more data. If the results include more data then processing continues at decision operation 604. Otherwise processing continues at decision operation 608.

At decision operation 608, the query module 512 determines if there are more touples 528 to process. If there are more touples 528 to process then processing continues at operation 588.

Returning to FIG. 31, at operation 610 the query module 512 responds to the item data access object 506 that processing is complete and the data access object 506, in turn, responds to the application domain 18.

The above embodiment illustrates a full scan 520 request type. It will be appreciated that a look back scan 522 substantially resembles the above embodiment; however, the look back scan may terminate responsive to finding the first occurrence of the requested data. In addition, one embodiment may utilize physical tables 518 that utilize an archive representation 517 of the data and another embodiment may utilize physical tables that utilize an alternate archive representation 519 of the data.

Figure 34:
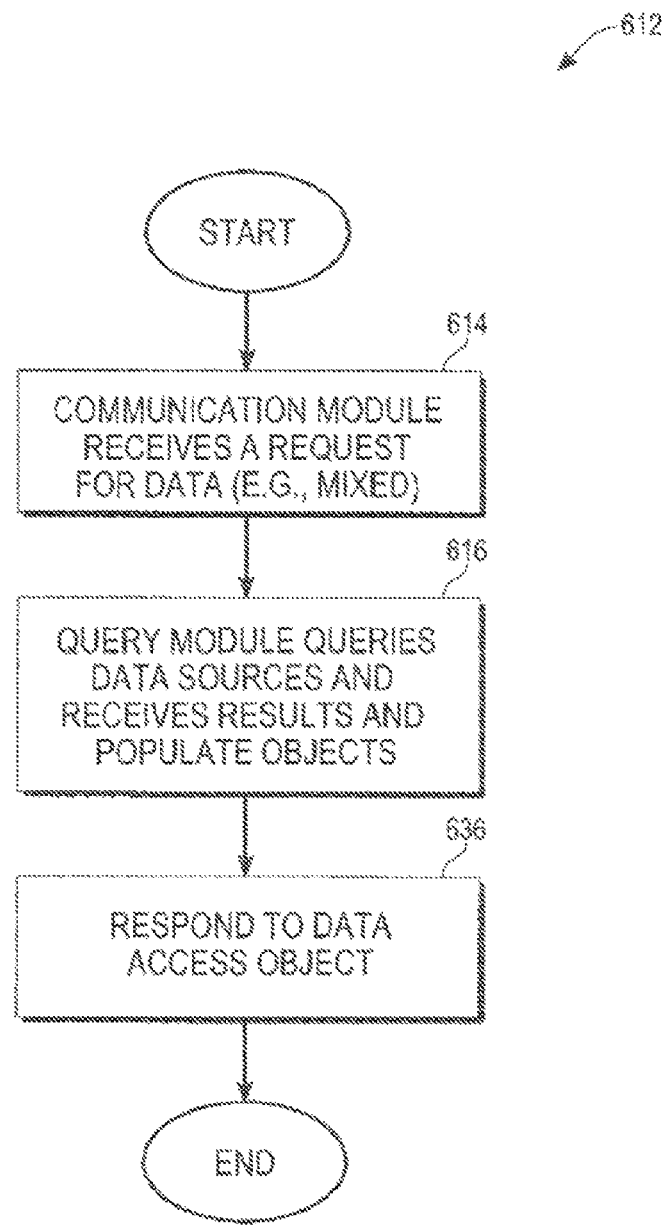
FIG. 34 is a flow chart illustrating an exemplary method, in accordance with an embodiment, to respond to a request for data.

FIG. 34 is a flow chart illustrating an exemplary method 612, in accordance with an embodiment, to respond to a request for data. The method 612 commences with communication module 510 receiving a request from the data access object 506. The request may be for three items including their respective keys (e.g., 111, 222, 333.) Further, the request may include an indication that all attributes 34 in the respective data objects 20 should be populated (e.g., full read set 228), a query name 215, a reference to an item map 504, and a reference to the three item data objects 508 respectively including the appropriate respective attributes 34 initialized to 111, 222, 333.

At operation 616, the query module 512 queries a database server 64, receives results and populates item data objects 508.

Figure 35:
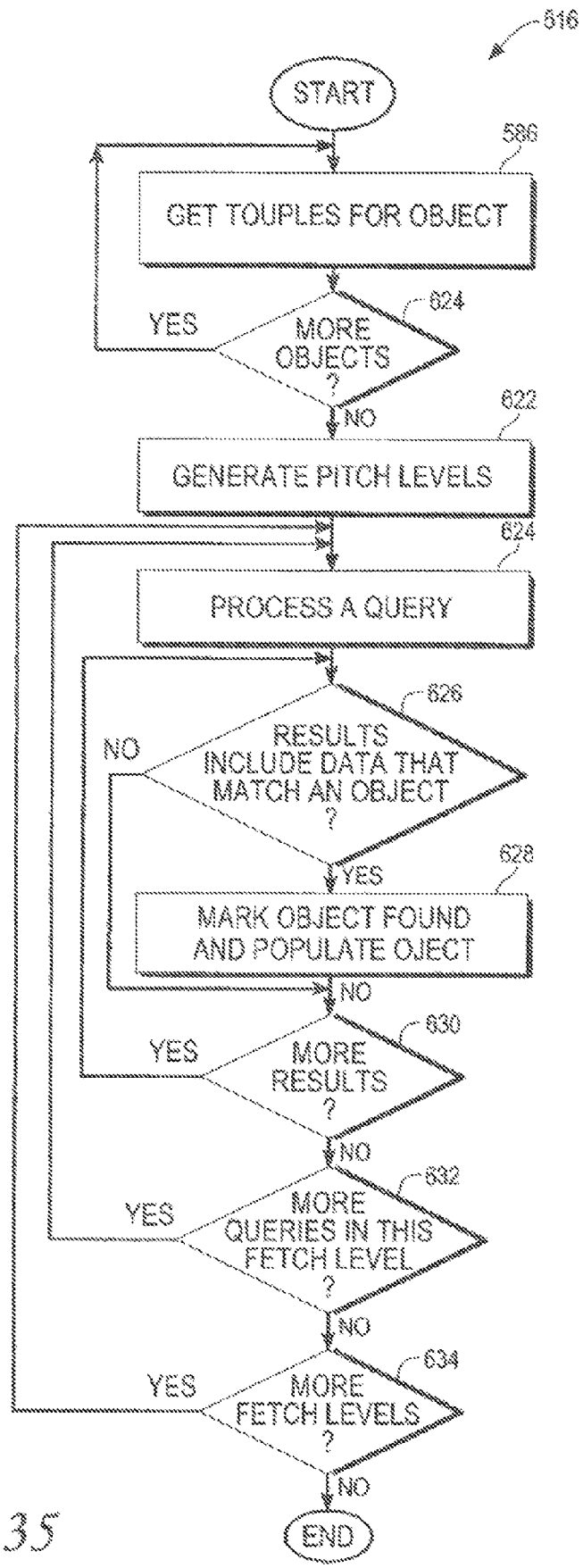
FIG. 35 is a flow chart illustrating an exemplary operation, in accordance with an embodiment, to query data sources, receive results and populate objects.

FIG. 35 is a flow chart illustrating an exemplary method 616, in accordance with an embodiment, to query databases, receive results and populate objects.

At operation 586, the query module 512 gets an array of touples 528 for a data item object 508 and saves the array of touples 528. For example, the following array of touples may be returned on successive iterations of operation 586:

| Row/Object | Touples |
|---|---|
| 111 | DDR module returns Touple A, Touple B |
| 222 | DDR module returns Touple B, Touple C |
| 333 | DDR module returns Touple A, Touple B |

At decision operation 620 the query module 512 determines if there are more data item objects 508 to process. If there are more data item objects 508 to process then processing continues at operation 586. Otherwise processing continues at operation 622.

At operation 622 the query module 512 utilizes the arrays of touples 528 to build fetch levels. For example, the following fetch levels may be built:

| Fetch Level | Touple | SQL Statement |
|---|---|---|
| 1 | 1 | SELECT id FROM Touple A WHERE User.id = IN (111, 333) |
|  | 2 | SELECT id FROM Touple B WHERE User.id = IN (222) |
| 2 | 2 | SELECT id FROM Touple B WHERE User.id = IN (111, 333) |
|  | 3 | SELECT id FROM Touple C WHERE User.id = IN (222) |

At operation 624 the query module 512 executes a query in a fetch level.

At decision operation 626 the query module 512 determines if the results from the query include data (e.g., 111, 222, or 333) that matches an attribute 34 value in one of the requested item data objects 508. If data matches an attribute 34 value in one of the requested item data objects 508 then processing continues at operation 628. Otherwise procession continues at operation decision operation 630.

At operation 628 the item data object 508 is marked found and the attributes in the item data object 508 are populated with the results.

At decision operation 630, the query module 512 determines if there are more results. If there are more results then processing continues at operation 626. Otherwise processing continues at decision operation 632.

At decision operation 632, the query module 512 determines if there are more queries in the fetch level. If there are more queries in the fetch level then processing continues at operation 624. Otherwise processing continues at decision operation 634.

At decision operation 634, the query module 512 determines if there are more fetch levels. If there are more fetch levels then processing continues at operation 624. Otherwise processing continues at operation 636 in FIG. 31.

Returning to FIG. 31, at operation 636 the query module 512 responds to the item data access object 506 that, in turn, responds to the application domain 18.

Thus, broadly a method and system for transparent application of multiple queries across multiple data sources including different table names and database instances has been described. This approach has the advantage of abstracting or hiding from an application domain the complexities of reading data from one or more physical tables that may be stored on at least two data base servers. Further, the method and system enhance the development of application software by enabling a simplified view of the data as a single logical table.

Exemplary Transaction Facility

Figure 36:
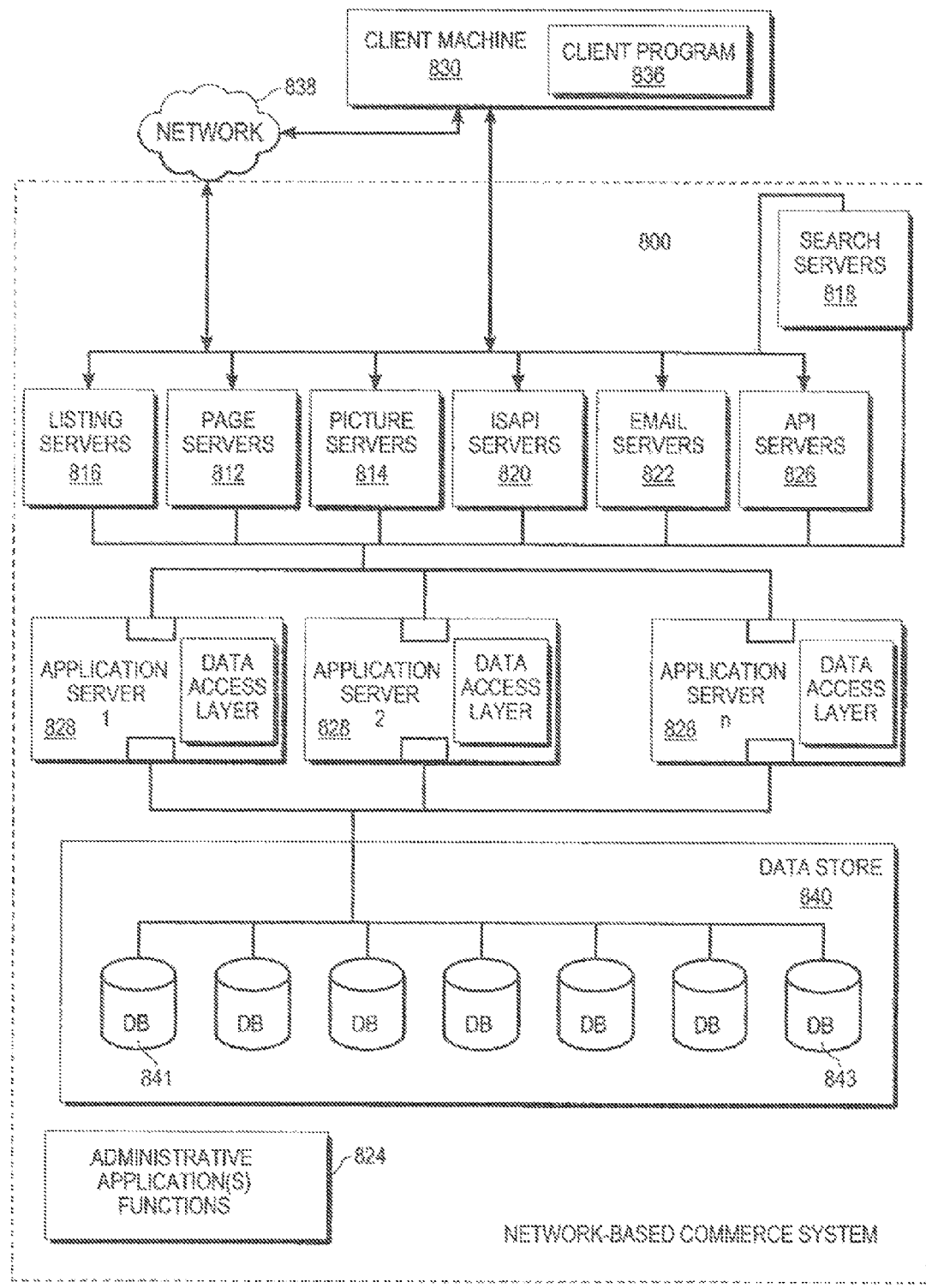
FIG. 36 shows exemplary details of network-based commerce system or facility wherein the data access system may be deployed.

FIG. 36 is block diagram illustrating an exemplary network-based commerce system or facility 800 wherein the present invention may be deployed. While an exemplary embodiment of the present invention is described within the context of the network-based commerce system 800, the invention will find application in many different types of computer-based, and network-based, facilities (commerce, transaction or otherwise).

The network-based commerce system 800 includes one or more of a number of types of front-end servers that may each include at least one Dynamic Link Library (DLL) to provide selected functionality. The system 800 may include page servers 812 that deliver web pages (e.g., mark-up language documents), picture servers 814 that dynamically deliver images to be displayed within Web pages, listing servers 816 that facilitate category-based browsing of listings, search servers 818 that handle search requests to the system 800 and facilitate keyword-based browsing of listings, and ISAPI servers 820 that provide an intelligent interface to a back-end of the system 800. The system 800 may also include e-mail servers 822 that provide, inter alia, automated e-mail communications to users of the network-based commerce system 800. In one embodiment, one or more administrative application functions 824 facilitate monitoring, maintaining, and managing the system 800. One or more API servers 826 may provide a set of API functions for querying and writing to the network-based commerce system 800. APIs may be called through the HTTP transport protocol. In one embodiment, information is sent and received using a standard XML data format. Applications utilized to interact (e.g., upload transaction listings, review transaction listings, manage transaction listings, etc.) with the network-based commerce system 800 may be designed to use the APIs. Such applications may be in an HTML form or be a CGI program written in C++, Perl, Pascal, or any other programming language.

The API servers 826, page servers 812, picture servers 814, ISAPI servers 820, search servers 818, e-mail servers 822 and a database engine server (e.g., provided by one or more of the application servers 828) may individually, or in combination, act as a communication engine to facilitate communications between, for example, a client machine 830 and the network-based commerce system 800; act as a transaction engine to facilitate transactions between, for example, the client machine 830 and the network-based commerce system 800; and act as a display engine to facilitate the display of listings on, for example, the client machine 830.

The back-end servers may include a database engine server, a search index server and a credit card database server, each of which maintains and facilitates access to a respective database.

In one embodiment, the network-based commerce system 800 is accessed by a client program, such as for example a browser 836 (e.g., the Internet Explorer distributed by Microsoft Corp. of Redmond, Wash.) that executes on the client machine 830 and accesses the network-based commerce system 800 via a network such as, for example, the Internet 838. Other examples of networks that a client may utilize to access the network-based commerce system 800 include a wide area network (WAN), a local area network (LAN), a wireless network (e.g., a cellular network), the Public Switched Telephone Network (PSTN) network, or the like. The client program that executes on the client machine 830 may also communicate with the network-based commerce system 800 via the API servers 826.

Exemplary Database Structure

Figure 37:
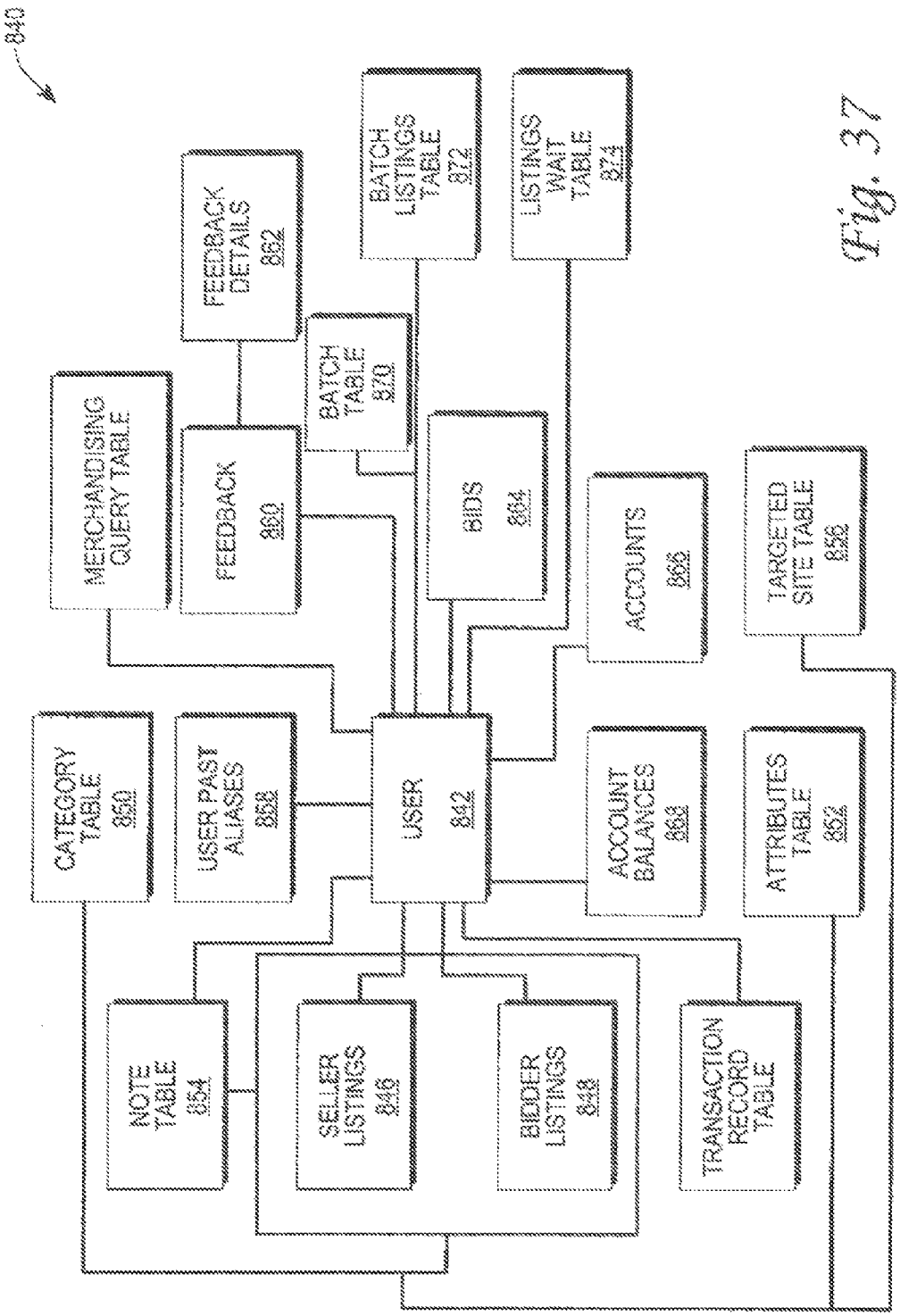
FIG. 37 is a database diagram illustrating an exemplary embodiment of a database, maintained by and accessed via a database engine server, which at least partially implements and supports the data access system in accordance with an embodiment of the invention.

FIG. 37 is a database diagram illustrating an exemplary database 840, maintained by and accessed via the database engine server 828, which at least partially implements and supports the network-based commerce system 800. In one embodiment a database engine server may maintain a plurality of databases 840. For example, may maintain a master write database 841 (e.g., including a plurality of horizontally distributed databases), and a read-only database 843 that may, for example, allow loads to be balanced appropriately.

The database 840 may, in one embodiment, be implemented as a relational database, and includes a number of tables having entries, or records, that are linked by indices and keys. In an alternative embodiment, the database 840 may be implemented as collection of objects in an object-oriented database, as discussed by way of example in more detail below.

The database 840 includes a user table 842 that contains a record for each user of the network-based commerce system 800. An exemplary record for each user is shown in FIG. 39. A user may operate as a seller, a buyer, or both, when utilizing the network-based commerce system 800. The database 840 also includes listings tables 844 (see FIGS. 37 and 38) that may be linked to the user table 842. The listings tables 844 may include a seller listings table 846 and a bidder listings table 848. A user record in the user table 842 may be linked to multiple listings that are being, or have been, listed or offered for sale via the network-based commerce system 800. In one embodiment, a link indicates whether the user is a seller or a bidder (or buyer) with respect to listings for which records exist within the listings tables 844.

The database 840 also includes one or more divisions in the form of categories provided in category tables 850. Each record within the category table 850 may describe a respective category. In one embodiment, listings provided by the system 800 are arranged in the categories. These categories may be navigable by a user of the network-based commerce system 800 to locate listings in specific categories. Thus, categories provide a mechanism to locate listings that may be browsed. In addition or instead, an alphanumeric search mechanism may be provided by the search servers 818 to allow a user to search for specific listings using search terms or phrases. In one embodiment, the category table 850 describes multiple, hierarchical category data structures, and includes multiple category records, each of which describes the context of a particular category within the multiple hierarchical category structures. For example, the category table 850 may describe a number of real, or actual, categories to which listing records, within the listings tables 844, may be linked.

The database 840 is also shown to include one or more attributes tables 852. Each record within the attributes table 852 describes a respective attribute associated with a listing. In one embodiment, the attributes table 852 describes multiple, hierarchical attribute data structures, and includes multiple attribute records, each of which describes the context of a particular attribute within the multiple hierarchical attribute structures. For example, the attributes table 852 may describe a number of real, or actual, attributes to which listing records, within the listings tables 844, may be linked. Also, the attributes table 852 may describe a number of real, or actual, attributes to which categories, within the category table 850, may be linked.

The database 840 may also include a note table 854 populated with note records that may be linked to one or more listing records within the listings tables 844 and/or to one or more user records within the user table 842. Each note record within the note table 854 may include, inter alia, a comment, description, history or other information pertaining to a listing being offered via the network-based commerce system 800, to a user of the network-based commerce system 800. The database 840 may also include a targeted site table 856 populated with targeted site records that may be linked to one or more listing records within the listings tables 844 and/or to one or more user records within the user table 842.

A number of other exemplary tables may also be linked to the user table 842, namely a user past aliases table 858, a feedback table 860, a feedback details table 862, a bids table 864, an accounts table 866, and an account balances table 868. In one embodiment, the database 840 also includes a batch table 870, a batch listings table 872, and a listings wait table 874. The data may be partitioned across multiple database instances, and queries may have to be executed against multiple database instances and query results may need to be aggregated.

Figure 40:
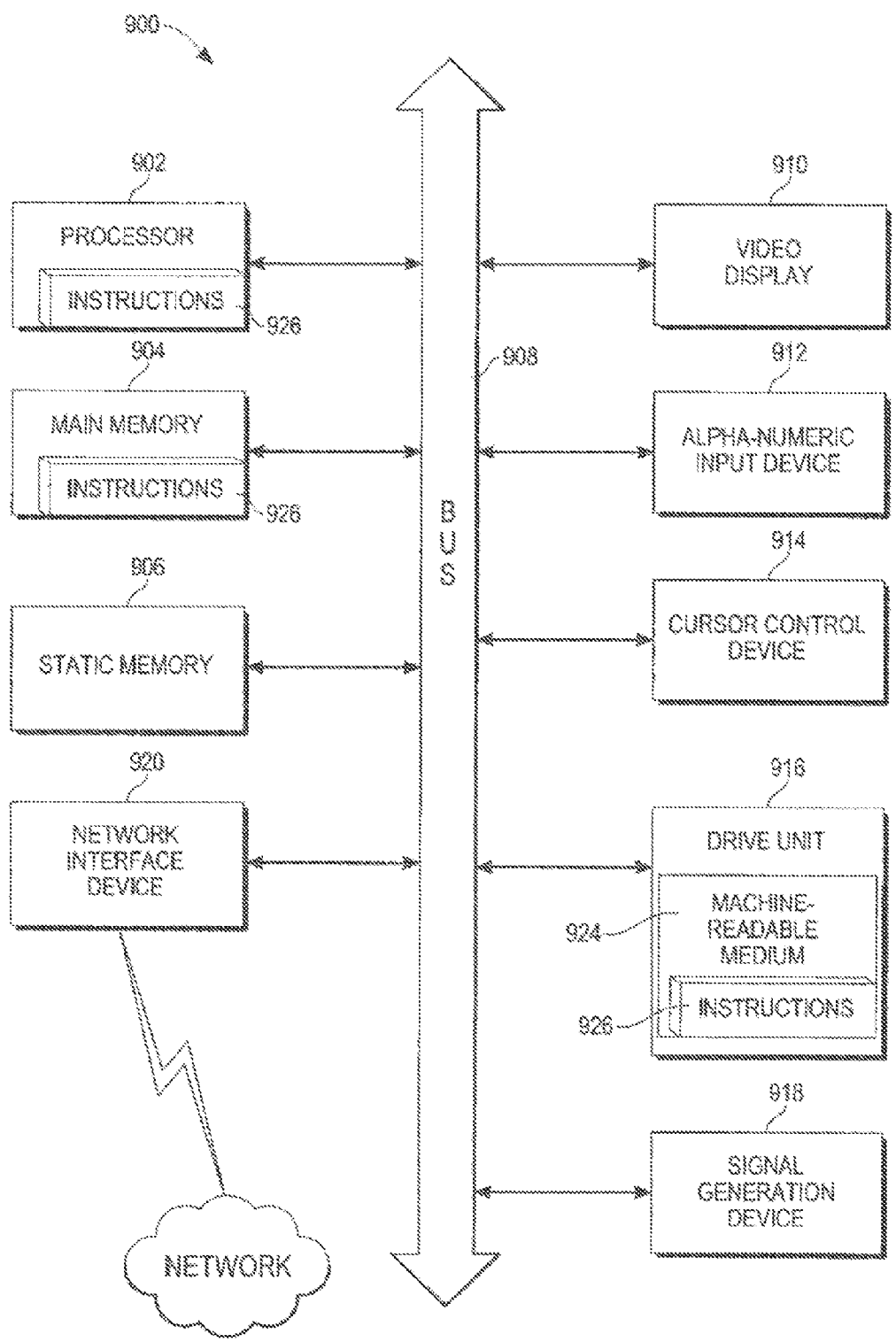
FIG. 40 shows a diagrammatic representation of machine, in the exemplary form of a computer system, within which a set of instructions, for causing the machine to perform any one of the methodologies discussed herein, may be executed.

FIG. 40 shows a diagrammatic representation of a machine in the exemplary form of a computer system 900 within which a set or sequence of instructions, for causing the machine to perform any one of the methodologies discussed herein, may be executed. In alternative embodiments, the machine may comprise a network router, a network switch, a network bridge, Personal Digital Assistant (PDA), a cellular telephone, a web appliance, set-top box (STB) or any machine capable of executing a sequence of instructions that specify actions to be taken by that machine.

The computer system 900 includes a processor 902, a main memory 904 and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard), a cursor control device 914 (e.g., a mouse), a disk drive unit 916, a signal generation device 918 (e.g., a speaker) and a network interface device 920 to interface the computer system to a network 922.

The disk drive unit 916 includes a machine-readable medium 924 on which is stored a set of instructions or software 926 embodying any one, or all, of the methodologies described herein. The software 926 is also shown to reside, completely or at least partially, within the main memory 904 and/or within the processor 902. The software 926 may further be transmitted or received via the network interface device 920. For the purposes of this specification, the term "machine-readable medium" shall be taken to include any medium which is capable of storing or encoding a sequence of instructions for execution by the machine and that cause the machine to perform any one of the methodologies of the present invention. The term "machine-readable medium" shall accordingly be taken to included, but not be limited to, solid-state memories, optical and magnetic disks, and carrier wave signals. Further, while the software is shown in FIG. 40 to reside within a single device, it will be appreciated that the software 926 could be distributed across multiple machines or storage media, which may include the machine-readable medium.

Thus, a method and system to process data requests in a data processing system have been described. Although the invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

We claim:

1. A computerized method to automatically generate software for an object to relational mapping system, the method comprising:
   reading an Extensible Stylesheet Language (XSL) template from a class definition file;
   selecting, by use of a processor, an Extensible Markup Language (XML) meta-data based on the XSL template;
   reading the selected XML meta-data from a configuration file; and
   generating a plurality of classes for a data object based on the XML meta-data as defined by the XSL template, the plurality of classes being used in the object to relational mapping system.

2. The method of claim 1, wherein the XML meta-data is generated by a database schema utility that reads at least one database that includes at least one table.

3. The method of claim 2, further comprising assigning names to attributes of the XML meta-data based on names of fields in the table.

4. The method of claim 2, further comprising assigning assumed types to attributes of the XML meta-data.

5. The method of claim 2, further comprising a manual editing process to operate on the XML meta-data.

6. The method of claim 2, further comprising an automatic editing process to operate on the XML meta-data.

7. The method of claim 1, wherein the XSL template includes inheritance rules that are applied to the generated plurality of classes.

8. The method of claim 1, further comprising regenerating the plurality of classes in response to modifications in the class definition file or the configuration file.

9. A computerized system to automatically generate software for an object to relational mapping system, the system comprising:
   at least one processor;
   a read module executable by the at least one processor to read an XSL template from a class definition file, select an XML meta-data based on the XSL template and read the selected XML meta-data from a configuration file; and
   a class generator module executable by the at least one processor to generate a plurality of classes for a data object based on the XML meta-data as defined by the XSL template, the plurality of classes used in the object to relational mapping system.

10. The system of claim 9, further comprising a data base schema utility module to generate the XML meta-data based on reading at least one database that includes at least one table.

11. The system of claim 10, wherein the data base schema utility module is to assign names to attributes of the XML meta-data based on names of fields in the table.

12. The system of claim 10, wherein the data base schema utility module is to assign assumed types to attributes of the XML meta-data.

13. The system of claim 9, wherein the XSL template includes inheritance rules that are applied to the generated plurality of classes.

14. The system of claim 9, wherein the class generator module regenerates the plurality of classes in response to modifications in the class definition file or the configuration file.

15. A non-transitory machine readable storage medium storing a set of instructions that, when executed by a machine, cause the machine to:
- read an Extensible Stylesheet Language (XSL) template from a class definition file;
- select an Extensible Markup Language (XML) meta-data based on the XSL template;
- read the selected XML meta-data from a configuration file; and
- generate a plurality of classes for a data object based on the XML meta-data as defined by the XSL template, the plurality of classes used in the object to relational mapping system.

16. The machine readable storage medium of claim 15 which further causes the machine to generate the XML meta-data based on reading at least one database that includes at least one table.

17. The machine readable storage medium of claim 16 which further causes the machine to assign names to attributes of the XML meta-data based on names of fields in the table.

18. The machine readable storage medium of claim 16 which further causes the machine to assign assumed types to attributes of the XML meta-data.

19. The machine readable storage medium of claim 15 which further causes the machine to regenerate the plurality of classes in response to modifications in the class definition file or the configuration file.

* * * * *